US009574480B2

(12) United States Patent
Matsumoto et al.

(10) Patent No.: US 9,574,480 B2
(45) Date of Patent: Feb. 21, 2017

(54) DIAGNOSTIC APPARATUS FOR EXHAUST GAS PURIFICATION APPARATUS

(71) Applicant: TOYOTA JIDOSHA KABUSHIKI KAISHA, Toyota-shi, Aichi (JP)

(72) Inventors: Arifumi Matsumoto, Gotenba (JP); Tomoyuki Kogo, Gotenba (JP); Taiga Hagimoto, Susono (JP); Kenji Furui, Susono (JP); Akifumi Uozumi, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 14/916,281

(22) PCT Filed: Sep. 24, 2014

(86) PCT No.: PCT/JP2014/075316
§ 371 (c)(1),
(2) Date: Mar. 3, 2016

(87) PCT Pub. No.: WO2015/046265
PCT Pub. Date: Apr. 2, 2015

(65) Prior Publication Data

US 2016/0208668 A1 Jul. 21, 2016

(30) Foreign Application Priority Data

Sep. 25, 2013 (JP) ................................ 2013-198765

(51) Int. Cl.
*F01N 3/00* (2006.01)
*F01N 3/20* (2006.01)
*F01N 11/00* (2006.01)

(52) U.S. Cl.
CPC ............ *F01N 3/208* (2013.01); *F01N 3/2066* (2013.01); *F01N 11/00* (2013.01); *F01N 11/007* (2013.01);
(Continued)

(58) Field of Classification Search
USPC .......... 60/274, 276, 277, 286, 297, 301, 303
See application file for complete search history.

(56) References Cited

U.S. PATENT DOCUMENTS 6,823,722 B2 * 11/2004 Yamazaki ............ F01N 3/0814 73/114.69
2008/0306673 A1 12/2008 Yasui et al.
(Continued)

FOREIGN PATENT DOCUMENTS

JP 2008-303842 12/2008
JP 2009-510324 3/2009
(Continued)

*Primary Examiner* — Binh Q Tran
(74) *Attorney, Agent, or Firm* — Finnegan, Henderson, Farabow, Garrett & Dunner, LLP

(57) ABSTRACT

A diagnostic apparatus for an exhaust gas purification apparatus including a selective catalytic reduction NOx catalyst (SCR catalyst) provided in an exhaust passage of an internal combustion engine, a supplying unit supplying ammonia or an ammonia precursor into exhaust gas flowing into the SCR catalyst and a sensor, provided on a downstream side of the SCR catalyst, detecting NOx and ammonia in exhaust gas. The diagnostic apparatus calculates an amount of decline in output of the sensor due to a reaction between NOx and ammonia at the sensor and performs a diagnosis of the supplying unit based on the calculated amount of decline in output of the sensor.

19 Claims, 17 Drawing Sheets

(52) U.S. Cl.
CPC ...... *F01N 2550/05* (2013.01); *F01N 2560/021* (2013.01); *F01N 2560/026* (2013.01); *F01N 2610/02* (2013.01); *F01N 2900/0416* (2013.01); *F01N 2900/1402* (2013.01); *F01N 2900/1621* (2013.01); *Y02T 10/24* (2013.01); *Y02T 10/47* (2013.01)

(56) References Cited

U.S. PATENT DOCUMENTS

| | | | | |
|---|---|---|---|---|
| 2009/0049899 | A1 | 2/2009 | Hjorsberg et al. | |
| 2010/0115924 | A1* | 5/2010 | Gabe | B01D 53/9409 60/285 |
| 2010/0326051 | A1 | 12/2010 | Busch et al. | |
| 2011/0099977 | A1 | 5/2011 | Takahashi | |
| 2011/0265452 | A1* | 11/2011 | Geveci | F01N 3/208 60/274 |
| 2013/0232958 | A1* | 9/2013 | Ancimer | F01N 3/035 60/301 |
| 2013/0255233 | A1* | 10/2013 | Yasui | F01N 3/10 60/286 |
| 2015/0047318 | A1* | 2/2015 | Aliyev | F01N 3/208 60/274 |

FOREIGN PATENT DOCUMENTS

| | | |
|---|---|---|
| JP | 2010-537117 | 12/2010 |
| JP | 2011-94540 | 5/2011 |
| JP | 2012-36840 | 2/2012 |

* cited by examiner

DIAGNOSTIC APPARATUS FOR EXHAUST GAS PURIFICATION APPARATUS

CROSS-REFERENCE TO RELATED APPLICATIONS

This application is a national phase application of International Application No. PCT/JP2014/075316, filed Sep. 24, 2014, and claims the priority of Japanese Application No. 2013-198765, filed Sep. 25, 2016, the content of both of which is incorporated herein by reference.

TECHNICAL FIELD

The present invention relates to a diagnostic apparatus for an exhaust gas purification apparatus.

BACKGROUND ART

A selective catalytic reduction NOx catalyst (hereinafter, also simply referred to as a "NOx catalyst") is known which uses ammonia as a reducing agent to purify NOx (nitrogen oxides) contained in exhaust gas from an internal combustion engine. A supply apparatus for supplying ammonia or an ammonia precursor such as urea (hereinafter, also collectively referred to as a "reducing agent") into exhaust gas that flows into the NOx catalyst may be installed on an upstream side of the NOx catalyst in an exhaust passage. In order to cause NOx to be purified at a desired purification rate at the NOx catalyst, a supply amount of the reducing agent supplied from the supply apparatus must be controlled. A NOx sensor which is provided on a downstream side of the NOx catalyst and which is capable of detecting a concentration of NOx in exhaust gas is sometimes used for this control. Regarding the control of a supply apparatus, it is known that, when an output value from a NOx sensor follows a downward trend regardless of an increase in an amount of NOx flowing into a NOx catalyst, a determination is made that ammonia is flowing out from the NOx catalyst (an ammonia slip has occurred) due to an excessive supply amount of a reducing agent and, accordingly, an additive amount of urea water is reduced (for example, refer to PTL 1).

Accurate control of an amount of a reducing agent supplied from a supply apparatus requires the supply apparatus to be operating properly. Since a NOx sensor is capable of detecting ammonia in addition to NOx, an output value from a NOx sensor is known to be used to diagnose whether or not a supply apparatus is operating properly (in other words, whether the supply apparatus is in a normal state or an abnormal state) (for example, refer to PTL 2 through PTL 4). According to the techniques disclosed in these documents, during a diagnosis of a supply apparatus, a supply amount of a reducing agent from the supply apparatus is increased to a level where an output value of the NOx sensor is expected to exceed a prescribed threshold due to ammonia flowing out from the NOx catalyst. In addition, when an actual output value does not exceed the prescribed threshold, it is determined that the supply apparatus is not operating according to control and is in an abnormal state.

CITATION LIST

Patent Literature

PTL 1: Japanese Patent Application Laid-open No. 2011-094540

PTL 2: Japanese Patent Application Laid-open No. 2009-510324

PTL 3: Japanese Patent Application Laid-open No. 2010-537117

PTL 4: Japanese Patent Application Laid-open No. 2008-303842

PTL 5: Japanese Patent Application Laid-open No. 2012-036840

SUMMARY OF INVENTION

Technical Problem

In a NOx sensor, NOx may be generated due to oxidation of ammonia. Therefore, both NOx in exhaust gas that flows into the NOx sensor and NOx created from ammonia in the NOx sensor may exist in the NOx sensor. In addition, since NOx existing in the NOx sensor may be reduced by ammonia, amounts of NOx and ammonia in the NOx sensor may decrease. In this case, an output value of the NOx sensor takes a value corresponding to remaining amounts of NOx and ammonia after the decrease in NOx and ammonia. Therefore, an actual output value of the NOx sensor may become smaller than a sum value of a NOx concentration and an ammonia concentration in exhaust gas that flows into the NOx sensor. As a result, when a diagnosis of a supply apparatus of a reducing agent is performed based on the actual output value of the NOx sensor, accuracy of the diagnosis may decline.

The present invention has been made in consideration of the problem described above and an object thereof is to prevent a decline in diagnostic accuracy in a diagnosis of a supply apparatus that supplies a reducing agent to a selective catalytic reduction NOx catalyst.

Solution to Problem

In order to solve the problem described above, the present invention provides a diagnostic apparatus for an exhaust gas purification apparatus of an internal combustion engine, the exhaust gas purification apparatus including:

a selective catalytic reduction NOx catalyst which is provided in an exhaust passage of the internal combustion engine and which uses ammonia to reduce NOx in exhaust gas;

a supplying unit which is provided on an upstream side of the selective catalytic reduction NOx catalyst and which supplies ammonia or an ammonia precursor into exhaust gas that flows into the selective catalytic reduction NOx catalyst;

a control unit which controls a supply amount of the ammonia or ammonia precursor that is supplied from the supplying unit; and a sensor which is provided on a downstream side of the selective catalytic reduction NOx catalyst, which detects NOx and ammonia in exhaust gas that flows out from the selective catalytic reduction NOx catalyst, and at which NOx and ammonia react with each other, the diagnostic apparatus for the exhaust gas purification apparatus including:

a NOx concentration estimating unit which estimates a NOx concentration in the exhaust gas that flows out from the selective catalytic reduction NOx catalyst;

an ammonia concentration estimating unit which estimates an ammonia concentration in the exhaust gas that flows out from the selective catalytic reduction NOx catalyst;

a calculating unit which calculates an amount of decline in output of the sensor caused by a reaction between NOx and ammonia at the sensor, based on the NOx concentration estimated by the NOx concentration estimating unit and the ammonia concentration estimated by the ammonia concentration estimating unit;

a diagnosing unit which performs a diagnosis of the supplying unit based on an output value of the sensor; and a diagnosis control unit which controls a diagnosis by the diagnosing unit based on the amount of decline in output of the sensor as calculated by the calculating unit.

A selective catalytic reduction NOx catalyst (hereinafter, also simply referred to as a "NOx catalyst") adsorbs ammonia in exhaust gas and uses the ammonia as a reducing agent to selectively reduce NOx. A supplying unit supplies ammonia or an ammonia precursor such as urea (hereinafter, also collectively referred to as a "reducing agent"). A control unit controls a supply amount of the reducing agent supplied from the supplying unit in accordance with an operating state of an internal combustion engine, an output value from the sensor, or the like so that NOx is purified at the NOx catalyst in a favorable manner. In addition, ammonia having flowed into the NOx catalyst (including ammonia generated from the ammonia precursor) is adsorbed by the NOx catalyst.

A sensor which detects NOx in exhaust gas that flows out from the NOx catalyst and which outputs a NOx concentration in the exhaust gas is provided on a downstream side of the NOx catalyst. The sensor has a property of detecting ammonia in exhaust gas in addition to detecting NOx. This means that an output value of the sensor is dependent on NOx and ammonia contained in exhaust gas. In addition, a diagnosing unit diagnoses whether the supplying unit is in a normal state or an abnormal state based on an output value of the sensor. In this case, a normal state refers to a state where the supplying unit is supplying the reducing agent in an amount controlled by the control unit or in an amount that accounts for a prescribed proportion or more of the controlled amount (hereinafter, also collectively referred to as a "control amount"). In addition, an abnormal state refers to a state where the supplying unit is only supplying the reducing agent in a smaller amount than the control amount. Moreover, the prescribed proportion may be appropriately set in consideration of performance, deterioration over time, or the like of the supplying unit.

For example, when the reducing agent is being supplied to the NOx catalyst in an amount appropriate for NOx purification, since ammonia is used for a reduction reaction of NOx, both an amount of NOx and an amount of ammonia which flow out from the NOx catalyst decrease. Therefore, in this case, it is expected that an output value of the sensor is to decrease and a NOx purification rate that is calculated based on the output value of the sensor is to increase. A NOx purification rate is a ratio of a NOx concentration that decreases due to purification by a NOx catalyst with respect to a NOx concentration in exhaust gas that flows into the NOx catalyst. For example, the NOx concentration in exhaust gas that flows into the NOx catalyst can be estimated based on an operating state of the internal combustion engine or detected by attaching a NOx sensor or the like on an upstream side of the NOx catalyst. In addition, the NOx concentration that decreases due to purification by the NOx catalyst can be obtained by subtracting a NOx concentration detected by a sensor provided on a downstream side of the NOx catalyst from the NOx concentration in exhaust gas that flows into the NOx catalyst. Since the sensor is influenced by ammonia, the NOx purification rate that is calculated based on the output value of the sensor is also influenced by ammonia. In addition, as the output value of the sensor declines due to the influence of NOx and ammonia contained in exhaust gas, the calculated NOx purification rate rises. Furthermore, when an actual output value of the sensor is higher than an expected level or when the NOx purification rate is lower than an expected level despite the supplying unit being controlled to supply the reducing agent in an amount appropriate for NOx purification, a large amount of unpurified NOx is conceivably flowing out from the NOx catalyst. Therefore, in these cases, it can be determined that only the reducing agent is actually being supplied from the supplying unit in a smaller amount than the control amount and a diagnosis can be made that the supplying unit is in an abnormal state.

In addition, for example, since an amount of ammonia that flows out from the NOx catalyst due to an ammonia slip increases when the reducing agent is temporarily supplied to the NOx catalyst in an amount exceeding an ammonia adsorption capability of the NOx catalyst, it is expected that an output value of the sensor is to increase and the NOx purification rate that is calculated based on the output value of the sensor is to decrease. Therefore, when an actual output value of the sensor is at an expected high level or the NOx purification rate is at an expected low level in a case where the supplying unit is controlled to supply the reducing agent in an amount exceeding the ammonia adsorption capability of the NOx catalyst, it can be determined that the reducing agent is actually being supplied in the control amount and a diagnosis can be made that the supplying unit is in a normal state.

However, since NOx may be reduced by ammonia in the sensor, amounts of NOx and ammonia in the sensor may decrease. Therefore, an actual output value of the sensor may become smaller than a value (hereinafter, also referred to as "actual concentration") corresponding to a sum of an actual NOx concentration and an actual ammonia concentration in exhaust gas that flows out from the NOx catalyst (in other words, exhaust gas that flows into the sensor). When a diagnosis of the supplying unit is performed based on an output value that is lower than the actual concentration, diagnostic accuracy may decline.

In consideration thereof, according to the present invention, a diagnosis control unit controls diagnosis by the diagnosing unit based on an amount of decline in output of the sensor. In this case, the amount of decline in output of the sensor is an amount of decline from the actual concentration described above and is related to concentrations of NOx and ammonia that flow out from the NOx catalyst. Therefore, the amount of decline in output of the sensor can be obtained based on the concentrations of NOx and ammonia that flow out from the NOx catalyst. In addition, once the amount of decline in output of the sensor is known, for example, a threshold or the like that is used when performing a diagnosis can be corrected based on the amount of decline in output. Alternatively, whether or not a diagnosis is to be performed can be determined based on the amount of decline in output of the sensor. As a result, since an incorrect diagnosis can be prevented, a decline in diagnostic accuracy of the supplying unit can be prevented. Moreover, controlling a diagnosis by the diagnosing unit includes correcting a threshold, correcting a sensor output value, correcting a NOx purification rate that is calculated based on a sensor output value, and determining whether or not a diagnosis is to be performed.

In addition, the diagnosis control unit:

may perform a diagnosis of the supplying unit when an amount of rise of a NOx purification rate which is calculated based on the amount of decline in output of the sensor as calculated by the calculating unit is equal to or smaller than a prescribed amount; and may not perform a diagnosis of the supplying unit when the amount of rise of a NOx purification rate which is calculated based on the amount of decline in output of the sensor as calculated by the calculating unit is larger than the prescribed amount.

Since concentrations of NOx and ammonia that flow out from the NOx catalyst may increase depending on the operating state of the internal combustion engine and on a supply amount of the reducing agent, the amount of decline in output of the sensor as calculated by the calculating unit may increase. Therefore, even in a case where it is expected that an output value of the sensor is to relatively increase due to an increase in unpurified NOx that flows out from the NOx catalyst and that the calculated NOx purification rate is to relatively decrease such as when the reducing agent is not being supplied in an amount appropriate for NOx purification, an actual output value of the sensor may decline significantly and the calculated NOx purification rate may rise significantly. In addition, even in a case where it is expected that an output value of the sensor is to relatively increase due to an increase in ammonia that flows out from the NOx catalyst and that the calculated NOx purification rate is to relatively decrease such as when an outflow rate of ammonia due to an ammonia slip is temporarily increased, an actual output value of the sensor may decline significantly and the calculated NOx purification rate may rise significantly. In other words, in either case, since an actual output value of the sensor may decline significantly from the actual concentration described earlier, accuracy of a diagnosis of the supplying unit based on the output value of the sensor may decline. Furthermore, since the greater the amount of decline in output of the sensor, the greater the deviation of the actual output value from the actual concentration, the accuracy of a diagnosis may further decline. In contrast, the diagnostic apparatus according to the present invention performs a diagnosis of the supplying unit when an amount of rise of a NOx purification rate which is calculated based on an amount of decline in output of the sensor is equal to or smaller than a prescribed amount and does not perform a diagnosis of the supplying unit when the amount of rise of the NOx purification rate is larger than the prescribed amount. Accordingly, a diagnosis of the supplying unit is no longer performed when there is a risk that diagnostic accuracy may decline. As a result, since an incorrect diagnosis can be prevented, a decline in diagnostic accuracy can be prevented. Moreover, the prescribed amount may be set by an experiment or the like in advance so that sufficient diagnostic accuracy is secured. In addition, not performing a diagnosis of the supplying unit includes, for example, reading an output value of the sensor but not performing a diagnosis using the output value. Furthermore, not performing a diagnosis of the supplying unit includes, for example, performing a diagnosis based on an output value of the sensor but canceling a result of the diagnosis. Moreover, not performing a diagnosis of the supplying unit includes, for example, not reading an output value of the sensor.

In addition, the diagnosing unit may diagnose the supplying unit by comparing a NOx purification rate that is calculated based on the output value of the sensor with a threshold, and the diagnosis control unit may correct the NOx purification rate based on the amount of decline in output of the sensor or correct the threshold based on the amount of decline in output of the sensor.

When the reducing agent is actually being supplied in the control amount in a case where the supplying unit is controlled so that unpurified NOx flowing out from the NOx catalyst decreases, it is expected that the actual concentration is to relatively decrease. Therefore, by setting an appropriate threshold, it can be determined that the reducing agent is actually being supplied only in a smaller amount than the control amount and a diagnosis can be made that the supplying unit is in an abnormal state when the NOx purification rate is lower than the threshold. In addition, when the reducing agent is actually being supplied in the control amount in a case where the supplying unit is controlled so that ammonia flowing out from the NOx catalyst due to an ammonia slip increases, it is expected that the actual concentration is to relatively increase. Therefore, by setting an appropriate threshold, it can be determined that the reducing agent is actually being supplied in the control amount and a diagnosis can be made that the supplying unit is in a normal state when the NOx purification rate is lower than the threshold. In this manner, in either case, the supplying unit can be diagnosed by comparing a NOx purification rate that is calculated based on an output value of the sensor with a threshold.

However, as described earlier, the actual output value of the sensor may become lower than the actual concentration due to an influence of a decline in the output. Therefore, even when the actual NOx purification rate is lower than the threshold, a NOx purification rate that is calculated based on the output value of the sensor may become equal to or higher than the threshold due to a decline in output of the sensor. In this case, there is a risk of the diagnosing unit making an erroneous diagnosis. In consideration thereof, according to the present invention, a threshold or a NOx purification rate is corrected based on an amount of decline in output of the sensor. Accordingly, since the influence due to a decline in output of the sensor can be reflected onto the threshold or the NOx purification rate, the diagnosing unit can be prevented from making an incorrect diagnosis. Moreover, the threshold may be set based on a NOx purification rate based on an actual concentration when the supplying unit is in a normal state.

In addition, the diagnosis control unit can correct the threshold by adding, to the threshold, an amount of rise of the NOx purification rate which is calculated based on the amount of decline in output.

In other words, by increasing the threshold by an amount of rise of the NOx purification rate due to a decline in output of the sensor, a magnitude relationship between the NOx purification rate and the threshold can be prevented from changing even if a value representing a decline in output is output from the sensor. As a result, the diagnosing unit can be prevented from making an incorrect diagnosis. Alternatively, the threshold can be corrected by multiplying the threshold by a correction coefficient based on the amount of decline in output.

In addition, the diagnosis control unit can correct the NOx purification rate by subtracting, from the NOx purification rate, the amount of rise of the NOx purification rate which is calculated based on the amount of decline in output.

In other words, by reducing the NOx purification rate by an amount of rise of the NOx purification rate due to a decline in output of the sensor, a magnitude relationship between the NOx purification rate and the threshold can be prevented from changing even if a value representing a decline in output is output from the sensor. As a result, the diagnosing unit can be prevented from making an incorrect diagnosis. Alternatively, a NOx purification rate can be corrected by multiplying the NOx purification rate by a correction coefficient based on the amount of decline in output.

Moreover, when the control unit is controlling the supplying unit so that the output value of the sensor declines due to a decline in a NOx concentration in exhaust gas that flows out from the selective catalytic reduction NOx catalyst, the diagnosing unit can:

diagnose that the supplying unit is in an abnormal state when a NOx purification rate that is calculated based on the output value of the sensor is lower than the threshold; and diagnose that the supplying unit is in a normal state when the NOx purification rate that is calculated based on the output value of the sensor is equal to or higher than the threshold.

A case where the control unit is controlling the supplying unit so that an output value of the sensor declines due to a decline in the NOx concentration in exhaust gas that flows out from the NOx catalyst is, for example, a case where the control unit is controlling the supplying unit to supply the reducing agent in an amount that is appropriate for NOx purification. In this case, for example, the threshold can be set to a lower limit value of an actual NOx purification rate that is expected when the reducing agent is supplied from the supplying unit in the control amount. Accordingly, when the NOx purification rate that is calculated based on the output value of the sensor is lower than the threshold, it can be determined that the reducing agent is actually being supplied only in a smaller amount than the control amount and a diagnosis can be made that the supplying unit is in an abnormal state.

In addition, in the case described above, the NOx concentration estimating unit may estimate a NOx concentration in exhaust gas that flows out from the selective catalytic reduction NOx catalyst when assuming that the supplying unit is in an abnormal state, the ammonia concentration estimating unit may estimate an ammonia concentration in the exhaust gas that flows out from the selective catalytic reduction NOx catalyst when assuming that the supplying unit is in an abnormal state, the calculating unit may calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit can correct the threshold by adding, to the threshold, an amount of rise of a NOx purification rate which is calculated based on the amount of decline in output when assuming that the supplying unit is in an abnormal state.

When the supplying unit is being controlled so that an output value of the sensor declines due to a decline in the NOx concentration in exhaust gas that flows out from the NOx catalyst, an amount of unpurified NOx that flows out from the NOx catalyst is larger when the supplying unit is in an abnormal state than when the supplying unit is in a normal state. Therefore, when the supplying unit is in an abnormal state, an amount of decline in output of the sensor may increase due to a relative increase in actual concentration as compared to when the supplying unit is in a normal state. In consideration thereof, the diagnostic apparatus according to the present invention calculates an amount of decline in output of the sensor and subsequently calculates an amount of rise of a NOx purification rate by assuming a state where the amount of decline in output of the sensor is to increase. By adding the amount of rise of the NOx purification rate to the threshold, the NOx purification rate can be prevented from becoming equal to or higher than the threshold even if an actual output value of the sensor declines significantly and the NOx purification rate rises significantly when the supplying unit is actually in an abnormal state. As a result, the supplying unit in an abnormal state can be prevented from being incorrectly diagnosed to be in a normal state. Moreover, instead of correcting the threshold by adding the amount of rise of the NOx purification rate to the threshold, the NOx purification rate may be corrected by subtracting the amount of rise of the NOx purification rate from the NOx purification rate. Furthermore, the threshold or the NOx purification rate may be corrected by multiplying the threshold or the NOx purification rate by a correction coefficient.

Moreover, in this case, the NOx concentration estimating unit may estimate a NOx concentration in exhaust gas that flows out from the selective catalytic reduction NOx catalyst when assuming that the supplying unit is in a normal state, the ammonia concentration estimating unit may estimate an ammonia concentration in the exhaust gas that flows out from the selective catalytic reduction NOx catalyst when assuming that the supplying unit is in a normal state, the calculating unit may calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit can correct the threshold by adding, to the threshold, a value which is equal to or larger than an amount of rise of a NOx purification rate calculated based on the amount of decline in output when assuming that the supplying unit is in an abnormal state and, at the same time, which is equal to or smaller than a sum value of the amount of rise of a NOx purification rate calculated based on the amount of decline in output when assuming that the supplying unit is in an abnormal state and the amount of rise of a NOx purification rate calculated based on the amount of decline in output when assuming that the supplying unit is in a normal state.

Even when the supplying unit is in a normal state, unpurified NOx and ammonia due to an ammonia slip may flow out from the NOx catalyst. However, a decline in the output of the sensor is more prominent when the NOx catalyst is in an abnormal state than when the NOx catalyst is in a normal state. In consideration thereof, since a rise in the NOx purification rate in both a normal state and an abnormal state of the supplying unit can be taken into consideration by further considering an amount of rise of a NOx purification rate that is based on the amount of decline in output of the sensor when assuming that the supplying unit is in a normal state, an accuracy of diagnosis can be increased.

In addition, when the control unit is controlling the supplying unit so that the output value of the sensor rises due to a rise in an ammonia concentration in exhaust gas that flows out from the selective catalytic reduction NOx catalyst, the diagnosing unit can:

diagnose that the supplying unit is in a normal state when a NOx purification rate that is calculated based on the output value of the sensor is equal to or lower than the threshold; and diagnose that the supplying unit is in an abnormal state when the NOx purification rate that is calculated based on the output value of the sensor is higher than the threshold.

A case where the control unit is controlling the supplying unit so that the output value of the sensor rises due to a rise in the ammonia concentration in exhaust gas that flows out from the NOx catalyst is, for example, a case where the control unit is controlling the supplying unit to supply the reducing agent in an amount that exceeds an ammonia adsorption capability of the NOx catalyst. In this case, for example, the threshold can be set to an upper limit value of an actual NOx purification rate that is expected when the reducing agent is being supplied from the supplying unit in the control amount. Accordingly, when the NOx purification rate that is calculated based on an actual output value of the sensor is equal to or lower than the threshold, it can be determined that the reducing agent is actually being supplied in the control amount and a diagnosis can be made that the supplying unit is in a normal state.

In addition, when the output value of the sensor is rising due to a rise in an ammonia concentration in exhaust gas that flows out from the selective catalytic reduction NOx catalyst which is attributable to a temperature rise of the selective catalytic reduction NOx catalyst, the diagnosing unit may:

diagnose that the supplying unit is in a normal state when a NOx purification rate that is calculated based on the output value of the sensor is equal to or lower than the threshold; and diagnose that the supplying unit is in an abnormal state when the NOx purification rate that is calculated based on the output value of the sensor is higher than the threshold.

An amount of ammonia adsorbable by a NOx catalyst has an upper limit amount referred to as a saturated adsorption amount. The saturated adsorption amount characteristically declines as the temperature of the NOx catalyst rises. When the reducing agent has been supplied in the control amount from the supplying unit prior to the temperature rise of the NOx catalyst, it can be assumed that an amount of ammonia more or less equal to the saturated adsorption amount had been adsorbed by the NOx catalyst at that point. In addition, when the saturated adsorption amount of the NOx catalyst declines due to a temperature rise of the NOx catalyst, ammonia in an amount exceeding the declined saturated adsorption amount flows out from the NOx catalyst. Therefore, in this case, it is expected that the actual concentration is to relatively increase and the calculated NOx purification rate is to relatively decrease. For this reason, by setting an appropriate threshold, it can be determined that the reducing agent had actually been supplied in the control amount prior to the temperature rise and a diagnosis can be made that the supplying unit is in a normal state when a NOx purification rate equal to or lower than the threshold is calculated. Moreover, for example, the threshold can be set to an upper limit value of an actual NOx purification rate after temperature rise when it is assumed that the reducing agent has been supplied in the control amount from the supplying unit prior to the temperature rise. The upper limit value can be set based on the saturated adsorption amount of the NOx catalyst or the like.

In addition, in the two cases described above, the NOx concentration estimating unit may estimate a NOx concentration in exhaust gas that flows out from the selective catalytic reduction NOx catalyst when assuming that the supplying unit is in a normal state, the ammonia concentration estimating unit may estimate an ammonia concentration in the exhaust gas that flows out from the selective catalytic reduction NOx catalyst when assuming that the supplying unit is in a normal state, the calculating unit may calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit can correct the threshold by adding, from the threshold, an amount of rise of a NOx purification rate which is calculated based on the amount of decline in output when assuming that the supplying unit is in a normal state.

When the supplying unit is being controlled so that the output value of the sensor rises due to a rise in an ammonia concentration in exhaust gas that flows out from the NOx catalyst or when the output value of the sensor is rising due to an increase in an ammonia slip that is attributable to a temperature rise of the NOx catalyst, an amount of ammonia that flows out from the NOx catalyst is larger when the supplying unit is in a normal state than when the supplying unit is in an abnormal state. Therefore, when the supplying unit is in a normal state, an amount of decline in output of the sensor may increase due to a relative increase in actual concentration as compared to when the supplying unit is in an abnormal state. In consideration thereof, the diagnostic apparatus according to the present invention calculates an amount of decline in output of the sensor by assuming a state where the amount of decline in output of the sensor is to increase. Accordingly, the NOx purification rate can be prevented from becoming higher than the threshold even if an actual output value of the sensor declines significantly and a calculated NOx purification rate rises significantly when the supplying unit is actually in a normal state. As a result, the supplying unit in a normal state can be prevented from being incorrectly diagnosed to be in an abnormal state. Moreover, instead of correcting the threshold by adding the amount of rise of the NOx purification rate to the threshold, the NOx purification rate may be corrected by subtracting the amount of rise of the NOx purification rate from the NOx purification rate. Furthermore, the threshold or the NOx purification rate may be corrected by multiplying the threshold or the NOx purification rate by a correction coefficient.

Moreover, in the two cases described above, the NOx concentration estimating unit may estimate a NOx concentration in exhaust gas that flows out from the selective catalytic reduction NOx catalyst when assuming that the supplying unit is in an abnormal state, the ammonia concentration estimating unit may estimate an ammonia concentration in the exhaust gas that flows out from the selective catalytic reduction NOx catalyst when assuming that the supplying unit is in an abnormal state, the calculating unit may calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit can correct the threshold by adding, to the threshold, a value which is equal to or larger than an amount of rise of a NOx purification rate calculated based on the amount of decline in output when assuming that the supplying unit is in a normal state and, at the same time, which is equal to or smaller than a sum value of the amount of rise of a NOx purification rate calculated based on the amount of decline in output when assuming that the supplying unit is in a normal state and the amount of rise of a NOx purification rate calculated based on the amount of decline in output when assuming that the supplying unit is in an abnormal state.

When the supplying unit is in an abnormal state, unpurified NOx may flow out from the NOx catalyst due to the reducing agent not being supplied in an appropriate amount. In addition, ammonia adsorbed by the NOx catalyst may flow out due to an ammonia slip. However, a decline in the output of the sensor is more prominent when the NOx catalyst is in a normal state than when the NOx catalyst is in an abnormal state. In consideration thereof, since a decline in output of the sensor in both a normal state and an abnormal state of the supplying unit can be taken into consideration by further considering an amount of rise of a NOx purification rate that is based on the amount of decline in output of the sensor when assuming that the supplying unit is in an abnormal state, an accuracy of diagnosis can be increased.

In addition, the diagnosis control unit:

may perform a diagnosis of the supplying unit when the amount of decline in output of the sensor as calculated by the calculating unit is equal to or smaller than a prescribed amount; and may not perform a diagnosis of the supplying unit when the amount of decline in output of the sensor as calculated by the calculating unit is larger than the prescribed amount.

Since concentrations of NOx and ammonia that flow out from the NOx catalyst may increase depending on the operating state of the internal combustion engine and on a supply amount of the reducing agent, the amount of decline in output of the sensor as calculated by the calculating unit may increase. Therefore, even in a case where it is expected that an output value of the sensor is to relatively increase due to an increase in unpurified NOx that flows out from the NOx catalyst such as when the reducing agent is not being supplied in an amount appropriate for NOx purification, an actual output value of the sensor may decline significantly. In addition, even in a case where it is expected that the output value of the sensor is to relatively increase due to an increase in ammonia that flows out from the NOx catalyst such as when an outflow rate of ammonia due to an ammonia slip is temporarily increased, an actual output value of the sensor may decline significantly. In other words, in either case, since the actual output value of the sensor may decline significantly from the actual concentration described earlier, accuracy of a diagnosis of the supplying unit based on an output value of the sensor may decline. Furthermore, since the greater the amount of decline in output of the sensor, the greater a deviation of the actual output value from the actual concentration, the accuracy of a diagnosis may further decline. In contrast, the diagnostic apparatus according to the present invention performs a diagnosis of the supplying unit when the amount of decline in output of the sensor is equal to or smaller than a prescribed amount and does not perform a diagnosis of the supplying unit when the amount of decline in output of the sensor is larger than the prescribed amount. Accordingly, a diagnosis of the supplying unit is no longer performed when there is a risk that diagnostic accuracy may decline. As a result, since an incorrect diagnosis can be prevented, a decline in diagnostic accuracy can be prevented. Moreover, the prescribed amount may be set by an experiment or the like in advance so that sufficient diagnostic accuracy is secured. In addition, not performing a diagnosis of the supplying unit includes, for example, reading an output value of the sensor but not performing a diagnosis using the output value. Furthermore, not performing a diagnosis of the supplying unit includes, for example, performing a diagnosis based on an output value of the sensor but canceling a result of the diagnosis. Moreover, not performing a diagnosis of the supplying unit includes, for example, not reading an output value of the sensor.

In addition, the diagnosing unit may diagnose the supplying unit by comparing the output value of the sensor with a threshold, and the diagnosis control unit may correct the output value of the sensor based on the amount of decline in output or correct the threshold based on the amount of decline in output.

When the reducing agent is actually being supplied in the control amount in a case where the supplying unit is controlled so that unpurified NOx flowing out from the NOx catalyst decreases, it is expected that the actual concentration is to relatively decrease. Therefore, by setting an appropriate threshold, it can be determined that the reducing agent is actually being supplied only in a smaller amount than the control amount and a diagnosis can be made that the supplying unit is in an abnormal state when a value larger than the threshold is output from the sensor. In addition, when the reducing agent is actually being supplied in the control amount in a case where the supplying unit is controlled so that ammonia flowing out from the NOx catalyst due to an ammonia slip increases, it is expected that the actual concentration is to relatively increase. Therefore, by setting an appropriate threshold, it can be determined that the reducing agent is actually being supplied in the control amount and a diagnosis can be made that the supplying unit is in a normal state when a value larger than the threshold is output from the sensor. In this manner, in either case, the supplying unit can be diagnosed by comparing the output value of the sensor with the threshold.

However, as described earlier, an actual output value of the sensor may become lower than an actual concentration due to an influence of a decline in the output. Therefore, even when an actual concentration is higher than a threshold, an actual output value of the sensor may become equal to or smaller than the threshold due to a decline in output of the sensor. In this case, there is a risk of the diagnosing unit making an erroneous diagnosis. In consideration thereof, according to the present invention, the threshold or the output value of the sensor is corrected based on an amount of decline in output of the sensor. Accordingly, since the influence due to a decline in output of the sensor can be reflected onto the threshold or the output value of the sensor, the diagnosing unit can be prevented from making an incorrect diagnosis. Moreover, the threshold may be set based on an actual concentration when the supplying unit is in a normal state.

In addition, the diagnosis control unit can correct the threshold by subtracting the amount of decline in output from the threshold.

In other words, by reducing the threshold by an amount of decline in output of the sensor, a magnitude relationship between the output value and the threshold can be prevented from changing even if a value representing a decline in output is output from the sensor. As a result, the diagnosing unit can be prevented from making an incorrect diagnosis. Alternatively, the threshold can be corrected by multiplying the threshold by a correction coefficient based on the amount of decline in output.

In addition, the diagnosis control unit can correct the output value of the sensor by adding the amount of decline in output to the output value of the sensor.

In other words, by increasing the output value by the amount of decline in output of the sensor, a magnitude relationship between the output value and the threshold can be prevented from changing even if a value representing a decline in output is output from the sensor. As a result, the diagnosing unit can be prevented from making an incorrect diagnosis. Alternatively, the output value of the sensor can be corrected by multiplying the output value of the sensor by a correction coefficient based on the amount of decline in output.

Moreover, when the control unit is controlling the supplying unit so that the output value of the sensor declines due to a decline in a NOx concentration in exhaust gas that flows out from the selective catalytic reduction NOx catalyst, the diagnosing unit can:

diagnose that the supplying unit is in an abnormal state when the output value of the sensor is larger than the threshold; and diagnose that the supplying unit is in a normal state when the output value of the sensor is equal to or smaller than the threshold.

A case where the control unit is controlling the supplying unit so that the output value of the sensor declines due to a decline in the NOx concentration in exhaust gas that flows out from the NOx catalyst is, for example, a case where the control unit is controlling the supplying unit to supply the reducing agent in an amount that is appropriate for NOx purification. In this case, for example, the threshold can be set to an upper limit value of an actual concentration that is expected when the reducing agent is supplied from the supplying unit in the control amount. Accordingly, when an actual output value from the sensor is larger than the threshold, it can be determined that the reducing agent is actually being supplied only in a smaller amount than the control amount and a diagnosis can be made that the supplying unit is in an abnormal state.

In addition, in the case described above, the NOx concentration estimating unit may estimate a NOx concentration in exhaust gas that flows out from the selective catalytic reduction NOx catalyst when assuming that the supplying unit is in an abnormal state, the ammonia concentration estimating unit may estimate an ammonia concentration in the exhaust gas that flows out from the selective catalytic reduction NOx catalyst when assuming that the supplying unit is in an abnormal state, the calculating unit may calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit can correct the threshold by subtracting, from the threshold, the amount of decline in output when assuming that the supplying unit is in an abnormal state.

When the supplying unit is being controlled so that an output value of the sensor declines due to a decline in the NOx concentration in exhaust gas that flows out from the NOx catalyst, an amount of unpurified NOx that flows out from the NOx catalyst is larger when the supplying unit is in an abnormal state than when the supplying unit is in a normal state. Therefore, when the supplying unit is in an abnormal state, an amount of decline in output of the sensor may increase due to a relative increase in actual concentration as compared to when the supplying unit is in a normal state. In consideration thereof, the diagnostic apparatus according to the present invention calculates the amount of decline in output of the sensor by assuming a state where the amount of decline in output of the sensor is to increase. Accordingly, when the supplying unit is actually in an abnormal state, an actual output value of the sensor can be prevented from becoming equal to or smaller than the threshold even if the actual output value of the sensor declines significantly. As a result, the supplying unit in an abnormal state can be prevented from being incorrectly diagnosed to be in a normal state. Moreover, instead of correcting the threshold by subtracting the amount of decline in output from the threshold, an output value of the sensor may be corrected by adding the amount of decline in output to the output value of the sensor. Furthermore, the threshold or the output value of the sensor may be corrected by multiplying the threshold or the output value of the sensor by a correction coefficient.

Moreover, in this case, the NOx concentration estimating unit may estimate a NOx concentration in exhaust gas that flows out from the selective catalytic reduction NOx catalyst when assuming that the supplying unit is in a normal state, the ammonia concentration estimating unit may estimate an ammonia concentration in the exhaust gas that flows out from the selective catalytic reduction NOx catalyst when assuming that the supplying unit is in a normal state, the calculating unit may calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit can correct the threshold by subtracting, from the threshold, a value which is equal to or larger than the amount of decline in output when assuming that the supplying unit is in an abnormal state and, at the same time, which is equal to or smaller than a sum value of the amount of decline in output when assuming that the supplying unit is in an abnormal state and the amount of decline in output when assuming that the supplying unit is in a normal state.

Even when the supplying unit is in a normal state, unpurified NOx and ammonia due to an ammonia slip may flow out from the NOx catalyst. However, a decline in the output of the sensor is more prominent when the NOx catalyst is in an abnormal state than when the NOx catalyst is in a normal state. In consideration thereof, since a decline in output of the sensor in both a normal state and an abnormal state of the supplying unit can be taken into consideration by further considering an amount of decline in output of the sensor when assuming that the supplying unit is in a normal state, an accuracy of diagnosis can be increased.

In addition, when the control unit is controlling the supplying unit so that the output value of the sensor rises due to a rise in an ammonia concentration in exhaust gas that flows out from the selective catalytic reduction NOx catalyst, the diagnosing unit can:

diagnose that the supplying unit is in a normal state when the output value of the sensor is larger than the threshold; and diagnose that the supplying unit is in an abnormal state when the output value of the sensor is equal to or smaller than the threshold.

A case where the control unit is controlling the supplying unit so that an output value of the sensor rises due to a rise in the ammonia concentration in exhaust gas that flows out from the NOx catalyst is, for example, a case where the control unit is controlling the supplying unit to supply the reducing agent in an amount that exceeds an ammonia adsorption capability of the NOx catalyst. In this case, for example, the threshold can be set to a lower limit value of an actual concentration that is expected when the reducing agent is supplied from the supplying unit in the control amount. Accordingly, when an actual output value from the sensor is larger than the threshold, it can be determined that the reducing agent is actually being supplied in the control amount and a diagnosis can be made that the supplying unit is in a normal state.

In addition, when the output value of the sensor is rising due to a rise in an ammonia concentration in exhaust gas that flows out from the selective catalytic reduction NOx catalyst which is attributable to a temperature rise of the selective catalytic reduction NOx catalyst, the diagnosing unit may:

diagnose that the supplying unit is in a normal state when the output value of the sensor is larger than the threshold; and diagnose that the supplying unit is in an abnormal state when the output value of the sensor is equal to or smaller than the threshold.

An amount of ammonia adsorbable by a NOx catalyst has an upper limit amount referred to as a saturated adsorption amount. The saturated adsorption amount characteristically declines as the temperature of the NOx catalyst rises. When the reducing agent has been supplied in the control amount from the supplying unit prior to the temperature rise of the NOx catalyst, it can be assumed that an amount of ammonia more or less equal to the saturated adsorption amount had been adsorbed by the NOx catalyst at that point. In addition, when the saturated adsorption amount of the NOx catalyst declines due to a temperature rise of the NOx catalyst, ammonia in an amount exceeding the declined saturated adsorption amount flows out from the NOx catalyst. Therefore, in this case, it is expected that an actual concentration is to relatively increase. For this reason, by setting an appropriate threshold, it can be determined that the control amount of the reducing agent had actually been supplied prior to the temperature rise and a diagnosis can be made that the supplying unit is in a normal state when a value larger than the threshold is output from the sensor. Moreover, the threshold can be set to a lower limit value of an actual concentration after temperature rise when it is assumed that the reducing agent has been supplied in the control amount from the supplying unit prior to the temperature rise. The lower limit value can be set based on the saturated adsorption amount of the NOx catalyst or the like.

In addition, in the two cases described above, the NOx concentration estimating unit may estimate a NOx concentration in exhaust gas that flows out from the selective catalytic reduction NOx catalyst when assuming that the supplying unit is in a normal state, the ammonia concentration estimating unit may estimate an ammonia concentration in the exhaust gas that flows out from the selective catalytic reduction NOx catalyst when assuming that the supplying unit is in a normal state, the calculating unit may calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit can correct the threshold by subtracting, from the threshold, the amount of decline in output when assuming that the supplying unit is in a normal state.

When the supplying unit is being controlled so that an output value of the sensor rises due to a rise in the ammonia concentration in exhaust gas that flows out from the NOx catalyst or when the output value of the sensor is rising due to an increase in an ammonia slip attributable to a temperature rise of the NOx catalyst, an amount of ammonia that flows out from the NOx catalyst is larger when the supplying unit is in a normal state than when the supplying unit is in an abnormal state. Therefore, when the supplying unit is in a normal state, an amount of decline in output of the sensor may increase due to a relative increase in actual concentration as compared to when the supplying unit is in an abnormal state. In consideration thereof, the diagnostic apparatus according to the present invention calculates an amount of decline in output of the sensor by assuming a state where the amount of decline in output of the sensor is to increase. Accordingly, when the supplying unit is actually in a normal state, an actual output value of the sensor can be prevented from becoming equal to or smaller than the threshold even if the actual output value of the sensor declines significantly. As a result, the supplying unit in a normal state can be prevented from being diagnosed to be in an abnormal state. Moreover, instead of correcting the threshold by subtracting the amount of decline in output from the threshold, an output value of the sensor may be corrected by adding the amount of decline in output to the output value of the sensor. Furthermore, the threshold or the output value of the sensor may be corrected by multiplying the threshold or the output value of the sensor by a correction coefficient.

Moreover, in the two cases described above, the NOx concentration estimating unit may estimate a NOx concentration in exhaust gas that flows out from the selective catalytic reduction NOx catalyst when assuming that the supplying unit is in an abnormal state, the ammonia concentration estimating unit may estimate an ammonia concentration in the exhaust gas that flows out from the selective catalytic reduction NOx catalyst when assuming that the supplying unit is in an abnormal state, the calculating unit may calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit can correct the threshold by subtracting, from the threshold, a value which is equal to or larger than the amount of decline in output when assuming that the supplying unit is in a normal state and, at the same time, which is equal to or smaller than a sum value of the amount of decline in output when assuming that the supplying unit is in a normal state and the amount of decline in output when assuming that the supplying unit is in an abnormal state.

When the supplying unit is in an abnormal state, unpurified NOx may flow out from the NOx catalyst due to the reducing agent not being supplied in an appropriate amount. In addition, ammonia adsorbed by the NOx catalyst may flow out due to an ammonia slip. However, a decline in the output of the sensor is more prominent when the NOx catalyst is in a normal state than when the NOx catalyst is in an abnormal state. In consideration thereof, since a decline in output of the sensor in both a normal state and an abnormal state of the supplying unit can be taken into consideration by further considering an amount of decline in output of the sensor when assuming that the supplying unit is in an abnormal state, an accuracy of diagnosis can be increased.

Advantageous Effects of Invention

According to the present invention, since an incorrect diagnosis can be prevented in a diagnosis of a supply apparatus that supplies a reducing agent to a selective catalytic reduction NOx catalyst, a decline in diagnostic accuracy can be prevented.

DESCRIPTION OF EMBODIMENTS

Hereinafter, modes for implementing the present invention will be described in detail by way of example of embodiments with reference to the drawings. However, it is to be understood that dimensions, materials, shapes, relative arrangements, and the like of components described in the embodiments are not intended to limit the scope of the invention thereto unless otherwise noted.

First Embodiment

Figure 1:
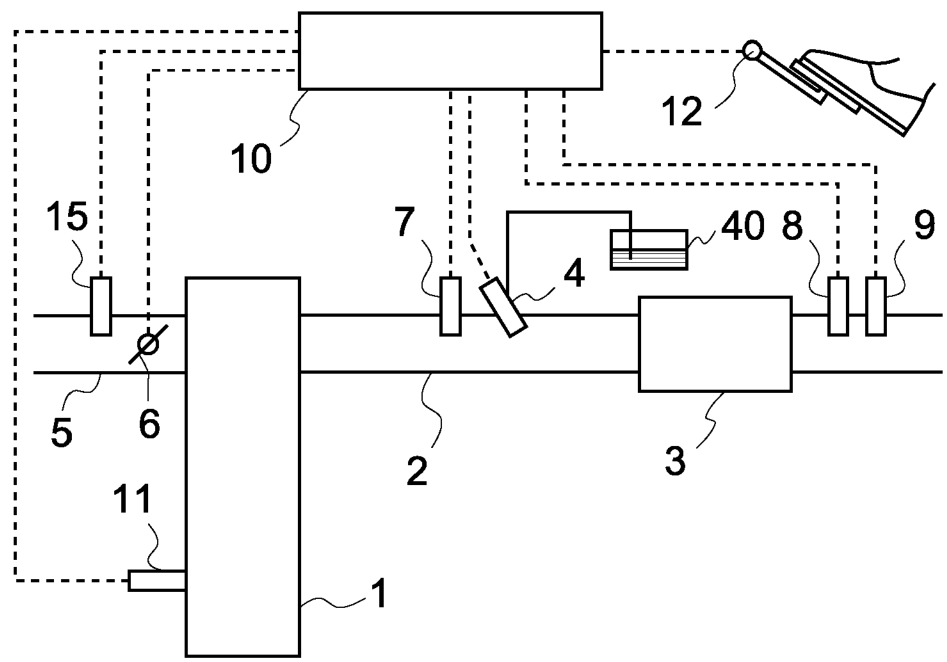
FIG. 1 is a diagram illustrating a schematic configuration of an internal combustion engine, and an air intake system and an exhaust system thereof, according to an embodiment.

FIG. 1 is a diagram illustrating a schematic configuration of an internal combustion engine, and an air intake system and an exhaust system thereof, according to the present embodiment. An internal combustion engine 1 is a diesel engine for driving a vehicle. An exhaust passage 2 is connected to the internal combustion engine 1. A selective catalytic reduction NOx catalyst 3 (hereinafter, referred to as a "NOx catalyst 3") which uses ammonia as a reducing agent to selectively reduce NOx in exhaust gas is provided in the exhaust passage 2.

In addition, an injection valve 4 as a supplying unit which supplies a reducing agent to exhaust gas that flows into the NOx catalyst 3 is provided in the exhaust passage 2 on an upstream side of the NOx catalyst 3. Urea water which is an ammonia precursor is used as the reducing agent. Urea water is stored in a tank 40 connected to the injection valve 4 and is supplied to the injection valve 4 by a pump or the like (not shown). Urea water injected from the injection valve 4 is hydrolyzed by heat of exhaust gas or heat from the NOx catalyst 3 and becomes ammonia ($NH_3$) to be adsorbed by the NOx catalyst 3. The ammonia is used as a reducing agent at the NOx catalyst 3. Alternatively, the injection valve 4 may inject ammonia. In other words, a substance that changes to ammonia or ammonia may be supplied from the injection valve 4. The substance that changes to ammonia or ammonia may be supplied in any of a gaseous state, a liquid state, and a solid state.

Furthermore, an upstream side NOx sensor 7 which detects NOx in exhaust gas that flows into the NOx catalyst 3 and which outputs a NOx concentration in the exhaust gas is provided on an upstream side of the NOx catalyst 3. In addition, a downstream side NOx sensor 8 which detects NOx in exhaust gas that flows out from the NOx catalyst 3 and which outputs a NOx concentration in the exhaust gas and a temperature sensor 9 which detects and outputs an exhaust temperature are provided on a downstream side of the NOx catalyst 3. Moreover, in the present embodiment, the downstream side NOx sensor 8 corresponds to the sensor according to the present invention. Although details will be provided later, the downstream side NOx sensor 8 is capable of detecting ammonia in addition to NOx. Therefore, the downstream side NOx sensor 8 outputs a sum value of a NOx concentration and an ammonia concentration in exhaust gas that flows out from the NOx catalyst 3. Moreover, a selective catalytic reduction NOx catalyst can be further provided on a downstream side of the downstream side NOx sensor 8.

In addition, an intake passage 5 is connected to the internal combustion engine 1. A throttle 6 that adjusts an intake air amount of the internal combustion engine 1 is provided midway along the intake passage 5. Furthermore, an air flow meter 15 that detects an intake air amount of the internal combustion engine 1 is attached to the intake passage 5 on an upstream side of the throttle 6.

Furthermore, an ECU 10 that is an electronic control unit is annexed to the internal combustion engine 1. The ECU 10 controls an operating state of the internal combustion engine 1, an exhaust gas purification apparatus, and the like. The upstream side NOx sensor 7, the downstream side NOx sensor 8, the temperature sensor 9, and the air flow meter 15 described above as well as a crank position sensor 11 and an accelerator depression amount sensor 12 are electrically connected to the ECU 10. Accordingly, output values of the respective sensors are sent to the ECU 10.

Therefore, the ECU 10 is capable of determining an operating state of the internal combustion engine 1 such as an engine rotational speed based on detection by the crank position sensor 11 and an engine load based on detection by the accelerator depression amount sensor 12. Moreover, while NOx in exhaust gas that flows into the NOx catalyst 3 can be detected by the upstream side NOx sensor 7 in the present embodiment, since NOx included in exhaust gas discharged from the internal combustion engine 1 (which is exhaust gas prior to being purified by the NOx catalyst 3 and which is the exhaust gas that flows into the NOx catalyst 3) is related to an operating state of the internal combustion engine 1, the NOx in the exhaust gas that flows into the NOx catalyst 3 can also be estimated based on the operating state of the internal combustion engine 1. In addition, the ECU 10 is capable of estimating a temperature of the NOx catalyst 3 based on an exhaust temperature detected by the temperature sensor 9 or by a temperature sensor provided on an upstream side of the NOx catalyst 3. Furthermore, the ECU 10 is also capable of estimating a temperature of the NOx catalyst 3 based on an operating state of the internal combustion engine 1.

In addition, in accordance with a detected or estimated NOx concentration (or a NOx amount) in exhaust gas, the ECU 10 issues instructions to the injection valve 4 and controls the injection valve 4 so as to cause a reducing agent to be supplied to exhaust gas in an amount appropriate for reducing NOx. In other words, in the present embodiment, the ECU 10 corresponds to the control unit according to the present invention.

Furthermore, the ECU 10 diagnoses whether the injection valve 4 is in a normal state or an abnormal state based on a transition of output values of the downstream side NOx sensor 8. In this case, a normal state refers to a state where urea water is being supplied by the injection valve 4 in an amount controlled by the ECU 10 or in an amount that accounts for a prescribed proportion or more of the controlled amount (hereinafter, also collectively referred to as a "control amount"). In addition, an abnormal state refers to a state where the injection valve 4 is only supplying urea water in a smaller amount than the control amount. In other words, since an injection capability of the injection valve 4 may decline due to a failure or deterioration over time, the injection valve 4 may become only capable of supplying urea water in an amount smaller than the control amount. When the injection valve 4 is only supplying urea water in an amount smaller than the control amount despite being controlled to supply urea water in an amount appropriate for NOx purification, unpurified NOx that flows out from the NOx catalyst 3 increases. Therefore, the NOx concentration in exhaust gas on a downstream side of the NOx catalyst 3 becomes higher than an expected concentration.

Accordingly, the ECU 10 calculates a NOx purification rate of the NOx catalyst 3 based on an output value of the downstream side NOx sensor 8, diagnoses that the injection valve 4 is in an abnormal state when the NOx purification rate is lower than a threshold, and diagnoses that the injection valve 4 is in a normal state when the NOx purification rate is equal to or higher than the threshold. The NOx purification rate of the NOx catalyst 3 is a ratio of a NOx concentration that decreases due to purification of NOx at the NOx catalyst 3 with respect to a NOx concentration in exhaust gas that flows into the NOx catalyst 3. A NOx concentration that decreases due to purification of NOx at the NOx catalyst 3 is a value obtained by subtracting a NOx concentration on a downstream side of the NOx catalyst 3 from a NOx concentration on an upstream side of the NOx catalyst 3. In addition, a NOx concentration on the downstream side of the NOx catalyst 3 is an output value of the downstream side NOx sensor 8. Furthermore, a NOx concentration on the upstream side of the NOx catalyst 3 is estimated based on, for example, the operating state of the internal combustion engine 1. As described above, when the NOx concentration in exhaust gas on the downstream side of the NOx catalyst 3 rises, a NOx purification rate that is calculated based on the output value of the downstream side NOx sensor 8 declines. In addition, the threshold in this case is an actual NOx purification rate of the NOx catalyst 3 when the injection valve 4 is on a border between a normal state and an abnormal state. Moreover, before performing a diagnosis of the injection valve 4, other devices such as the NOx catalyst 3 and the downstream side NOx sensor 8 may be checked using known techniques to determine whether the devices are in their normal states.

Figure 2:
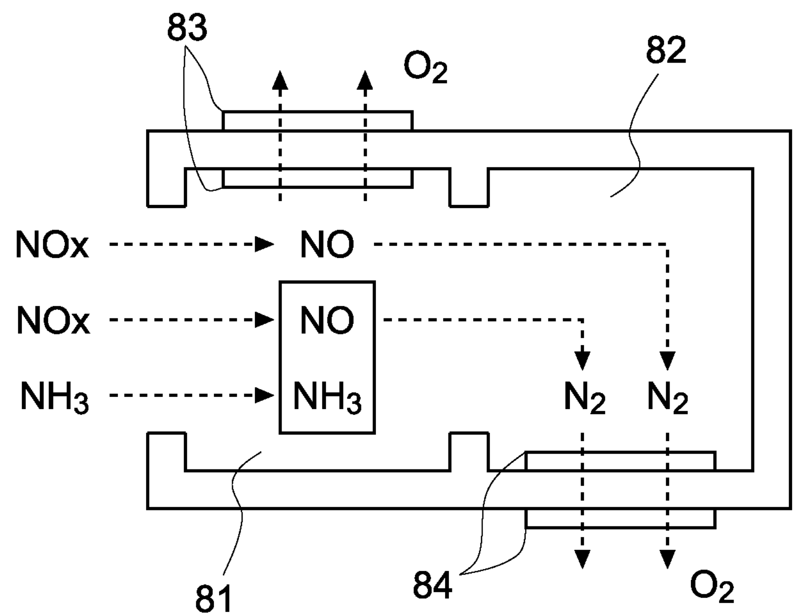
FIG. 2 is a diagram illustrating a schematic configuration of a detecting unit of a downstream side NOx sensor according to an embodiment.

As described earlier, the downstream side NOx sensor 8 detects ammonia together with NOx in exhaust gas. Since ammonia reacts with oxygen at the downstream side NOx sensor 8 to create nitrogen monoxide, the ammonia is detected as NOx. Therefore, when ammonia is contained in exhaust gas that flows into a detecting unit of the downstream side NOx sensor 8, the ammonia is detected as NOx. With a general downstream side NOx sensor 8 using a Pt electrode, since NOx and ammonia further react with each other at the electrode, NOx and ammonia decrease. FIG. 2 is a diagram illustrating a schematic configuration of a detecting unit of the downstream side NOx sensor 8 according to the present embodiment. The downstream side NOx sensor 8 is configured to include a first chamber 81 into which exhaust gas flows from the exhaust passage 2 and a second chamber 82 connected to the first chamber 81. An oxygen pump (electrodes) 83 is provided in the first chamber 81 and a monitor cell (electrodes) 84 is provided in the second chamber 82. In the first chamber 81, oxygen in exhaust gas is removed by the oxygen pump 83. In addition, in the first chamber 81, nitrogen dioxide in exhaust gas is reduced to nitrogen monoxide. Therefore, nitrogen monoxide flows into the second chamber 82. Furthermore, in the second chamber 82, nitrogen monoxide is decomposed into nitrogen and oxygen and an amount of oxygen created by the decomposition is measured by the monitor cell 84. In addition, as described earlier, since ammonia may react with oxygen and become nitrogen monoxide at the downstream side NOx sensor 8 or, more specifically, at the oxygen pump 83 in the first chamber 81, the ammonia is detected as NOx. Therefore, a current flowing through the monitor cell 84 has a value in accordance with concentrations of NOx and ammonia. However, when NOx and ammonia are contained in exhaust gas, nitrogen monoxide and ammonia react with each other on the oxygen pump 83. In addition, an output value of the downstream side NOx sensor 8 becomes a value that is output after NOx and ammonia decrease on the oxygen pump 83. Therefore, when NOx and ammonia are present in exhaust gas, the output value of the downstream side NOx sensor 8 may fall below a value corresponding to a sum value of an actual NOx concentration and an actual ammonia concentration (hereinafter, also referred to as an "actual concentration") in exhaust gas that flows out from the NOx catalyst 3. Moreover, this phenomenon is not limited to a sensor with the structure shown in FIG. 2 and may occur at any sensor where ammonia and NOx can react with each other.

Figure 3:
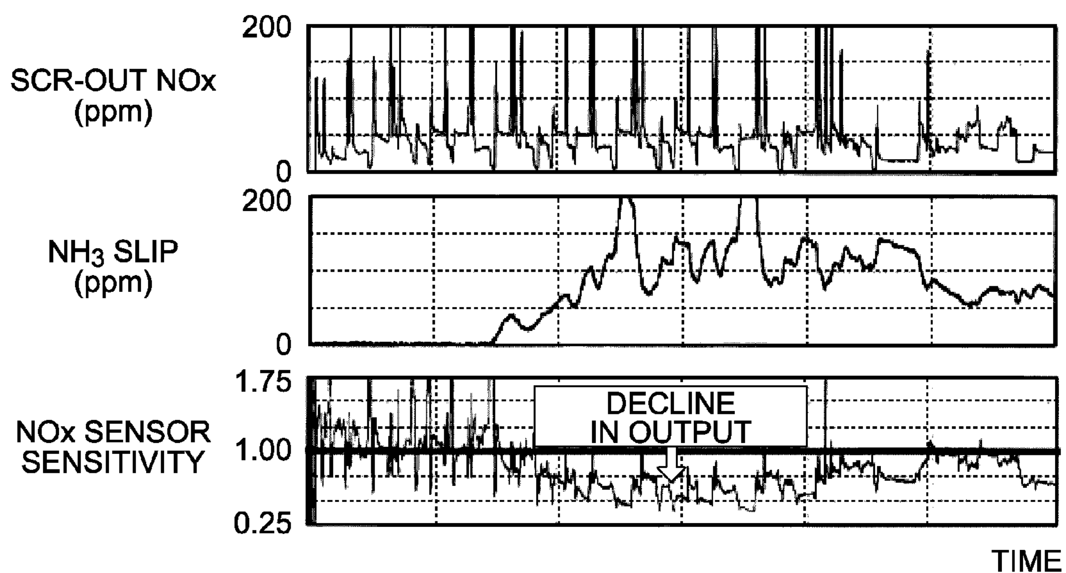
FIG. 3 is a diagram indicating transitions of a concentration of NOx (SCR-out NOx) and a concentration of ammonia ($NH_3$ slip) in exhaust gas that flows out from a NOx catalyst, and sensitivity of a downstream side NOx sensor (NOx sensor sensitivity).

FIG. 3 is a diagram indicating transitions of an actual NOx concentration in exhaust gas that flows out from the NOx catalyst 3 (SCR-out NOx), an actual ammonia concentration in exhaust gas that flows out from the NOx catalyst 3 ($NH_3$ slip), and sensitivity of the downstream side NOx sensor 8 (NOx sensor sensitivity). A horizontal axis represents time. NOx sensor sensitivity is a value obtained by dividing an output value of the downstream side NOx sensor 8 by a sum value of the SCR-out NOx and the $NH_3$ slip (in other words, an actual concentration).

If the downstream side NOx sensor 8 is able to accurately output concentrations of NOx and ammonia, the sensitivity of the downstream side NOx sensor 8 is 1. However, in reality, the sensitivity of the downstream side NOx sensor 8 falls below 1 when NOx and ammonia are present. In other words, since the output value of the downstream side NOx sensor 8 decreases by an amount corresponding to the decrease in NOx and ammonia due to a reaction thereof in the sensor, the sensitivity of the downstream side NOx sensor 8 declines. Due to the decline in the output value of the downstream side NOx sensor 8, the NOx purification rate that is calculated based on the output value of the downstream side NOx sensor 8 apparently rises.

Therefore, if a diagnosis of the injection valve 4 is performed when sensitivity of the downstream side NOx sensor 8 has declined, there is a risk that the calculated NOx purification rate becomes equal to or higher than a threshold despite the injection valve 4 being in an abnormal state. In other words, there is a risk that the injection valve 4 is incorrectly diagnosed to be in a normal state despite being in an abnormal state. In consideration thereof, when performing a diagnosis of the injection valve 4, the ECU 10 obtains an amount of decline in output of the downstream side NOx sensor 8 in accordance with the NOx concentration and the ammonia concentration in exhaust gas that flows out from the NOx catalyst 3 and corrects a threshold for performing a diagnosis of the injection valve 4 based on the amount of decline in output. Moreover, the amount of decline in output is an amount of decline with respect to an output value corresponding to a sum value of an actual NOx concentration and an actual ammonia concentration (in other words, an actual concentration) in exhaust gas that flows out from the NOx catalyst 3 and flows into the downstream side NOx sensor 8. The NOx concentration and the ammonia concentration in exhaust gas that flows into the downstream side NOx sensor 8 can be assumed to be equal to the NOx concentration and the ammonia concentration in exhaust gas that flows out from the NOx catalyst 3. In addition, the amount of decline in output corresponds to output that has decreased due to the reaction between NOx and ammonia at the downstream side NOx sensor 8.

In this case, an amount of decline in output of the downstream side NOx sensor 8 is related to a reaction rate of NOx and ammonia at the downstream side NOx sensor 8. A reaction rate can be expressed by concentrations of reactants and a coefficient that is determined in accordance with a material of a sensor element (electrode) of the downstream side NOx sensor 8 and the like. Moreover, as will be described later, the NOx that reacts with ammonia at the downstream side NOx sensor 8 includes NOx contained in exhaust gas to begin with as well as NOx created by oxidation of ammonia at the oxygen pump 83 of the downstream side NOx sensor 8.

First, a reaction between NOx created by the oxidation of ammonia and ammonia will be described. An amount of decline in output of the downstream side NOx sensor 8 due to the reaction between NOx created by the oxidation of ammonia and ammonia is related to a rate at which ammonia is oxidized to NOx and to a rate at which the NOx is oxidized by other ammonia. In addition, the higher the ammonia concentration, the higher the oxidation rate of ammonia. Therefore, an oxidation rate when ammonia is oxidized can be expressed by the following equation.

$$\text{Oxidation rate}=k1[NH_3] \qquad \text{(Equation 1)}$$

Moreover, k1 is a coefficient and is a value determined by a material of a sensor element or the like. In addition, $[NH_3]$ denotes an ammonia concentration in exhaust gas that flows into the downstream side NOx sensor 8.

In addition, the higher a reduction rate of NOx, the larger the amount of decline in output of the downstream side NOx sensor 8. Furthermore, the higher the concentration of NOx or ammonia, the larger the amount of decline in output of the downstream side NOx sensor 8 since NOx is more readily reduced by ammonia.

In other words, a reduction rate when NOx created by the oxidation of ammonia and ammonia react with each other can be expressed by the following equation.

$$\text{Reduction rate}=k2(k1[NH_3]\times[NH_3]) \qquad \text{(Equation 2)}$$

Moreover, k2 is a coefficient and is a value determined by a material of a sensor element or the like.

Next, a reaction between NOx contained in exhaust gas to begin with (in other words, NOx having flowed out from the NOx catalyst 3) and ammonia will be described. When NOx contained in exhaust gas to begin with is reduced by ammonia, since the higher the NOx concentration and the higher the ammonia concentration, the higher the reaction rate, the larger the amount of decline in output of the downstream side NOx sensor 8. Therefore, a reduction rate when NOx contained in exhaust gas to begin with is reduced by ammonia can be expressed by the following equation.

$$\text{Reduction rate}=k3[\text{NO}x]\times[\text{NH}_3] \quad \text{(Equation 3)}$$

Moreover, k3 is a coefficient and is a value determined by a material of a sensor or the like. In addition, [NOx] denotes the NOx concentration in exhaust gas that flows into the downstream side NOx sensor 8.

In addition, the amount of decline in output of the downstream side NOx sensor 8 can be expressed by the following equation as a value related to k1, k2, k3, [NOx], and [$NH_3$].

$$\text{Amount of decline in output}=F(k1,k2,k3,[\text{NO}x],[\text{NH}_3]) \quad \text{(Equation 4)}$$

Since k1, k2, and k3 can be obtained by an experiment or the like in advance, the amount of decline in output of the downstream side NOx sensor 8 can be calculated based on concentrations of NOx and ammonia in exhaust gas that flows out from the NOx catalyst 3. This relationship can be obtained by an experiment, a simulation, or the like in advance.

Figure 4:
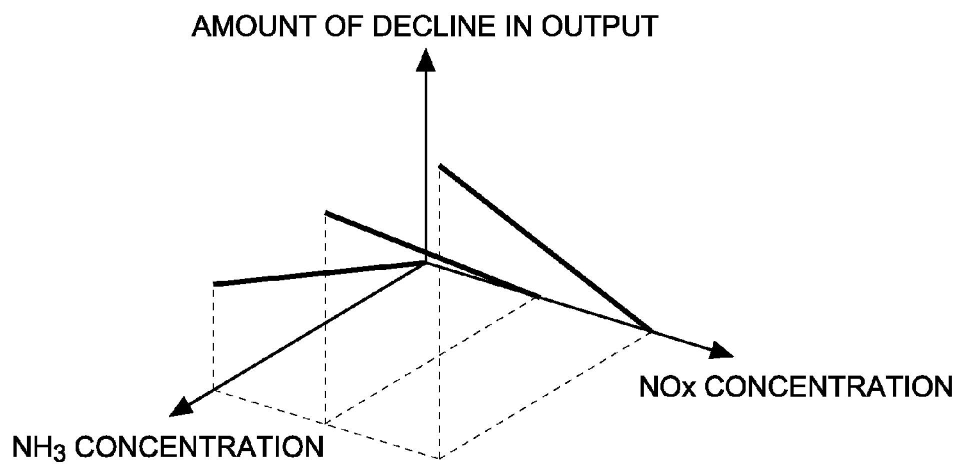
FIG. 4 is a diagram indicating a relationship among an ammonia ($NH_3$) concentration, a NOx concentration, and an amount of decline in output of a downstream side NOx sensor.

FIG. 4 is a diagram indicating a relationship among an ammonia ($NH_3$) concentration in exhaust gas that flows into the downstream side NOx sensor 8, a NOx concentration in the exhaust gas, and an amount of decline in output of the downstream side NOx sensor 8. The higher the NOx concentration and the higher the ammonia concentration, the larger the amount of decline in output of the downstream side NOx sensor 8. For example, by obtaining the relationship shown in FIG. 4 by an experiment, a simulation, or the like, and mapping and storing the relationship in the ECU 10 in advance, the amount of decline in output of the downstream side NOx sensor 8 can be calculated based on the NOx concentration and the ammonia concentration in exhaust gas that flows out from the NOx catalyst 3 (in other words, exhaust gas that flows into the downstream side NOx sensor 8) during traveling.

The concentrations of NOx and ammonia that flow out from the NOx catalyst 3 are estimated by the ECU 10. For example, since the operating state of the internal combustion engine 1 and a NOx concentration in exhaust gas from the internal combustion engine 1 are related to each other, the NOx concentration in exhaust gas from the internal combustion engine 1 or, in other words, a NOx concentration in exhaust gas that flows into the NOx catalyst 3 can be estimated based on the operating state of the internal combustion engine 1. In addition, an amount of decline in the NOx concentration due to purification of NOx at the NOx catalyst 3 when assuming that the injection valve 4 is in a normal state or when assuming that the injection valve 4 is in an abnormal state can also be estimated. For example, the amount of decline in the NOx concentration when urea water is supplied from the injection valve 4 in an amount controlled by the ECU 10 can be set to an amount of decline in the NOx concentration when assuming that the injection valve 4 is in a normal state. In addition, the amount of decline in the NOx concentration when urea water is supplied from the injection valve 4 in the control amount described above (or an amount slightly smaller than the control amount) can be set to an amount of decline in the NOx concentration when assuming that the injection valve 4 is in an abnormal state. By obtaining the amounts of decline in the NOx concentration in such cases by an experiment, a simulation, or the like in advance in association with the control amount, the operating state of the internal combustion engine 1, the NOx purification rate of the NOx catalyst 3, and the like, the NOx concentration in exhaust gas that flows out from the NOx catalyst 3 can be respectively estimated for a case where the NOx catalyst 3 is assumed to be in a normal state and for a case where the NOx catalyst 3 is assumed to be in an abnormal state.

In addition, the ammonia concentration in exhaust gas that flows out from the NOx catalyst 3 changes in accordance with an amount of ammonia that is injected from the injection valve 4, a temperature of the exhaust gas, and a degree of deterioration of the NOx catalyst 3. For example, the larger the amount of ammonia that is injected from the injection valve 4, the higher the temperature of the exhaust gas, and the greater the degree of deterioration of the NOx catalyst 3, the higher the ammonia concentration in exhaust gas that flows out from the NOx catalyst 3. Therefore, by obtaining these relationships by an experiment, a simulation, or the like in advance, the ammonia concentration in exhaust gas that flows out from the NOx catalyst 3 can be respectively estimated for a case where the NOx catalyst 3 is assumed to be in a normal state and for a case where the NOx catalyst 3 is assumed to be in an abnormal state.

Moreover, k1, k2, and k3 can be respectively obtained by an experiment, a simulation, or the like. k1, k2, and k3 may be constant values. Alternatively, k1, k2, and k3 may be corrected in accordance with a temperature of exhaust gas, a temperature of a sensor element of the downstream side NOx sensor 8, a flow velocity of exhaust gas (or a flow rate of exhaust gas), or the like.

Figure 5:
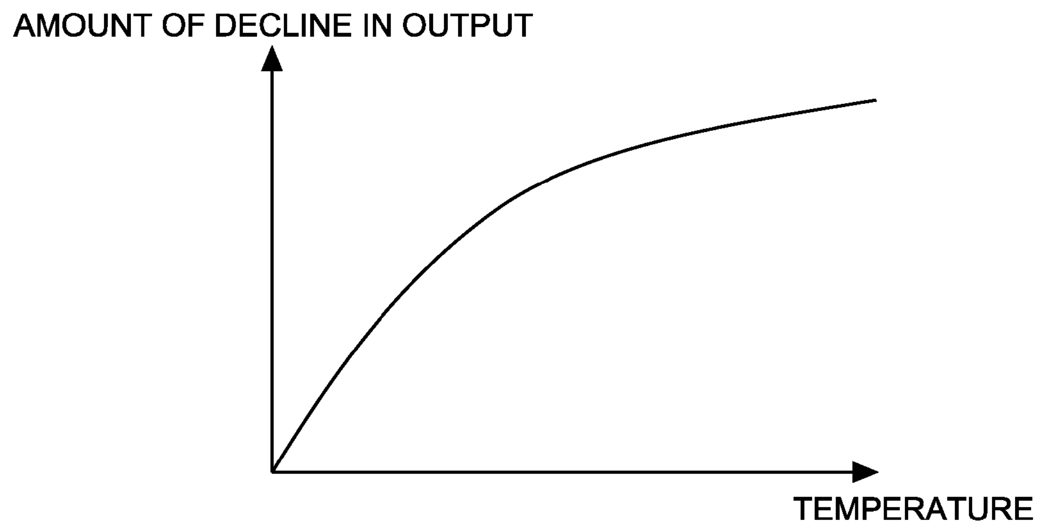
FIG. 5 is a diagram indicating a relationship between temperature and an amount of decline in output of a downstream side NOx sensor.

FIG. 5 is a diagram indicating a relationship between temperature and an amount of decline in output of the downstream side NOx sensor 8. As the temperature, a temperature of exhaust gas that passes through the downstream side NOx sensor 8, a temperature of exhaust gas in the vicinity of the downstream side NOx sensor 8, or a temperature of a sensor element of the downstream side NOx sensor 8 can be adopted.

When the temperature is denoted by T, the amount of decline in output of the downstream side NOx sensor 8 generally assumes a value proportional to "exp(−E/T)". In other words, the higher the temperature, the larger the amount of decline in output of the downstream side NOx sensor 8 since a reaction between NOx and ammonia becomes active. However, the higher the temperature, the smaller the degree of rise of the amount of decline in output of the downstream side NOx sensor 8 with respect to temperature rise.

Therefore, a correction in accordance with the temperature can be performed by correcting k1, k2, and k3 or correcting the amount of decline in output of the downstream side NOx sensor 8 to be proportional to "exp(−E/T)".

For example, by obtaining a coefficient for correcting the amount of decline in output of the downstream side NOx sensor 8 with respect to temperature by an experiment, a simulation, or the like, and mapping the coefficient in advance, the coefficient for correcting the amount of decline in output of the downstream side NOx sensor 8 based on the temperature can be obtained. In addition, a correction in accordance with the temperature can be performed by multiplying the amount of decline in output of the downstream side NOx sensor 8 by the coefficient. Furthermore, relationships between temperature and k1, k2, and k3 may be obtained by an experiment, a simulation, or the like, and mapped in advance.

Figure 6:
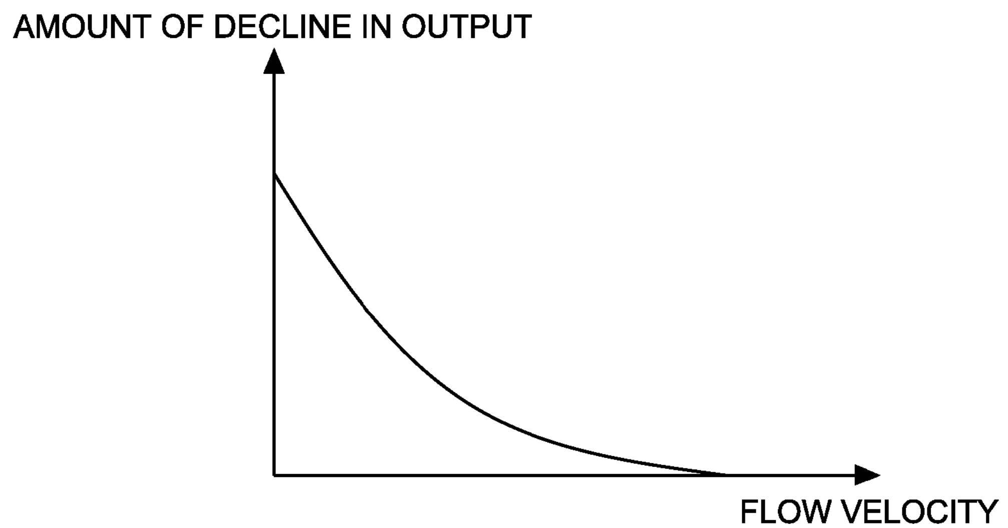
FIG. 6 is a diagram indicating a relationship between a flow velocity of exhaust gas and an amount of decline in output of a downstream side NOx sensor.

In addition, FIG. 6 is a diagram indicating a relationship between a flow velocity of exhaust gas and the amount of decline in output of the downstream side NOx sensor 8. The flow velocity of exhaust gas is a flow velocity of exhaust gas in a sensor element of the downstream side NOx sensor 8. However, when the flow velocity of exhaust gas in the sensor element of the downstream side NOx sensor 8 is correlated with a flow velocity of exhaust gas in the vicinity of the downstream side NOx sensor 8, the flow velocity of exhaust gas in the vicinity of the downstream side NOx sensor 8 may be adopted as the flow velocity of exhaust gas shown in FIG. 6.

Since a period of time during which exhaust gas is in contact with the sensor element changes in accordance with the flow velocity of exhaust gas, a period of time during which NOx and ammonia are able to react with each other also changes. In addition, the shorter the reaction time between NOx and ammonia, the smaller the amount of decrease in NOx and ammonia. In other words, the faster the flow velocity of exhaust gas, the smaller the amount of decline in output of the downstream side NOx sensor 8 due to a shorter reaction time.

Therefore, a correction in accordance with the flow velocity of exhaust gas can be performed by correcting k1, k2, and k3 or correcting the amount of decline in output of the downstream side NOx sensor 8 so as to satisfy the relationship shown in FIG. 6.

For example, by obtaining a coefficient for correcting the amount of decline in output of the downstream side NOx sensor 8 with respect to the flow velocity of exhaust gas by an experiment, a simulation, or the like, and mapping the coefficient in advance, a coefficient for correcting the amount of decline in output of the downstream side NOx sensor 8 based on the flow velocity of exhaust gas can be obtained. In addition, a correction in accordance with the flow velocity of exhaust gas can be performed by multiplying the amount of decline in output of the downstream side NOx sensor 8 by the coefficient. Furthermore, relationships between the flow velocity of exhaust gas and k1, k2, and k3 may be obtained by an experiment, a simulation, or the like, and mapped in advance. In addition, the flow velocity of exhaust gas can be obtained based on an intake air amount detected by the air flow meter 15.

The amount of decline in output of the downstream side NOx sensor 8 can be obtained in this manner. In addition, the ECU 10 corrects the threshold used when performing a diagnosis of the injection valve 4 based on the amount of decline in output of the downstream side NOx sensor 8.

Figure 7:
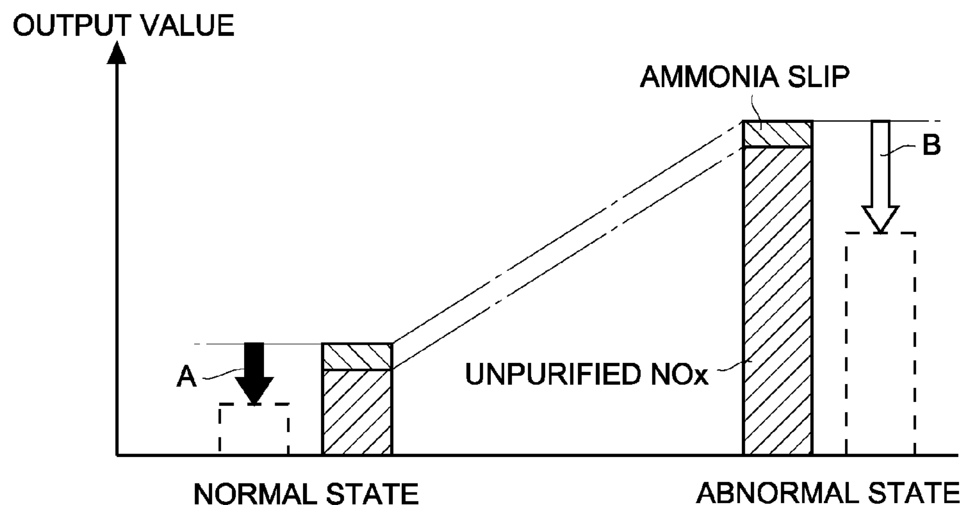
FIG. 7 is a diagram indicating an actual concentration in exhaust gas and an output value of a downstream side NOx sensor in a case where an injection valve is controlled so that the output value of the downstream side NOx sensor declines due to a decline in the NOx concentration in exhaust gas.

FIG. 7 is a diagram schematically showing an actual concentration in exhaust gas that flows out from the NOx catalyst 3 and an output value of the downstream side NOx sensor 8 in a case where the injection valve 4 is controlled so that the output value of the downstream side NOx sensor 8 declines due to a decline in the NOx concentration in exhaust gas that flows out from the NOx catalyst 3. A value when the injection valve 4 is in a normal state and a value when the injection valve 4 is in an abnormal state are shown. Moreover, a bar chart depicted by a solid line indicates the NOx concentration and the ammonia concentration in exhaust gas that flows out from the NOx catalyst 3. In addition, a bar chart depicted by a dashed line depicts an actual output value of the downstream side NOx sensor 8 or, in other words, an output value after NOx and ammonia react with each other in the downstream side NOx sensor 8.

An "ammonia slip" shown in FIG. 7 indicates a concentration of ammonia that flows out from the NOx catalyst 3 due to an ammonia slip. In addition, "unpurified NOx" indicates a concentration of unpurified NOx that flows out from the NOx catalyst 3. Furthermore, an amount of decline in output A of the downstream side NOx sensor 8 when the injection valve 4 is in a normal state and an amount of decline in output B of the downstream side NOx sensor 8 when the injection valve 4 is in an abnormal state are respectively indicated by an arrow A and an arrow B.

Figure 8:
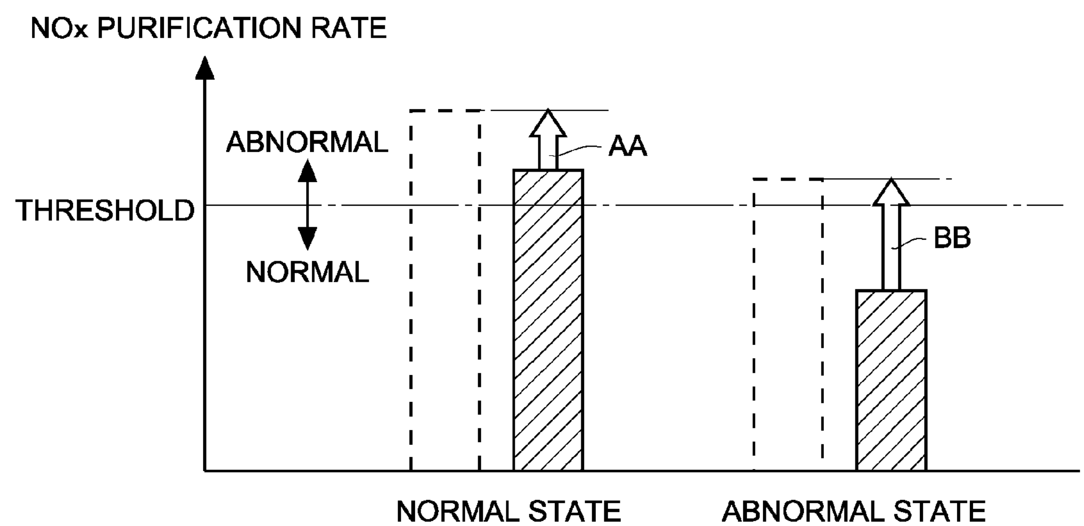
FIG. 8 is a diagram indicating an actual NOx purification rate of a NOx catalyst and a NOx purification rate that is calculated based on an output value of the downstream side NOx sensor in a case where an injection valve is controlled so that the output value of the downstream side NOx sensor declines due to a decline in a NOx concentration in exhaust gas.

A NOx purification rate that is calculated when ammonia has caused a decline in the output value of the downstream side NOx sensor 8 in this manner becomes higher than an actual value. FIG. 8 is a diagram schematically showing an actual NOx purification rate of the NOx catalyst 3 and a NOx purification rate that is calculated based on the output value of the downstream side NOx sensor 8 in a case where the injection valve 4 is controlled so that the output value of the downstream side NOx sensor 8 declines due to a decline in the NOx concentration in exhaust gas that flows out from the NOx catalyst 3. A value when the injection valve 4 is in a normal state and a value when the injection valve 4 is in an abnormal state are shown. Moreover, a bar chart depicted by a solid line indicates the actual NOx purification rate of the NOx catalyst 3. In addition, a bar chart depicted by a dashed line depicts a NOx purification rate that is calculated based on an actual output value of the downstream side NOx sensor 8 or, in other words, a NOx purification rate that is calculated based on an output value after NOx and ammonia react with each other in the downstream side NOx sensor 8. The threshold is a threshold for diagnosing whether the injection valve 4 is in a normal state or an abnormal state. When the NOx purification rate is equal to or higher than the threshold, the injection valve 4 is diagnosed as being in a normal state, and when the NOx purification rate is lower than the threshold, the injection valve 4 is diagnosed as being in an abnormal state. Moreover, the threshold shown in FIG. 8 is a threshold before correction. The threshold before correction is a lower limit value of the actual NOx purification rate when urea water is being supplied in the control amount from the injection valve 4 and can be obtained by an experiment, a simulation, or the like in advance.

As described above, the ECU 10 diagnoses that the injection valve 4 is in a normal state when the calculated NOx purification rate is equal to or higher than the threshold. Therefore, when the actual NOx purification rate is equal to or higher than the threshold due to the injection valve 4 actually being in a normal state, an incorrect diagnosis is not made even if the NOx purification rate rises by AA due to a decline in the output of the downstream side NOx sensor 8 by the amount of decline in output A. Moreover, the amount of decline in output A is an amount of decline in output created by a reaction in the downstream side NOx sensor 8 between unpurified NOx and ammonia not used in a reduction reaction which had flowed out from the NOx catalyst 3, and is created to a certain degree even if the injection valve 4 is in a normal state.

On the other hand, the ECU 10 diagnoses that the injection valve 4 is in an abnormal state when the calculated NOx purification rate is lower than the threshold. When the injection valve 4 is actually in an abnormal state, the actual NOx purification rate becomes lower than the threshold since unpurified NOx that flows out from the NOx catalyst increases. Due to a lower actual NOx purification rate, the amount of decline in output B of the downstream side NOx sensor 8 also increases as compared to when the injection valve 4 is in a normal state. Therefore, an amount of rise BB of the NOx purification rate that is calculated based on the output value of the downstream side NOx sensor 8 also increases as compared to when the injection valve 4 is in a normal state. As a result, as shown in FIG. 8, the calculated NOx purification rate may become equal to or higher than the threshold. In this case, there is a risk that an incorrect diagnosis of the injection valve 4 being in a normal state may be made despite the injection valve 4 being in an abnormal state. In consideration thereof, in the present embodiment, the threshold is corrected in accordance with the amount of decline in output of the downstream side NOx sensor 8.

Figure 9:
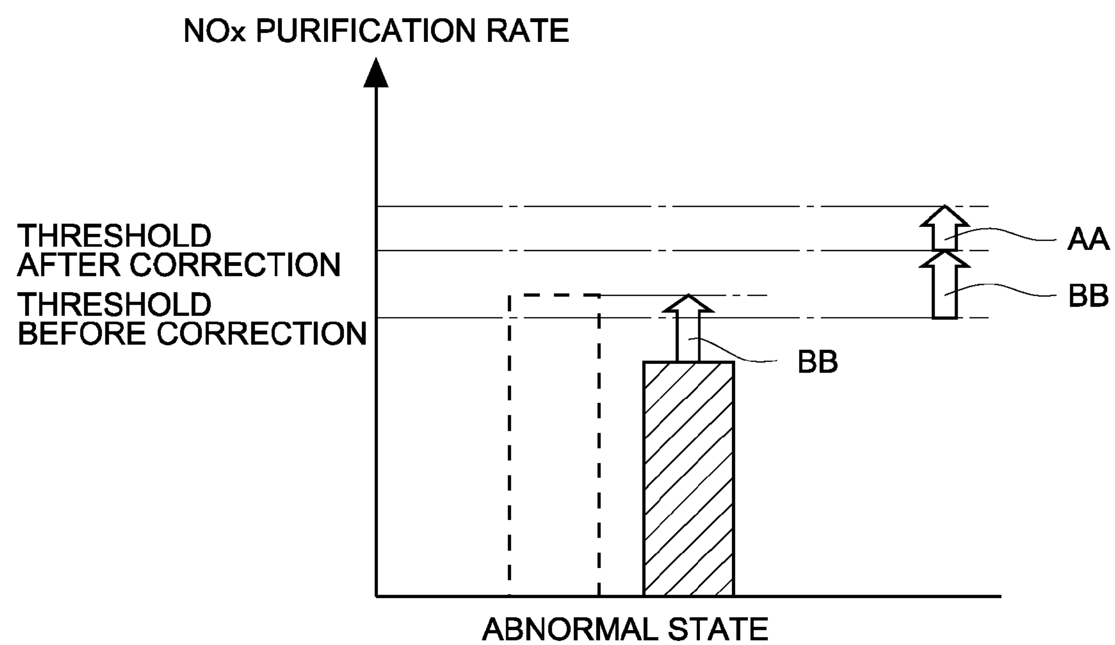
FIG. 9 is a diagram indicating a relationship between a threshold before correction and a threshold after correction in the case shown in FIG. 8.

FIG. 9 is a diagram indicating a relationship between a threshold before correction and a threshold after correction. The threshold after correction is corrected based on the amount of decline in output B of the downstream side NOx sensor 8 so as to assume a larger value than the threshold before correction. Moreover, the amount of decline in output B is calculated by the ECU 10 as an amount of decline in output when the injection valve 4 is assumed to be in an abnormal state. In other words, as already described with reference to FIGS. 4 to 6, the ECU 10 estimates the NOx concentration and the ammonia concentration in exhaust gas that flows out from the NOx catalyst 3 when the injection valve 4 is assumed to be in an abnormal state, and calculates the amount of decline in output B based on the estimated concentrations. In addition, the ECU 10 corrects the threshold by adding, from the threshold before correction, an amount of rise BB of the NOx purification rate which increases by the amount of decline in output B. By reflecting an influence of a decline in the output of the downstream side NOx sensor 8 onto a threshold for diagnosis in this manner, a magnitude relationship between the calculated NOx purification rate and the threshold after correction can be set to be the same as a magnitude relationship between the actual NOx purification rate and the threshold before correction. As a result, an incorrect diagnosis that the injection valve 4 is in a normal state despite being in an abnormal state can be prevented.

As described above, even when the injection valve 4 is in a normal state, the output value of the downstream side NOx sensor 8 may decline. By also taking into consideration the amount of decline in output of the downstream side NOx sensor 8 when the injection valve 4 is in a normal state, an accuracy of diagnosis of the injection valve 4 can be further increased. For example, a sum value (AA+BB) of "the amount of rise BB of the NOx purification rate which is calculated by assuming that the injection valve 4 is in an abnormal state" and "an amount of rise AA of the NOx purification rate which is calculated by assuming that the injection valve 4 is in a normal state" may be adopted as a threshold correction amount. In other words, the threshold after correction may be set to a value obtained by adding the sum value (AA+BB) to the threshold before correction. Moreover, the ECU 10 calculates the amount of rise AA of the NOx purification rate which is calculated by assuming that the injection valve 4 is in a normal state with a method similar to the method used to calculate the amount of rise BB of the NOx purification rate which is calculated by assuming that the injection valve 4 is in an abnormal state.

The threshold of the NOx purification rate should be set to be higher than a NOx purification rate when the injection valve 4 is in an abnormal state and equal to or lower than a NOx purification rate when the injection valve 4 is in a normal state. The amount of decline in output of the downstream side NOx sensor 8 changes in accordance with operating conditions of the internal combustion engine 1 and the like. In addition, when the threshold is corrected based solely on the amount of rise BB of the NOx purification rate which is calculated by assuming that the injection valve 4 is in an abnormal state, depending on the operating conditions of the internal combustion engine 1 and the like, the threshold after correction may become higher than a NOx purification rate which is calculated by assuming that the injection valve 4 is in a normal state. In this case, the threshold of the NOx purification rate cannot be set to be higher than the NOx purification rate when the injection valve 4 is in an abnormal state and equal to or lower than the NOx purification rate when the injection valve 4 is in a normal state. In comparison, the threshold can be set to the range described above by further taking into consideration the amount of rise AA of the NOx purification rate which is calculated by assuming that the injection valve 4 is in a normal state. In addition, a larger threshold is preferable in order to prevent an erroneous determination that the injection valve 4 is in a normal state despite the injection valve 4 being in an abnormal state. Therefore, by further taking into consideration the amount of rise AA of the NOx purification rate and further increasing the threshold, an erroneous determination that the injection valve 4 is in a normal state despite being in an abnormal state can be prevented.

In addition, the threshold correction amount may be set to a value which is equal to or larger than "the amount of rise BB of the NOx purification rate which is calculated by assuming that the injection valve 4 is in an abnormal state" and, at the same time, which is equal to or smaller than "the sum value (AA+BB)". In other words, the threshold correction amount may be set so as to satisfy the relationship provided below.

$$BB \leq \text{threshold correction amount} \leq AA+BB$$

Figure 10:
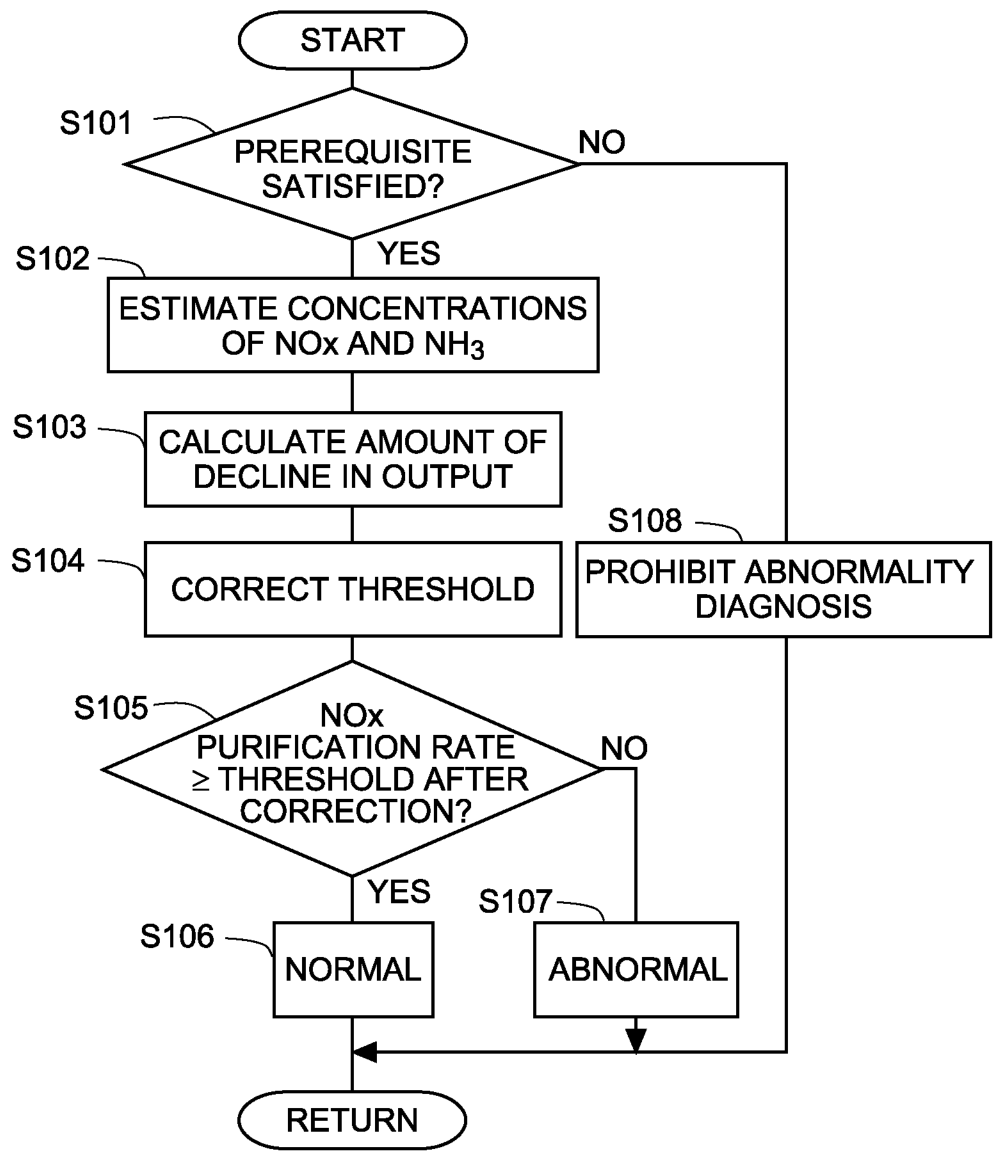
FIG. 10 is a flow chart showing a flow of a diagnosis of an injection valve according to a first embodiment.

Next, a flow of a diagnosis of the injection valve 4 according to the present embodiment will be described with reference to the drawings. FIG. 10 is a flow chart indicating the flow. The present flow is executed every prescribed time by the ECU 10.

In step S101, it is determined whether or not a prerequisite for performing a diagnosis of the injection valve 4 is satisfied. In the present step, it is determined whether or not a state exists where a diagnosis of an abnormal state of the injection valve 4 can be accurately made. In other words, it is determined whether or not the injection valve 4 is being controlled so that the output value of the downstream side NOx sensor 8 declines due to a decline in the NOx concentration in exhaust gas that flows out from the NOx catalyst 3. For example, it is determined whether urea water is being supplied or can be supplied in an appropriate amount for NOx purification. Specifically, activity of the NOx catalyst 3, activity of the downstream side NOx sensor 8, completion of warming up of the internal combustion engine 1, and the like are checked. When a positive determination is made in step S101, the present flow advances to step S102, and when a negative determination is made, the present flow advances to step S108.

In step S102, an actual NOx concentration and an actual ammonia concentration in exhaust gas that flows out from the NOx catalyst 3 are estimated. The NOx concentration and the ammonia concentration are values obtained based on an operating state of the internal combustion engine 1 or the like and are values which assume that the injection valve 4 is in an abnormal state. Furthermore, values which assume that the injection valve 4 is in a normal state may be estimated. Moreover, in the present embodiment, the ECU 10 that processes step S102 corresponds to the NOx concentration estimating unit and the ammonia concentration estimating unit according to the present invention.

In step S103, the amount of decline in output B of the downstream side NOx sensor 8 when assuming that the injection valve 4 is in an abnormal state is calculated. The amount of decline in output is calculated according to Equation 4 provided earlier based on estimated values of the NOx concentration and the ammonia concentration in exhaust gas that flows out from the NOx catalyst 3 which are estimated in step S102.

Equation 4 and the coefficients k1, k2, and k3 are to be obtained by an experiment, a simulation, or the like and stored in the ECU 10 in advance. In the present step, the amount of decline in output A of the downstream side NOx sensor 8 when assuming that the injection valve 4 is in a normal state may be further calculated. Moreover, in the present embodiment, the ECU 10 that processes step S103 corresponds to the calculating unit according to the present invention.

In step S104, the threshold used when performing a diagnosis of the injection valve 4 is corrected based on the amount of decline in output of the downstream side NOx sensor 8 calculated in step S103. The threshold before correction is to be obtained by an experiment, a simulation, or the like in advance. In addition, the threshold after correction can be calculated by adding, to the threshold before correction, the amount of rise BB of the NOx purification rate which is calculated by assuming that the injection valve 4 is in an abnormal state. The amount of rise BB of the NOx purification rate which is calculated by assuming that the injection valve 4 is in an abnormal state is a ratio of the amount of decline in output B of the downstream side NOx sensor 8 when assuming that the injection valve 4 is in an abnormal state to a NOx concentration in exhaust gas that flows into the NOx catalyst 3. Moreover, the threshold after correction may be set to a value obtained by adding, to "the threshold before correction", a value which is equal to or larger than "the amount of rise BB of the NOx purification rate which is calculated by assuming that the injection valve 4 is in an abnormal state" and, at the same time, which is equal to or smaller than "the sum value (AA+BB)".

In step S105, it is determined whether or not the NOx purification rate that is calculated based on the output value of the downstream side NOx sensor 8 is equal to or higher than the threshold after correction. In other words, a diagnosis of the injection valve 4 is performed. When a positive determination is made in step S105, the present flow proceeds to step S106 and a diagnosis is made that the injection valve 4 is in a normal state. On the other hand, when a negative determination is made in step S105, the present flow proceeds to step S107 and a diagnosis is made that the injection valve 4 is in an abnormal state. Moreover, in the present embodiment, the ECU 10 that processes step S104 corresponds to the diagnosis control unit according to the present invention. In addition, in the present embodiment, the ECU 10 that processes steps S105, S106, and S107 corresponds to the diagnosing unit according to the present invention.

On the other hand, in step S108, since a state appropriate for a diagnosis of the injection valve 4 does not exist, a diagnosis of the injection valve 4 is prohibited. In other words, a diagnosis of the injection valve 4 is not performed. Moreover, not performing a diagnosis of the injection valve 4 includes, for example, the ECU 10 reading the output value of the downstream side NOx sensor 8 but not performing a diagnosis using the output value. In addition, not performing a diagnosis of the injection valve 4 includes, for example, the ECU 10 performing a diagnosis based on the output value of the NOx sensor 8 but canceling a result of the diagnosis. Furthermore, not performing a diagnosis of the injection valve 4 includes, for example, the ECU 10 not reading the output value of the downstream side NOx sensor 8.

Moreover, the output value of the downstream side NOx sensor 8 may sometimes be corrected using a correction coefficient that is determined in accordance with a temperature or a flow velocity of exhaust gas. In such a case, the correction coefficient of the output value of the downstream side NOx sensor 8 may be corrected instead of correcting the coefficient.

Moreover, in the present embodiment, while a threshold of the NOx purification rate is corrected based on the amount of decline in output of the downstream side NOx sensor 8, alternatively, a calculated NOx purification rate may be corrected based on the amount of decline in output of the downstream side NOx sensor 8. In other words, instead of correcting the threshold by adding the amount of rise BB of the NOx purification rate which is calculated by assuming that the injection valve 4 is in an abnormal state to the threshold, the NOx purification rate may be corrected by subtracting the amount of rise BB of the NOx purification rate from the calculated NOx purification rate. In addition, the NOx purification rate after correction may be set to a value obtained by subtracting, to "the NOx purification rate before correction", a value which is equal to or larger than "the amount of rise BB of the NOx purification rate which is calculated by assuming that the injection valve 4 is in an abnormal state" and, at the same time, which is equal to or smaller than "the sum value (AA+BB)". In this case, a NOx purification rate is corrected instead of correcting a threshold in step S104 described earlier, and it is determined whether or not the NOx purification rate after correction is equal to or higher than the threshold instead of determining whether or not the NOx purification rate is equal to or higher than the threshold after correction in step S105. In addition, in the present embodiment, while correction is performed by adding an amount of rise of the NOx purification rate to a threshold of the NOx purification rate, alternatively, correction may be performed by multiplying the threshold of the NOx purification rate by a correction coefficient based on the amount of rise of the NOx purification rate or the amount of decline in output of the downstream side NOx sensor 8. Furthermore, correction of a NOx purification rate may also be performed by multiplying the NOx purification rate by the correction coefficient.

As described above, in the present embodiment, a diagnosis of the injection valve 4 is performed by taking into consideration that an output value of the downstream side NOx sensor 8 declines due to a reaction between NOx and ammonia at the downstream side NOx sensor 8. In other words, since the correction of a threshold for diagnosis prevents the injection valve 4 in an abnormal state from being incorrectly diagnosed to be in a normal state, diagnostic accuracy can be increased.

Second Embodiment

In the first embodiment, a diagnosis of the injection valve 4 is performed by correcting a threshold of a NOx purification rate in accordance with an amount of decline in output of the downstream side NOx sensor 8. On the other hand, in the present embodiment, it is determined whether or not a diagnosis of the injection valve 4 is to be performed based on the amount of decline in output of the downstream side NOx sensor 8.

When performing a diagnosis of the injection valve 4 by comparing a NOx purification rate that is calculated based on an output value of the downstream side NOx sensor 8 and a threshold with each other, the larger the amount of decline in output of the downstream side NOx sensor 8, the larger the threshold. When the threshold becomes too large, the threshold approaches a NOx purification rate which is calculated when the injection valve 4 is in a normal state. In other words, due to the threshold becoming larger, the calculated NOx purification rate may become lower than the threshold despite the injection valve 4 being in a normal state. Therefore, there is a risk that the injection valve 4 is incorrectly diagnosed to be in an abnormal state despite being in a normal state.

On the other hand, when the amount of decline in output of the downstream side NOx sensor 8 is small, since the output value of the downstream side NOx sensor 8 assumes a value close to a value corresponding to an actual concentration, there is no need to correct the threshold of the NOx purification rate. However, when the amount of decline in output of the downstream side NOx sensor 8 becomes large, the amount of rise of the NOx purification rate increases and an accuracy of diagnosis declines as described earlier. In consideration thereof, by performing a diagnosis of the injection valve 4 only when the amount of rise of the NOx purification rate is equal to or smaller than a prescribed amount, a decline in accuracy of the diagnosis can be prevented. The prescribed amount is an upper limit value of the amount of rise of the NOx purification rate when the diagnostic accuracy of the injection valve 4 is within an allowable range. In addition, when the amount of rise of the calculated NOx purification rate is larger than the prescribed amount, an incorrect diagnosis can be prevented by prohibiting a diagnosis of the injection valve 4.

Figure 11:
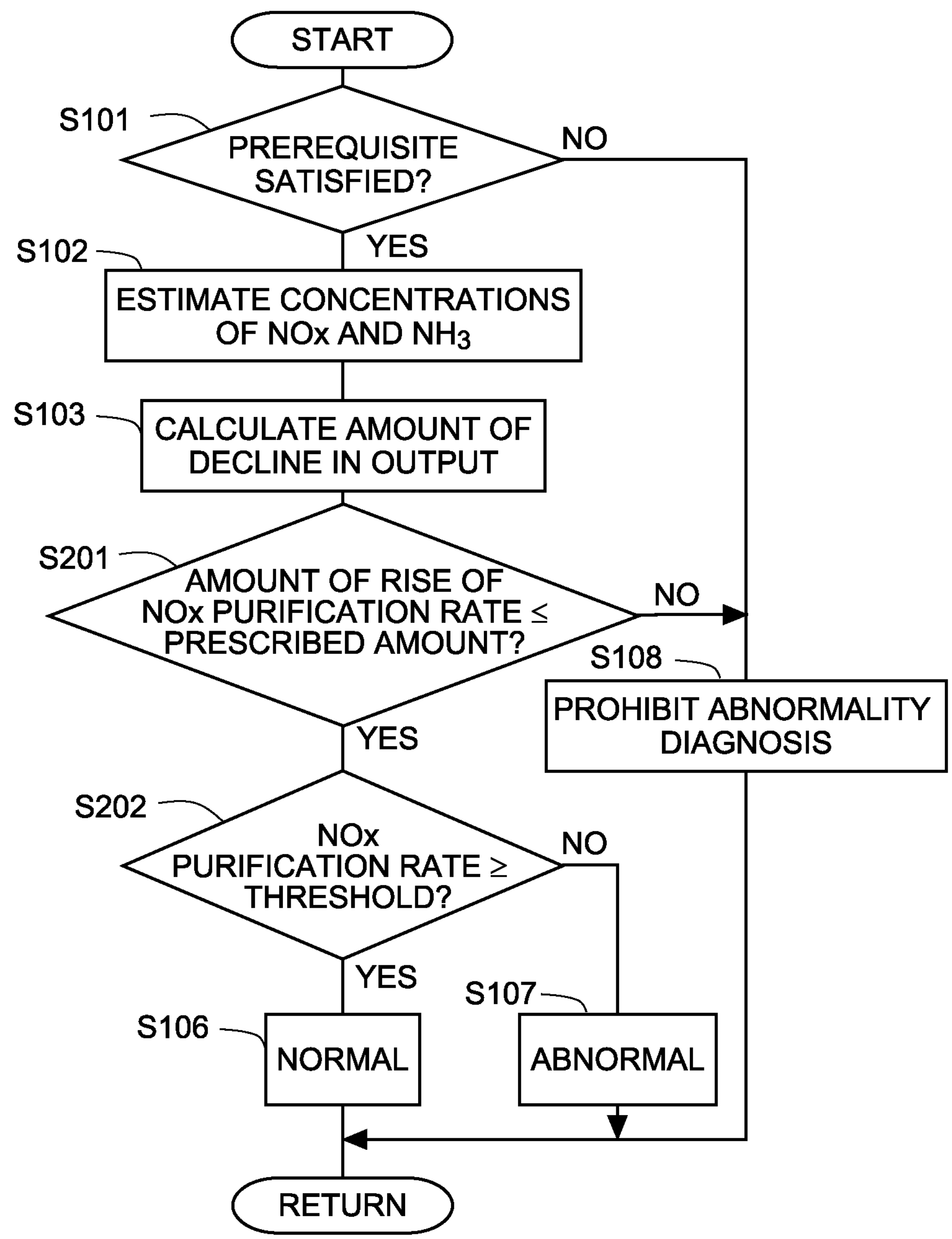
FIG. 11 is a flow chart showing a flow of a diagnosis of an injection valve according to a second embodiment.

Next, a flow of a diagnosis of the injection valve 4 according to the present embodiment will be described with reference to the drawings. FIG. 11 is a flow chart indicating the flow. The present flow is executed every prescribed time by the ECU 10. Moreover, steps in which similar processes to those in the flow described earlier are performed will be denoted by same reference characters and a description thereof will be omitted.

In the flow chart shown in FIG. 11, step S201 is executed after step S103. In step S201, it is determined whether or not the amount of rise of the NOx purification rate which is calculated based on the amount of decline in output of the downstream side NOx sensor 8 is equal to or smaller than the prescribed amount described above. In present step S201, it is determined whether or not the amount of rise BB of the NOx purification rate which is calculated by assuming that the injection valve 4 is in an abnormal state is equal to or smaller than the prescribed amount. When a positive determination is made in step S201, the present flow advances to step S202, and when a negative determination is made, the present flow advances to step S108.

In step S202, it is determined whether or not the NOx purification rate that is calculated based on the output value of the downstream side NOx sensor 8 is equal to or larger than a threshold. In other words, a diagnosis of the injection valve 4 is performed. This threshold is a value that has not been corrected based on the amount of decline in output of the downstream side NOx sensor 8. When a positive determination is made in step S202, the present flow proceeds to step S106 and the injection valve 4 is diagnosed as being in a normal state. On the other hand, when a negative determination is made in step S202, the present flow proceeds to step S107 and the injection valve 4 is diagnosed as being in an abnormal state. Moreover, in the present embodiment, the ECU 10 that processes steps S202 and S108 corresponds to the diagnosis control unit according to the present invention. In addition, in the present embodiment, the ECU 10 that processes steps S202, S106, and S107 corresponds to the diagnosing unit according to the present invention.

Figure 12:
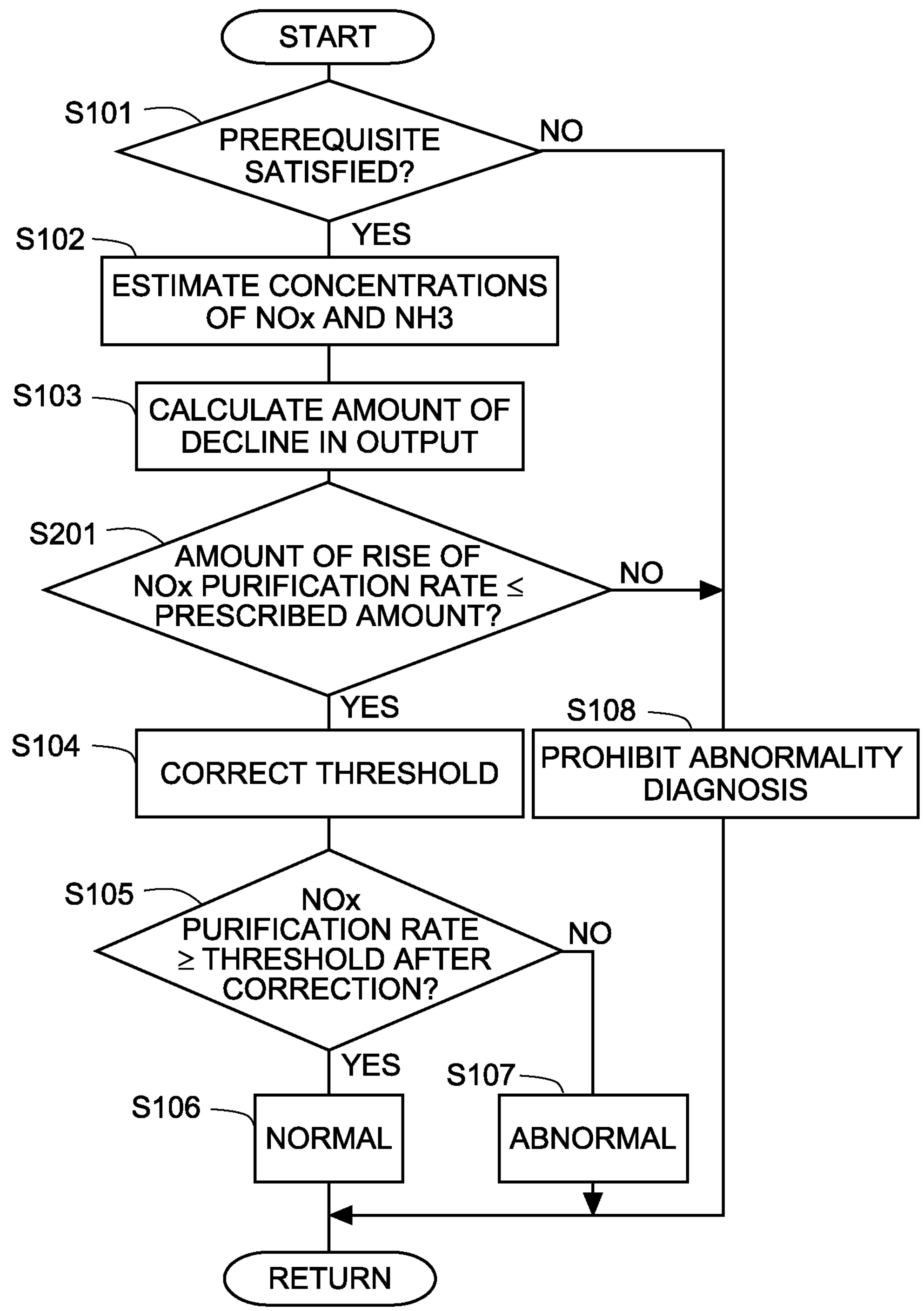
FIG. 12 is a flow chart showing another flow of a diagnosis of an injection valve according to the second embodiment.

Moreover, in the present embodiment, step S104 of the flow described earlier may be concurrently performed. FIG. 12 is a flow chart indicating another flow of a diagnosis of the injection valve 4 according to the present embodiment. The present flow is executed every prescribed time by the ECU 10. Moreover, steps in which same processes as those in the flows already described are performed will be denoted by same reference characters and a description thereof will be omitted. In the present flow, steps S104 and S201 in the flows already described are performed. Subsequently, when a positive determination is made in step S201, the present flow advances to step S104, and when a negative determination is made, the present flow advances to step S108. In this case, the ECU 10 that processes steps S201 and S108 corresponds to the diagnosis control unit according to the present invention. In addition, in the present embodiment, the ECU 10 that processes steps S104, S105, S106, and S107 corresponds to the diagnosing unit according to the present invention.

As described above, according to the present embodiment, by performing a diagnosis of the injection valve 4 only when the amount of rise of the NOx purification rate due to a reaction between NOx and ammonia at the downstream side NOx sensor 8 is small, a diagnosis is not performed when there is a risk of an incorrect diagnosis being made. Accordingly, since an incorrect diagnosis is prevented, diagnostic accuracy can be increased.

Third Embodiment

In the first and second embodiments described above, a diagnosis of the injection valve 4 is performed when the injection valve 4 is being controlled so that the output value of the downstream side NOx sensor 8 declines due to a decline in the NOx concentration in exhaust gas that flows out from the NOx catalyst 3. In other words, the injection valve 4 is diagnosed as being in an abnormal state when the NOx purification rate that is calculated based on the output value of the downstream side NOx sensor 8 is lower than a threshold for diagnosis. In contrast, in the third embodiment described below, a diagnosis of the injection valve 4 is performed when the injection valve 4 is being controlled so that the output value of the downstream side NOx sensor 8 rises due to a rise in the ammonia concentration in exhaust gas that flows out from the NOx catalyst 3. For example, a case where urea water is being temporarily supplied to the NOx catalyst 3 in an amount exceeding an ammonia adsorption capability of the NOx catalyst 3 corresponds to this case. In this case, the injection valve 4 is diagnosed as being in a normal state when the NOx purification rate that is calculated based on the output value of the downstream side NOx sensor 8 is equal to or lower than a threshold for diagnosis.

Next, a diagnosis of the injection valve 4 according to the present embodiment will be described with reference to the drawings. Moreover, while configurations of the internal combustion engine 1 and an exhaust system thereof according to the present embodiment may be similar to the configurations according to the first embodiment shown in FIG. 1, a configuration which further includes a second NOx catalyst on a downstream side of the downstream side NOx sensor 8 in the exhaust passage 2 is favorable.

Figure 13:
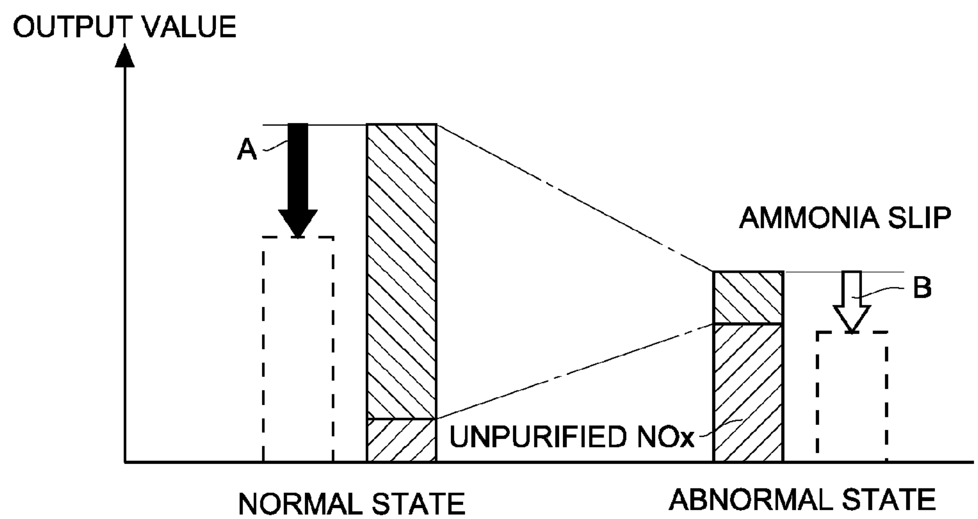
FIG. 13 is a diagram indicating an actual concentration in exhaust gas and an output value of a downstream side NOx sensor in a case where an injection valve is controlled so that the output value of the downstream side NOx sensor rises due to a rise in an ammonia concentration in exhaust gas.

FIG. 13 is a diagram schematically showing an actual concentration in exhaust gas that flows out from the NOx catalyst 3 and an output value of the downstream side NOx sensor 8 in a case where the injection valve 4 is controlled so that the output value of the downstream side NOx sensor 8 rises due to a rise in the ammonia concentration in exhaust gas that flows out from the NOx catalyst 3. A value when the injection valve 4 is in a normal state and a value when the injection valve 4 is in an abnormal state are shown. Moreover, items shown in FIG. 13 are similar to those shown in FIG. 7. When the injection valve 4 is in a normal state, since the ammonia concentration (an ammonia slip) in exhaust gas that flows out from the NOx catalyst 3 rises, the output value of the downstream side NOx sensor 8 rises. However, when the injection valve 4 is in an abnormal state, since an amount of urea water injected from the injection valve 4 decreases, a rise in the ammonia slip also decreases.

Figure 14:
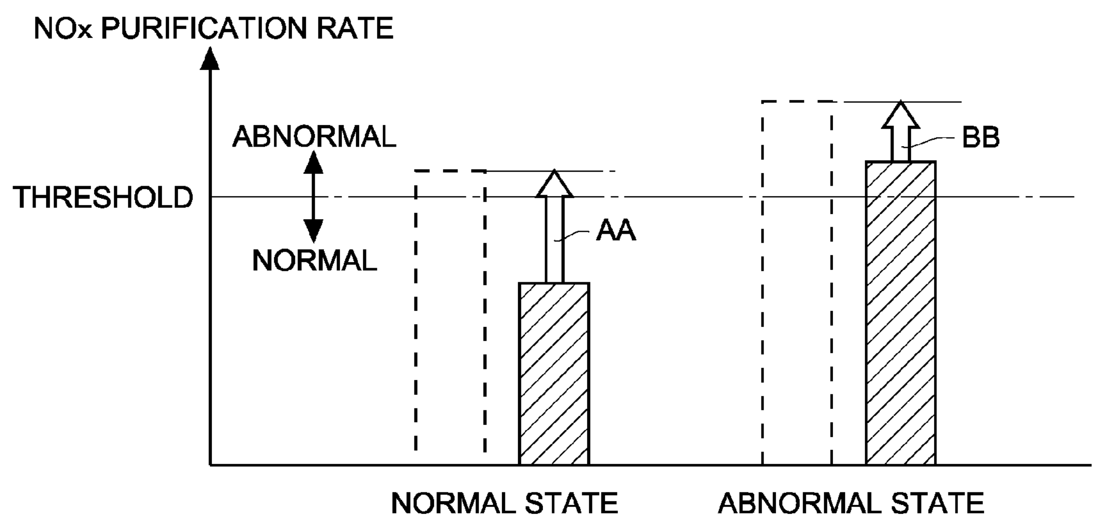
FIG. 14 is a diagram schematically showing an actual NOx purification rate of a NOx catalyst and a NOx purification rate that is calculated based on an output value of a downstream side NOx sensor in a case where an injection valve is controlled so that the output value of the downstream side NOx sensor rises due to a rise in an ammonia concentration in exhaust gas.

FIG. 14 is a diagram schematically showing an actual NOx purification rate of the NOx catalyst 3 and a NOx purification rate that is calculated based on the output value of the downstream side NOx sensor 8 in a case where the injection valve 4 is controlled so that the output value of the downstream side NOx sensor 8 rises due to a rise in the ammonia concentration in exhaust gas that flows out from the NOx catalyst 3. A value when the injection valve 4 is in a normal state and a value when the injection valve 4 is in an abnormal state are shown. Moreover, items shown in FIG. 14 are similar to those shown in FIG. 8. In FIG. 14, the injection valve 4 is diagnosed as being in a normal state when the NOx purification rate is lower than a threshold. The threshold shown in FIG. 14 is a threshold before correction. The threshold is a lower limit value of the actual NOx purification rate when urea water is being supplied in the control amount from the injection valve 4 and can be obtained by an experiment, a simulation, or the like in advance.

As described above, the ECU 10 determines that urea water is being injected in the control amount and diagnoses that the injection valve 4 is in a normal state when the NOx purification rate that is calculated based on the output value of the downstream side NOx sensor 8 is lower than a threshold. However, when the injection valve 4 is actually in a normal state, the amount of decline in output A of the downstream side NOx sensor 8 also relatively increases. Therefore, as shown in FIG. 14, due to the rise of the amount of decline in output A, the NOx purification rate that is calculated based on the output value of the downstream side NOx sensor 8 may become higher than the threshold. In this case, there is a risk that the injection valve 4 may be incorrectly diagnosed to be in an abnormal state despite being in a normal state. In consideration thereof, in the present embodiment, the threshold of the NOx purification rate is corrected in accordance with the amount of decline in output of the downstream side NOx sensor 8.

Moreover, the ECU 10 diagnoses that the injection valve 4 is in an abnormal state when the calculated NOx purification rate is higher than the threshold. When the injection valve 4 is actually in an abnormal state, since the actual concentration relatively decreases, an incorrect diagnosis is not made even if the NOx purification rate increases due to a decline in the output of the downstream side NOx sensor 8 by the amount of decline in output B. Moreover, in this case, since a sufficient amount of urea water is not supplied, a proportion of unpurified NOx increases. In addition, even if the injection valve 4 is actually in an abnormal state, since it is expected that a certain amount of urea water is to be supplied and ammonia adsorbed by the NOx catalyst 3 is to flow out, a certain amount of decline in output B is created due to a reaction between NOx and ammonia at the downstream side NOx sensor 8. Therefore, a certain amount of rise BB in the NOx purification rate is created.

Figure 15:
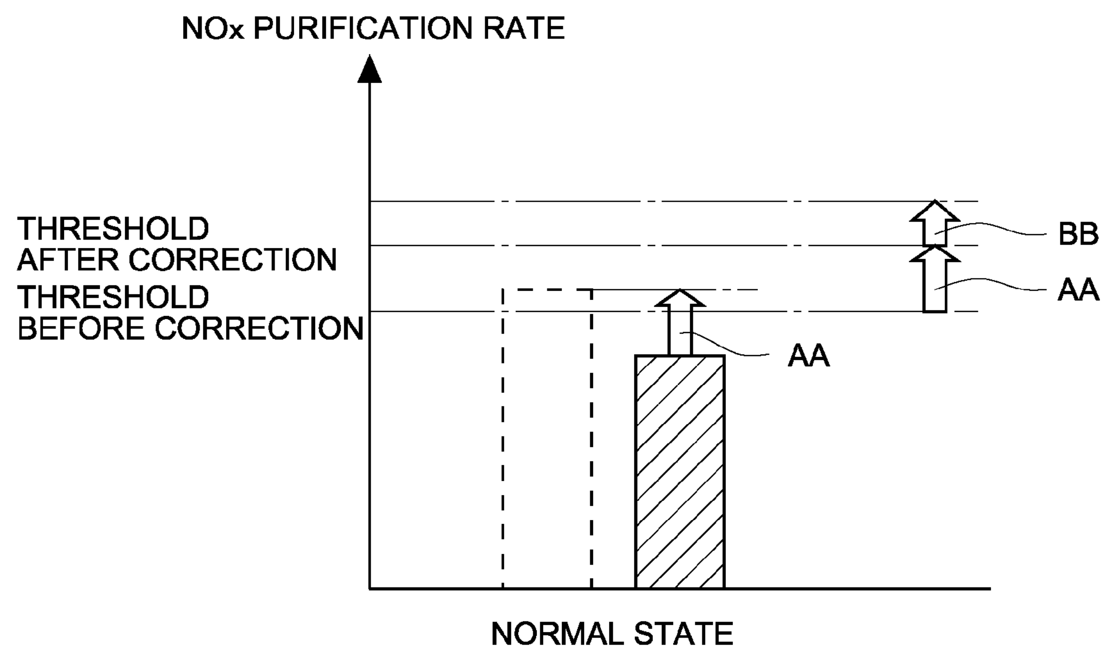
FIG. 15 is a diagram indicating a relationship between a threshold before correction and a threshold after correction in the case shown in FIG. 14.

FIG. 15 is a diagram indicating a relationship between a threshold before correction and a threshold after correction. The threshold after correction is corrected based on the amount of decline in output A of the downstream side NOx sensor 8 so as to assume a larger value than the threshold before correction. Moreover, the amount of decline in output A is calculated by the ECU 10 as an amount of decline in output when the injection valve 4 is assumed to be in a normal state in a similar manner to the first embodiment described above. In addition, the ECU 10 corrects the threshold by adding, to the threshold before correction, an amount of rise AA of the NOx purification rate which is calculated based on the amount of decline in output A. By reflecting an influence of a decline in the output of the downstream side NOx sensor 8 onto a threshold for diagnosis in this manner, a magnitude relationship between the calculated NOx purification rate and the threshold after correction can be set to be the same as a magnitude relationship between the actual NOx purification rate and the threshold before correction. As a result, an incorrect diagnosis that the injection valve 4 is in an abnormal state despite being in a normal state can be prevented.

In addition, "the sum value (AA+BB)" may be adopted as the threshold correction amount in a similar manner to the first embodiment described above. Moreover, the ECU 10 calculates the amount of rise BB of the NOx purification rate with a similar method to the method used to calculate the amount of rise AA of the NOx purification rate which is calculated based on the amount of decline in output A. In addition, the threshold correction amount may be set to a value which is equal to or larger than "the amount of rise AA of the NOx purification rate which is calculated by assuming that the injection valve 4 is in a normal state" and, at the same time, which is equal to or smaller than "the sum value (AA+BB)".

Figure 16:
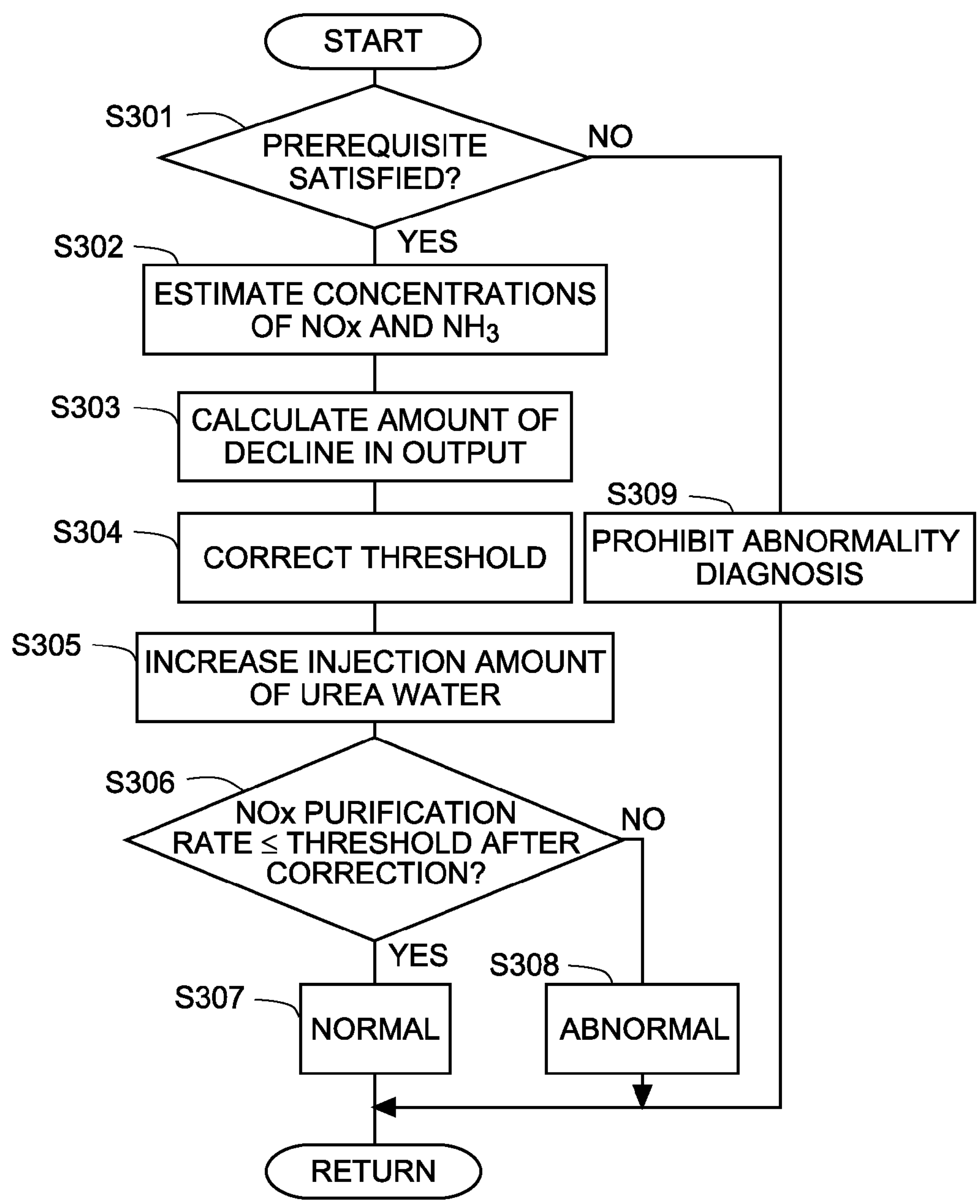
FIG. 16 is a flow chart showing a flow of a diagnosis of an injection valve according to a third embodiment.

Next, a flow of a diagnosis of the injection valve 4 according to the present embodiment will be described with reference to the drawings. FIG. 16 is a flow chart indicating the flow. The present flow is executed every prescribed time by the ECU 10.

In step S301, it is determined whether or not a prerequisite for performing a diagnosis of the injection valve 4 is satisfied. In the present step, it is determined whether or not a state exists where a diagnosis of a normal state of the injection valve 4 can be accurately made. In other words, it is determined whether or not the injection valve 4 can be controlled so that the output value of the downstream side NOx sensor 8 rises due to a rise in the ammonia concentration in exhaust gas that flows out from the NOx catalyst 3. For example, it is determined whether or not urea water can be temporarily supplied in an amount exceeding an ammonia adsorption capability of the NOx catalyst 3. Specifically, activity of the NOx catalyst 3, activity of the downstream side NOx sensor 8, completion of warming up of the internal combustion engine 1, and the like are checked. When a positive determination is made in step S301, the present flow advances to step S302, and when a negative determination is made, the present flow advances to step S309.

In step S302, an actual NOx concentration and an actual ammonia concentration in exhaust gas that flows out from the NOx catalyst 3 are estimated. The NOx concentration and the ammonia concentration are values obtained based on an operating state of the internal combustion engine 1 or the like and are values which assume that the injection valve 4 is in a normal state. Furthermore, values which assume that the injection valve 4 is in an abnormal state may be estimated. Moreover, in the present embodiment, the ECU 10 that processes step S302 corresponds to the NOx concentration estimating unit and the ammonia concentration estimating unit according to the present invention.

In step S303, the amount of decline in output A of the downstream side NOx sensor 8 when assuming that the injection valve 4 is in a normal state is calculated. The amount of decline in output is calculated according to Equation 4 provided earlier based on estimated values of the NOx concentration and the ammonia concentration in exhaust gas that flows out from the NOx catalyst 3 which are estimated in step S302. Moreover, in the present step, the amount of decline in output B of the downstream side NOx sensor 8 when assuming that the injection valve 4 is in an abnormal state may be further calculated. Moreover, in the present embodiment, the ECU 10 that processes step S303 corresponds to the calculating unit according to the present invention.

In step S304, the threshold used when performing a diagnosis of the injection valve 4 is corrected based on the amount of decline in output of the downstream side NOx sensor 8 calculated in step S303. The threshold before correction is to be obtained by an experiment, a simulation, or the like in advance. In addition, the threshold after correction can be calculated by adding, to the threshold before correction, the amount of rise AA of the NOx purification rate which is calculated by assuming that the injection valve 4 is in a normal state. The amount of rise AA of the NOx purification rate which is calculated by assuming that the injection valve 4 is in a normal state is a ratio of the amount of decline in output A of the downstream side NOx sensor 8 when assuming that the injection valve 4 is in a normal state to the NOx concentration in exhaust gas that flows into the NOx catalyst 3. Moreover, the threshold after correction may be set to a value obtained by adding, to "the threshold before correction", a value which is equal to or larger than "the amount of rise AA of the NOx purification rate which is calculated by assuming that the injection valve 4 is in a normal state" and, at the same time, which is equal to or smaller than "the sum value (AA+BB)".

In step S305, the ECU 10 increases an injection amount from the injection valve 4 so that urea water is temporarily supplied in an amount exceeding the ammonia adsorption capability of the NOx catalyst 3. The increased amount may be appropriately set in consideration of the ammonia adsorption capability of the NOx catalyst 3 and the like.

In step S306, it is determined whether or not the NOx purification rate that is calculated based on the output value of the downstream side NOx sensor 8 is equal to or lower than the threshold after correction. In other words, a diagnosis of the injection valve 4 is performed. When a positive determination is made in step S306, the present flow proceeds to step S307 and the injection valve 4 is diagnosed as being in a normal state. On the other hand, when a negative determination is made in step S306, the present flow proceeds to step S308 and the injection valve 4 is diagnosed as being in an abnormal state. Moreover, in the present embodiment, the ECU 10 that processes step S304 corresponds to the diagnosis control unit according to the present invention, and the ECU 10 that processes steps S306, S307, and S308 corresponds to the diagnosing unit according to the present invention.

On the other hand, in step S309, since a state appropriate for a diagnosis of the injection valve 4 does not exist, a diagnosis of the injection valve 4 is prohibited in a similar manner to step S108 in the embodiment described earlier. In other words, a diagnosis of the injection valve 4 is not performed.

Moreover, in the present embodiment, while the threshold of the NOx purification rate is corrected based on the amount of decline in output of the downstream side NOx sensor 8, alternatively, the calculated NOx purification rate may be corrected based on the amount of decline in output of the downstream side NOx sensor 8. In other words, instead of correcting the threshold by adding the amount of rise AA of the NOx purification rate which is calculated by assuming that the injection valve 4 is in a normal state to the threshold, the NOx purification rate may be corrected by subtracting the amount of rise AA of the NOx purification rate from the calculated NOx purification rate. In addition, the NOx purification rate after correction may be set to a value obtained by subtracting, to "the NOx purification rate before correction", a value which is equal to or larger than "the amount of rise AA of the NOx purification rate which is calculated by assuming that the injection valve 4 is in a normal state" and, at the same time, which is equal to or smaller than "the sum value (AA+BB)". In this case, the NOx purification rate is corrected instead of correcting the threshold in step S304 described earlier, and it is determined whether or not the NOx purification rate after correction is equal to or lower than the threshold instead of determining whether or not the NOx purification rate is equal to or lower than the threshold after correction in step S306. In addition, in the present embodiment, while correction is performed by adding a correction amount based on the amount of decline in output of the downstream side NOx sensor 8 to the threshold of the NOx purification rate, alternatively, correction may be performed by multiplying the threshold of the NOx purification rate by a correction coefficient based on the amount of decline in output of the downstream side NOx sensor 8. Furthermore, correction of the NOx purification rate may also be performed by multiplying the NOx purification rate by a correction coefficient.

As described above, even in the present embodiment, a decline in the output of the downstream side NOx sensor 8 is taken into consideration. Therefore, since the injection valve 4 in a normal state is prevented from being incorrectly diagnosed to be in an abnormal state, diagnostic accuracy can be increased.

First Modification of Third Embodiment

As a modification of the third embodiment, it may be determined whether or not a diagnosis of the injection valve 4 is to be performed based on the amount of rise of the NOx purification rate in a similar manner to the second embodiment described earlier. In other words, by performing a diagnosis of the injection valve 4 only when the amount of rise of the NOx purification rate which is calculated based on the amount of decline in output of the downstream side NOx sensor 8 is equal to or smaller than a prescribed amount, a decline in accuracy of the diagnosis can be prevented. The prescribed amount is an upper limit value of the amount of rise of the NOx purification rate when the diagnostic accuracy of the injection valve 4 is within an allowable range in a similar manner to the second embodiment.

In a flow of a diagnosis of the injection valve 4 according to the present modification, step S201 is performed in place of step S304 in the flow shown in FIG. 16 in a similar manner to step S201 being performed in the flow shown in FIG. 11 according to the second embodiment described earlier in place of step S104 in the flow shown in FIG. 10. In other words, in step S201, it is determined whether or not the amount of rise of the NOx purification rate which is calculated based on the amount of decline in output of the downstream side NOx sensor 8 is equal to or smaller than the prescribed amount described above. Subsequently, when a positive determination is made in step S201, the present flow advances to step S305, and when a negative determination is made, the present flow advances to step S309. Furthermore, in step S306, it is determined whether or not the NOx purification rate is equal to or lower than the threshold that has not been corrected. Moreover, in the flow shown in FIG. 16, step S304 and step S201 may be concurrently performed in a similar manner to step S104 and step S201 being concurrently performed in the flow shown in FIG. 12 described above. In other words, when a positive determination is made in step S201, step S305 may be performed after step S304 is performed. Since all of these flows are similar to the respective flows according to the second embodiment, a description thereof will be omitted. Even in this case, a diagnosis is no longer performed when there is a risk of an incorrect diagnosis being made. As a result, since an incorrect diagnosis is prevented, diagnostic accuracy can be increased.

Second Modification of Third Embodiment

In the third embodiment, the injection valve 4 is diagnosed to be in a normal state when the NOx purification rate that is calculated based on the output value of the downstream side NOx sensor 8 is equal to or lower than the threshold for diagnosis. However, even when the output value of the downstream side NOx sensor 8 is rising due to a rise in the ammonia concentration in exhaust gas that flows out from the NOx catalyst 3 which is attributable to a temperature rise of the NOx catalyst 3, the injection valve 4 can be diagnosed to be in a normal state when the NOx purification rate is equal to or lower than the threshold.

An amount of ammonia adsorbable by the NOx catalyst 3 has an upper limit amount referred to as a saturated adsorption amount. The saturated adsorption amount characteristically declines as a temperature of the NOx catalyst 3 rises. Therefore, when the saturated adsorption amount declines due to a temperature rise of the NOx catalyst 3, ammonia in an amount exceeding the declined saturated adsorption amount may flow out from the NOx catalyst 3. When the injection valve 4 has been operating in a normal state prior to the temperature rise, it can be assumed that an amount of ammonia more or less equal to the saturated adsorption amount had been adsorbed by the NOx catalyst 3 at that point. Therefore, the injection valve 4 can be diagnosed to be in a normal state when a NOx purification rate equal to or lower than a threshold is calculated after the temperature rise. Moreover, the threshold can be set based on the saturated adsorption amount of the NOx catalyst 3 or the like.

Moreover, a relationship between the actual NOx purification rate or the NOx purification rate that is calculated based on the output value of the downstream side NOx sensor 8 and the threshold is similar to the relationship schematically shown in FIG. 14 described above. Therefore, by adding the amount of rise AA of the NOx purification rate after temperature rise in a case where it is assumed that the injection valve 4 has been in a normal state prior to the temperature rise of the NOx catalyst 3 to the threshold before correction so that the threshold after correction becomes a larger value than the threshold before correction, an influence of a decline in the output of the downstream side NOx sensor 8 can be reflected onto the threshold for diagnosis. As a result, an incorrect diagnosis that the injection valve 4 is in an abnormal state despite being in a normal state can be prevented. In addition, "the sum value (AA+BB)" may be adopted as the threshold correction amount or the threshold correction amount may be set to a value which is equal to or larger than AA and, at the same time, which is equal to or smaller than the sum value in a similar manner to the embodiment described above. Furthermore, the NOx purification rate may be corrected instead of correcting the threshold. In addition, the threshold or the NOx purification rate may be corrected by multiplying the threshold or the NOx purification rate by a correction coefficient.

Moreover, the flow of a diagnosis of the injection valve 4 according to the present embodiment is similar to the flow shown in FIG. 16. However, step S305 is not executed. In this case, in step S301, it is concurrently determined whether or not the temperature of the NOx catalyst 3 has risen to or above a prescribed temperature when determining whether or not a prerequisite for performing a diagnosis of the injection valve 4 is satisfied. The prescribed temperature may be set to, for example, a temperature at which the saturated adsorption amount of ammonia of the NOx catalyst 3 sufficiently declines. Accordingly, when a positive determination is made in step S301, it can be determined that a state exists where a normal state or an abnormal state of the injection valve 4 can be accurately diagnosed. In addition, since the threshold is corrected when processes of steps S302 to S304 are executed, an incorrect diagnosis that the injection valve 4 is in an abnormal state despite being in a normal state can be prevented. Moreover, in the present modification, step S201 may be performed in place of step S304 and steps S304 and S201 may be concurrently performed in a similar manner to the first modification of the third embodiment described above. As described above, even with the present second modification, diagnostic accuracy of the injection valve 4 can be increased in a similar manner to the first modification.

Fourth Embodiment

While a diagnosis of the injection valve 4 is performed in the embodiment described above by comparing a NOx purification rate with a threshold, in the following embodiment, a diagnosis of the injection valve 4 is performed by comparing an output value of the downstream side NOx sensor 8 with a threshold. Other devices and the like can be configured in a same manner as in the embodiments described above.

In the present embodiment, the ECU 10 diagnoses that the injection valve 4 is in an abnormal state when the output value of the downstream side NOx sensor 8 is larger than a threshold and diagnoses that the injection valve 4 is in a normal state when the output value of the downstream side NOx sensor 8 is smaller than the threshold. This threshold is a value corresponding to concentrations of NOx and ammonia actually contained in exhaust gas that flows out from the NOx catalyst 3 when the injection valve 4 is on a border between a normal state and an abnormal state. Alternatively, the threshold may be set to an upper limit value of a sum value of an actual NOx concentration and an actual ammonia concentration in exhaust gas when urea water is being supplied from the injection valve 4 in the control amount. Moreover, before performing a diagnosis of the injection valve 4, other devices such as the NOx catalyst 3 and the downstream side NOx sensor 8 may be checked using known techniques to determine whether the devices are in their normal states.

When a diagnosis of the injection valve 4 is performed when sensitivity of the downstream side NOx sensor 8 has declined, there is a risk that the output value of the downstream side NOx sensor 8 becomes equal to or smaller than the threshold despite the injection valve 4 being in an abnormal state. In other words, there is a risk that the injection valve 4 is incorrectly diagnosed to be in a normal state despite being in an abnormal state. In consideration thereof, when performing a diagnosis of the injection valve 4, the ECU 10 obtains an amount of decline in output of the downstream side NOx sensor 8 in accordance with the NOx concentration and the ammonia concentration in exhaust gas that flows out from the NOx catalyst 3 and corrects a threshold for performing a diagnosis of the injection valve 4 based on the amount of decline in output.

Figure 17:
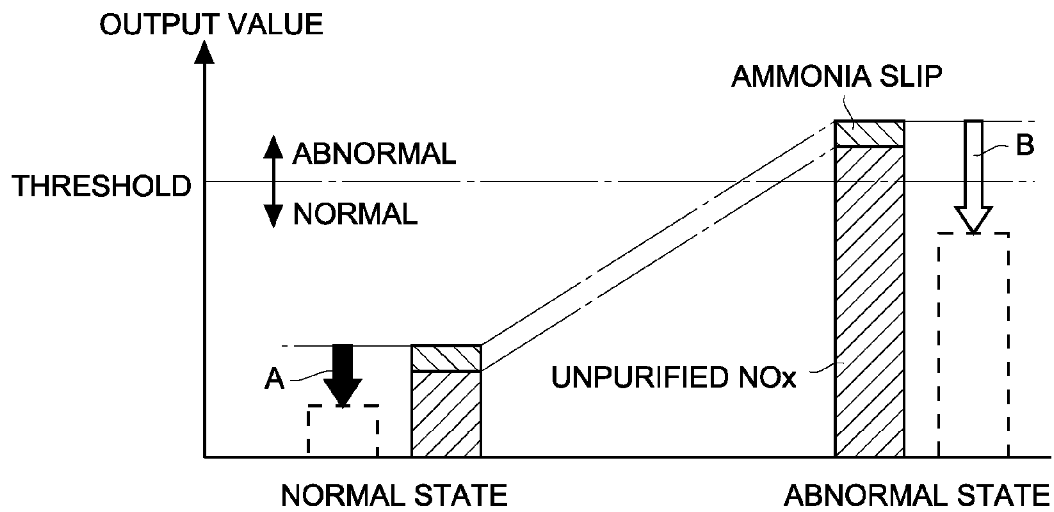
FIG. 17 is a diagram indicating an actual concentration in exhaust gas and an output value of a downstream side NOx sensor in a case where an injection valve is controlled so that the output value of the downstream side NOx sensor declines due to a decline in a NOx concentration in exhaust gas.

FIG. 17 is a diagram schematically showing an actual concentration in exhaust gas that flows out from the NOx catalyst 3 and an output value of the downstream side NOx sensor 8 in a case where the injection valve 4 is controlled so that the output value of the downstream side NOx sensor 8 declines due to a decline in the NOx concentration in exhaust gas that flows out from the NOx catalyst 3. A value when the injection valve 4 is in a normal state and a value when the injection valve 4 is in an abnormal state are shown. Moreover, a bar chart depicted by a solid line indicates the NOx concentration and the ammonia concentration in exhaust gas that flows out from the NOx catalyst 3. In addition, a bar chart depicted by a dashed line depicts an actual output value of the downstream side NOx sensor 8 or, in other words, an output value after NOx and ammonia react with each other in the downstream side NOx sensor 8.

An “ammonia slip” shown in FIG. 17 indicates a concentration of ammonia that flows out from the NOx catalyst 3 due to an ammonia slip. In addition, “unpurified NOx” indicates a concentration of unpurified NOx that flows out from the NOx catalyst 3. The threshold is a threshold for diagnosing whether the injection valve 4 is in a normal state or an abnormal state. When the output value of the downstream side NOx sensor 8 is equal to or smaller than the threshold, the injection valve 4 is diagnosed as being in a normal state, and when the output value of the downstream side NOx sensor 8 is larger than the threshold, the injection valve 4 is diagnosed as being in an abnormal state. Moreover, the threshold shown in FIG. 17 is a threshold before correction. The threshold before correction is an upper limit value of the actual concentration when urea water is being supplied in the control amount from the injection valve 4 and can be obtained by an experiment, a simulation, or the like in advance. Furthermore, an amount of decline in output A of the downstream side NOx sensor 8 when the injection valve 4 is in a normal state and an amount of decline in output B of the downstream side NOx sensor 8 when the injection valve 4 is in an abnormal state are respectively indicated by an arrow A and an arrow B.

As described above, the ECU 10 diagnoses that the injection valve 4 is in a normal state when the output value of the downstream side NOx sensor 8 is equal to or smaller than the threshold. Therefore, when the actual concentration is equal to or lower than the threshold due to the injection valve 4 actually being in a normal state, an incorrect diagnosis is not made even if the output of the downstream side NOx sensor declines by the amount of decline in output A. Moreover, the amount of decline in output A is an amount of decline in output created by a reaction in the downstream side NOx sensor 8 between unpurified NOx and ammonia not used in a reduction reaction which had flowed out from the NOx catalyst 3, and is created to a certain degree even if the injection valve 4 is in a normal state.

On the other hand, the ECU 10 diagnoses that the injection valve 4 is in an abnormal state when the output value of the downstream side NOx sensor 8 is larger than the threshold. When the injection valve 4 is actually in an abnormal state, the actual concentration becomes higher than the threshold since unpurified NOx that flows out from the NOx catalyst 3 increases. Due to a higher actual concentration, the amount of decline in output B of the downstream side NOx sensor 8 also increases as compared to when the injection valve 4 is in a normal state. Therefore, as shown in FIG. 17, due to the amount of decline in output B, the actual output value of the downstream side NOx sensor 8 may become equal to or smaller than the threshold. In this case, there is a risk that an incorrect diagnosis of the injection valve 4 being in a normal state may be made despite the injection valve 4 is in an abnormal state. In consideration thereof, in the present embodiment, the threshold is corrected in accordance with the amount of decline in output of the downstream side NOx sensor 8.

Figure 18:
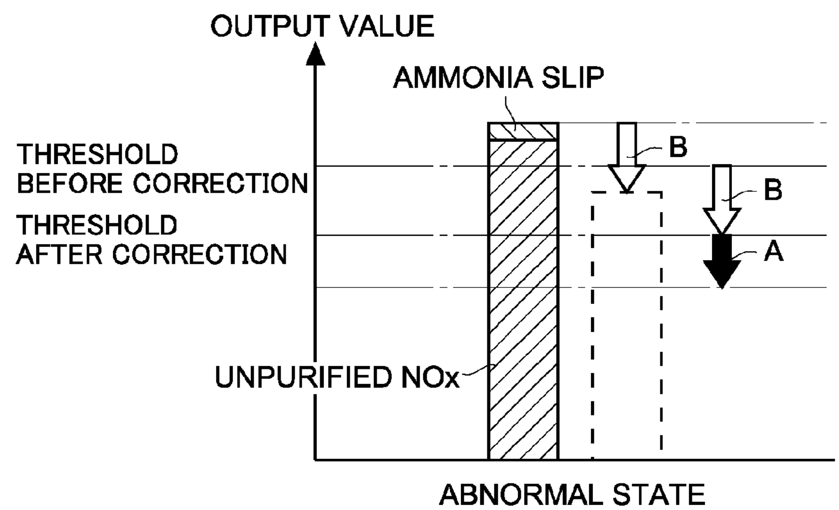
FIG. 18 is a diagram indicating a relationship between a threshold before correction and a threshold after correction in the case shown in FIG. 17.

FIG. 18 is a diagram indicating a relationship between a threshold before correction and a threshold after correction. The threshold after correction is corrected based on the amount of decline in output B of the downstream side NOx sensor 8 so as to assume a smaller value than the threshold before correction. Moreover, the amount of decline in output B is calculated by the ECU 10 as an amount of decline in output when the injection valve 4 is assumed to be in an abnormal state. In other words, as already described with reference to FIGS. 4 to 6, the ECU 10 estimates a NOx concentration and an ammonia concentration in exhaust gas that flows out from the NOx catalyst 3 when the injection valve 4 is assumed to be in an abnormal state, and calculates the amount of decline in output B based on the estimated concentrations. In addition, the ECU 10 corrects the threshold by subtracting the calculated amount of decline in output B from the threshold before correction. By reflecting an influence of a decline in the output of the downstream side NOx sensor 8 onto a threshold for diagnosis in this manner, a magnitude relationship between the actual output value and the threshold after correction can be set to be the same as a magnitude relationship between the actual concentration and the threshold before correction. As a result, an incorrect diagnosis that the injection valve 4 is in a normal state despite being in an abnormal state can be prevented.

As described above, even when the injection valve 4 is in a normal state, the output value of the downstream side NOx sensor 8 may decline. Therefore, by also taking into consideration the amount of decline in output of the downstream side NOx sensor 8 when the injection valve 4 is in a normal state, an accuracy of diagnosis of the injection valve 4 can be further increased. In addition, a sum value (A+B) of “the amount of decline in output B of the downstream side NOx sensor 8 which is calculated by assuming that the injection valve 4 is in an abnormal state” and “an amount of decline in output A of the downstream side NOx sensor 8 which is calculated by assuming that the injection valve 4 is in a normal state” may be adopted as the threshold correction amount. In other words, the threshold after correction may be set to a value obtained by subtracting the sum value (A+B) from the threshold before correction. Moreover, the ECU 10 calculates the amount of decline in output A with a similar method to the method used to calculate the amount of decline in output B.

The threshold of the output value of the downstream side NOx sensor 8 should be set so as to be equal to or larger than the output value when the injection valve 4 is in a normal state and, at the same time, to be smaller than the output value when the injection valve 4 is in an abnormal state. The amount of decline in output of the downstream side NOx sensor 8 changes in accordance with operating conditions of the internal combustion engine 1 and the like. In addition, when the threshold is corrected based solely on the amount of decline in output B of the downstream side NOx sensor 8 which is calculated by assuming that the injection valve 4 is in an abnormal state, depending on the operating conditions of the internal combustion engine 1 and the like, the threshold after correction may become smaller than the output value of the downstream side NOx sensor 8 which is calculated by assuming that the injection valve 4 is in a normal state. In this case, the threshold of the output value of the downstream side NOx sensor 8 cannot be set so as to be equal to or larger than the output value when the injection valve 4 is in a normal state and, at the same time, to be smaller than the output value when the injection valve 4 is in an abnormal state. In comparison, the threshold can be set to the range described above by further taking into consideration the amount of decline in output A of the downstream side NOx sensor 8 which is calculated by assuming that the injection valve 4 is in a normal state. In addition, a smaller threshold is preferable in order to prevent an erroneous determination that the injection valve 4 is in a normal state despite the injection valve 4 being in an abnormal state. Therefore, by further taking into consideration the amount of decline in output A of the downstream side NOx sensor 8 and further reducing the threshold, an erroneous determination that the injection valve 4 is in a normal state despite being in an abnormal state can be prevented.

In addition, the threshold correction amount may be set to a value which is equal to or larger than "the amount of decline in output B of the downstream side NOx sensor 8 which is calculated by assuming that the injection valve 4 is in an abnormal state" and, at the same time, which is equal to or smaller than "the sum value (A+B)". In other words, the threshold correction amount may be set so as to satisfy the relationship provided below.

$$B \leq \text{threshold correction amount} \leq A+B$$

Figure 19:
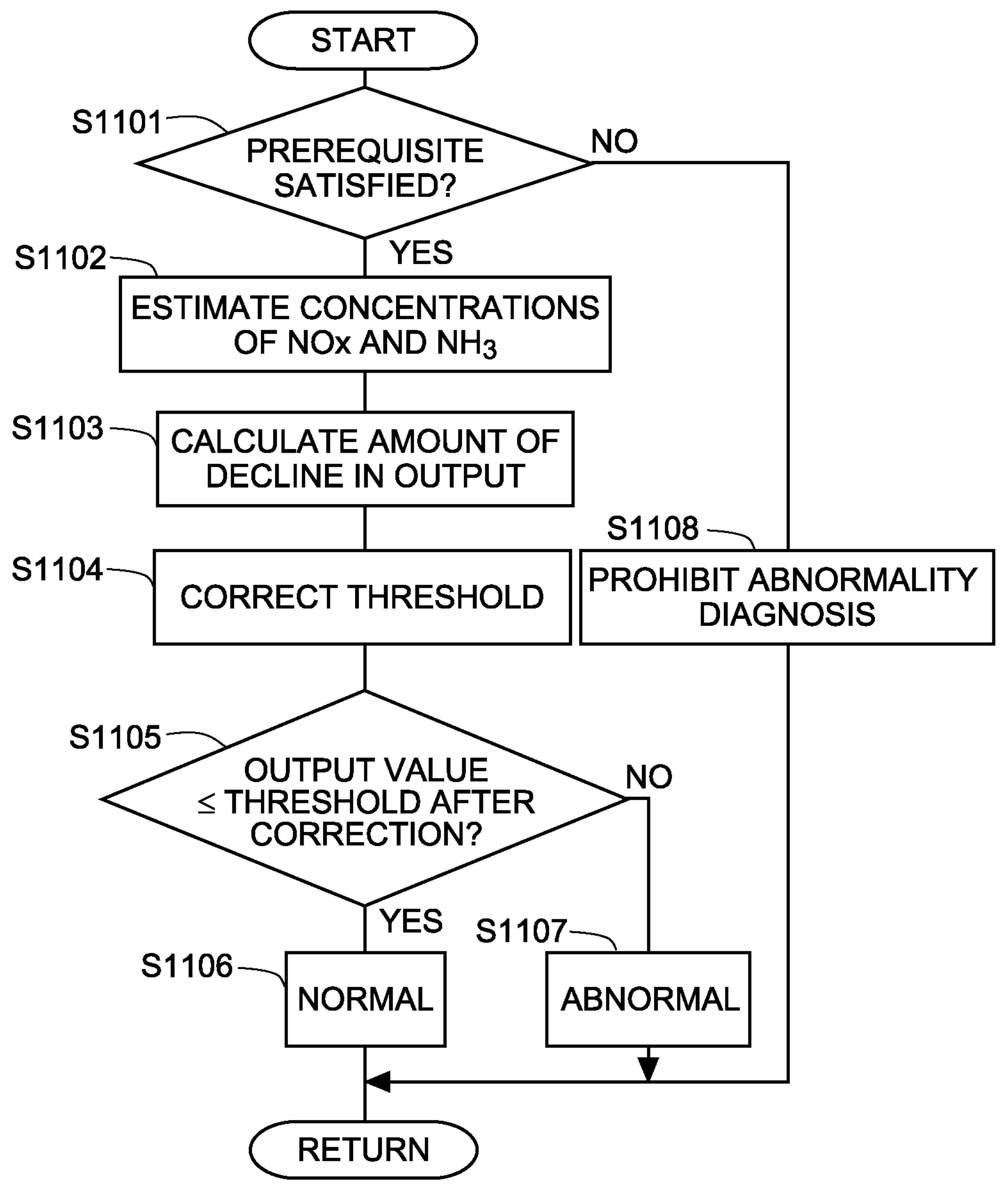
FIG. 19 is a flow chart indicating a flow of a diagnosis of an injection valve according to a fourth embodiment.

Next, a flow of a diagnosis of the injection valve 4 according to the present embodiment will be described with reference to the drawings. FIG. 19 is a flow chart indicating the flow. The present flow is executed every prescribed time by the ECU 10.

In step S1101, it is determined whether or not a prerequisite for performing a diagnosis of the injection valve 4 is satisfied. In the present step, it is determined whether or not a state exists where a diagnosis of an abnormal state of the injection valve 4 can be accurately made. In other words, it is determined whether or not the injection valve 4 is being controlled so that the output value of the downstream side NOx sensor 8 declines due to a decline in the NOx concentration in exhaust gas that flows out from the NOx catalyst 3. For example, it is determined whether urea water is being supplied or can be supplied in an appropriate amount for NOx purification. Specifically, activity of the NOx catalyst 3, activity of the downstream side NOx sensor 8, completion of warming up of the internal combustion engine 1, and the like are checked. When a positive determination is made in step S1101, the present flow advances to step S1102, and when a negative determination is made, the present flow advances to step S1108.

In step S1102, an actual NOx concentration and an actual ammonia concentration in exhaust gas that flows out from the NOx catalyst 3 are estimated. The NOx concentration and the ammonia concentration are values obtained based on an operating state of the internal combustion engine 1 or the like and are values which assume that the injection valve 4 is in an abnormal state. Furthermore, values which assume that the injection valve 4 is in a normal state may be estimated. Moreover, in the present embodiment, the ECU 10 that processes step S1102 corresponds to the NOx concentration estimating unit and the ammonia concentration estimating unit according to the present invention.

In step S1103, the amount of decline in output B of the downstream side NOx sensor 8 when assuming that the injection valve 4 is in an abnormal state is calculated. The amount of decline in output is calculated according to Equation 4 provided earlier based on estimated values of the NOx concentration and the ammonia concentration in exhaust gas that flows out from the NOx catalyst 3 which are estimated in step S1102.

Equation 4 and the coefficients k1, k2, and k3 are to be obtained by an experiment, a simulation, or the like and stored in the ECU 10 in advance. In the present step, the amount of decline in output A of the downstream side NOx sensor 8 when assuming that the injection valve 4 is in a normal state may be further calculated. Moreover, in the present embodiment, the ECU 10 that processes step S1103 corresponds to the calculating unit according to the present invention.

In step S1104, the threshold used when performing a diagnosis of the injection valve 4 is corrected based on the amount of decline in output of the downstream side NOx sensor 8 calculated in step S1103. The threshold before correction is to be obtained by an experiment, a simulation, or the like in advance. In addition, the threshold after correction can be calculated by subtracting, from the threshold before correction, the amount of decline in output B of the downstream side NOx sensor 8 which is calculated by assuming that the injection valve 4 is in an abnormal state. Moreover, the threshold after correction may be set to a value obtained by subtracting, from "the threshold before correction", "a value which is equal to or larger than the amount of decline in output B and, at the same time, which is equal to or smaller than a sum value of the amount of decline in output A and the amount of decline in output B".

In step S1105, it is determined whether or not the output value of the downstream side NOx sensor 8 is equal to or smaller than the threshold after correction. In other words, a diagnosis of the injection valve 4 is performed. When a positive determination is made in step S1105, the present flow proceeds to step S1106 and the injection valve 4 is diagnosed as being in a normal state. On the other hand, when a negative determination is made in step S1105, the present flow proceeds to step S1107 and the injection valve 4 is diagnosed as being in an abnormal state. Moreover, in the present embodiment, the ECU 10 that processes step S1104 corresponds to the diagnosis control unit according to the present invention, and the ECU 10 that processes steps S1105, S1106, and S1107 corresponds to the diagnosing unit according to the present invention.

On the other hand, in step S1108, since a state appropriate for a diagnosis of the injection valve 4 does not exist, a diagnosis of the injection valve 4 is prohibited. In other words, a diagnosis of the injection valve 4 is not performed.

Moreover, not performing a diagnosis of the injection valve 4 includes, for example, the ECU 10 reading the output value of the downstream side NOx sensor 8 but not performing a diagnosis using the output value. In addition, not performing a diagnosis of the injection valve 4 includes, for example, the ECU 10 performing a diagnosis based on the output value of the NOx sensor 8 but canceling a result of the diagnosis. Furthermore, not performing a diagnosis of the injection valve 4 includes, for example, the ECU 10 not reading the output value of the downstream side NOx sensor 8.

Moreover, in the present embodiment, while a threshold of the output value of the downstream side NOx sensor 8 is corrected based on the amount of decline in output of the downstream side NOx sensor 8, alternatively, the output value of the downstream side NOx sensor 8 may be corrected based on the amount of decline in output of the downstream side NOx sensor 8. In other words, instead of correcting the threshold by subtracting the amount of decline in output B of the downstream side NOx sensor 8 which is calculated by assuming that the injection valve 4 is in an abnormal state from the threshold, the output value of the downstream side NOx sensor 8 may be corrected by adding the amount of decline in output B to the output value of the downstream side NOx sensor 8. In addition, the output value of the downstream side NOx sensor 8 after correction may be set to a value obtained by adding, to "the output value before correction", "a value which is equal to or larger than the amount of decline in output B and, at the same time, which is equal to or smaller than a sum value of the amount of decline in output A and the amount of decline in output B". In this case, the output value of the downstream side NOx sensor 8 is corrected instead of correcting the threshold in step S1104 described above, and it is determined whether or not the output value of the downstream side NOx sensor 8 after correction is equal to or smaller than the threshold instead of determining whether or not the output value of the downstream side NOx sensor 8 is equal to or smaller than the threshold after correction in step S1105 described above. Furthermore, in the present embodiment, while correction is performed by subtracting the amount of decline in output of the downstream side NOx sensor 8 from the threshold of the output value of the downstream side NOx sensor 8, alternatively, correction may be performed by multiplying the threshold of the output value of the downstream side NOx sensor 8 by a correction coefficient based on the amount of decline in output of the downstream side NOx sensor 8. In addition, correction may also be performed by multiplying the correction coefficient when correcting the output value of the downstream side NOx sensor 8.

In addition, the output value of the downstream side NOx sensor 8 may sometimes be corrected using a correction coefficient that is determined in accordance with a temperature or a flow velocity of exhaust gas. In such a case, the correction coefficient of the output value of the downstream side NOx sensor 8 may be corrected instead of correcting the coefficient.

As described above, in the present embodiment, a diagnosis of the injection valve 4 is performed by taking into consideration that an output value of the downstream side NOx sensor 8 declines due to a reaction between NOx and ammonia at the downstream side NOx sensor 8. In other words, since the correction of a threshold for diagnosis prevents the injection valve 4 in an abnormal state from being incorrectly diagnosed to be in a normal state, diagnostic accuracy can be increased.

Fifth Embodiment

In the fourth embodiment, a diagnosis of the injection valve 4 is performed by correcting a threshold in accordance with an amount of decline in output of the downstream side NOx sensor 8. On the other hand, in the present embodiment, it is determined whether or not a diagnosis of the injection valve 4 is to be performed based on the amount of decline in output of the downstream side NOx sensor 8.

When performing a diagnosis of the injection valve 4 by comparing the output value of the downstream side NOx sensor 8 and a threshold with each other, the larger the amount of decline in output of the downstream side NOx sensor 8, the smaller the threshold. When the threshold becomes too small, the threshold approaches a value output from the downstream side NOx sensor 8 when the injection valve 4 is in a normal state. In other words, due to the threshold being smaller, an actual output value of the downstream side NOx sensor 8 may become larger than the threshold despite the injection valve 4 being in a normal state. Therefore, there is a risk that the injection valve 4 is incorrectly diagnosed to be in an abnormal state despite being in a normal state.

When the amount of decline in output of the downstream side NOx sensor 8 is small, since the output value of the downstream side NOx sensor 8 assumes a value close to a value corresponding to an actual concentration, there is no need to correct the threshold. On the other hand, when the amount of decline in output of the downstream side NOx sensor 8 becomes large, an accuracy of diagnosis declines as described earlier. In consideration thereof, by performing a diagnosis of the injection valve 4 only when the amount of decline in output of the downstream side NOx sensor 8 is equal to or smaller than a prescribed amount, a decline in accuracy of the diagnosis can be prevented. The prescribed amount is an upper limit value of the amount of decline in output of the downstream side NOx sensor 8 when a diagnostic accuracy of the injection valve 4 is within an allowable range. In addition, when the amount of decline in output of the downstream side NOx sensor 8 is larger than the prescribed amount, an incorrect diagnosis can be prevented by prohibiting a diagnosis of the injection valve 4.

Figure 20:
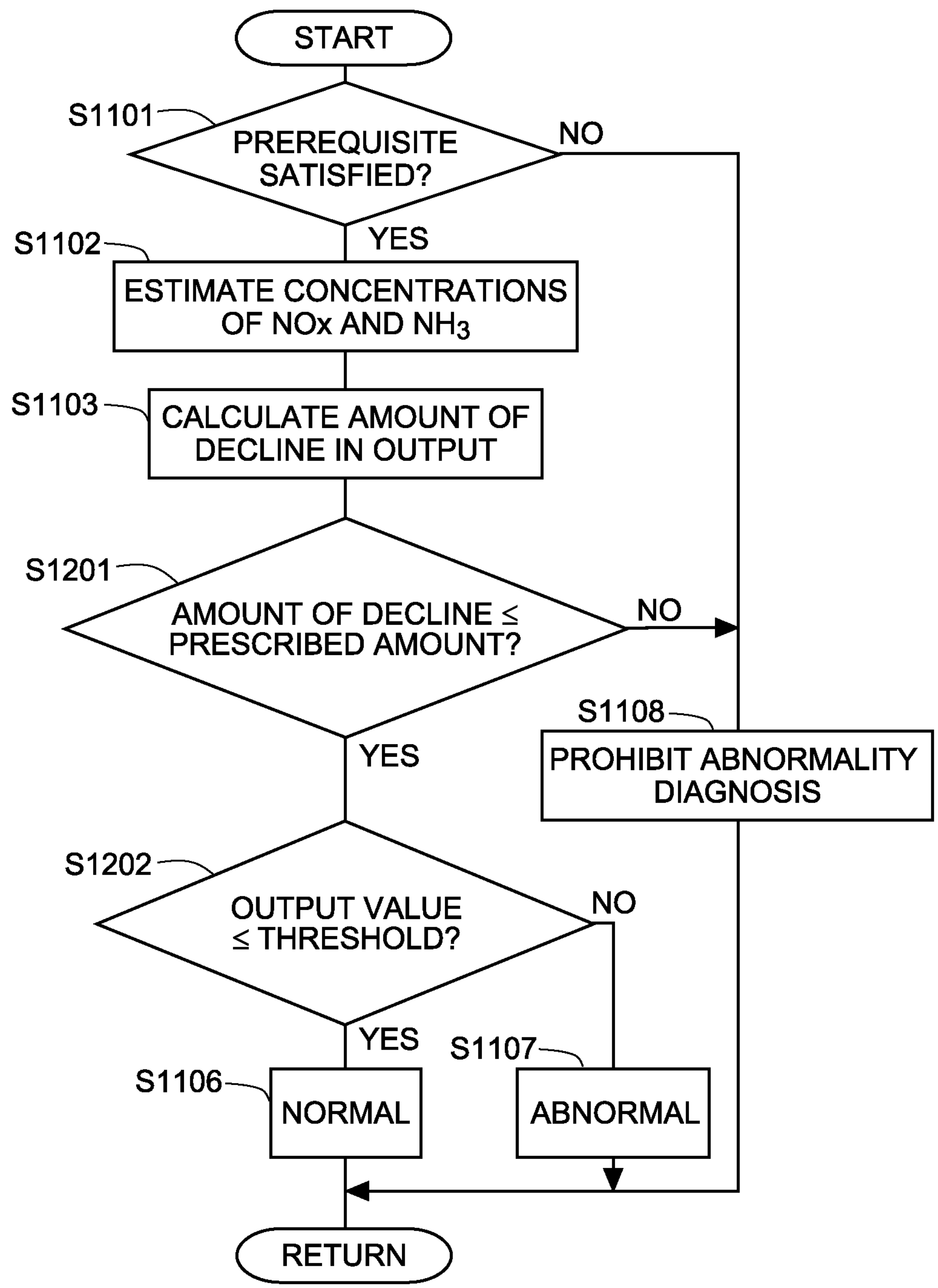
FIG. 20 is a flow chart indicating a flow of a diagnosis of an injection valve according to a fifth embodiment.

Next, a flow of a diagnosis of the injection valve 4 according to the present embodiment will be described with reference to the drawings. FIG. 20 is a flow chart indicating the flow. The present flow is executed every prescribed time by the ECU 10. Moreover, steps in which similar processes to those in the flow described earlier are performed will be denoted by same reference characters and a description thereof will be omitted. In the present flow, step S1201 is performed in place of step S1104 in the flow shown in FIG. 19.

In other words, in the present embodiment, step S1201 is executed after step S1103. In step S1201, it is determined whether or not the amount of decline in output of the downstream side NOx sensor 8 calculated in step S1103 is equal to or smaller than the prescribed amount described above. When a positive determination is made in step S1201, the present flow advances to step S1202, and when a negative determination is made, the present flow advances to step S1108.

In step S1202, it is determined whether or not the output value of the downstream side NOx sensor 8 is equal to or smaller than a threshold. In other words, a diagnosis of the injection valve 4 is performed. This threshold is a value that has not been corrected based on the amount of decline in output of the downstream side NOx sensor 8. When a positive determination is made in step S1202, the present flow proceeds to step S1106 and the injection valve 4 is diagnosed as being in a normal state. On the other hand, when a negative determination is made in step S1202, the present flow proceeds to step S1107 and the injection valve 4 is diagnosed as being in an abnormal state. Moreover, in the present embodiment, the ECU 10 that processes steps S1201 and S1108 corresponds to the diagnosis control unit according to the present invention, and the ECU 10 that processes steps S1202, S1106, and S1107 corresponds to the diagnosing unit according to the present invention.

Figure 21:
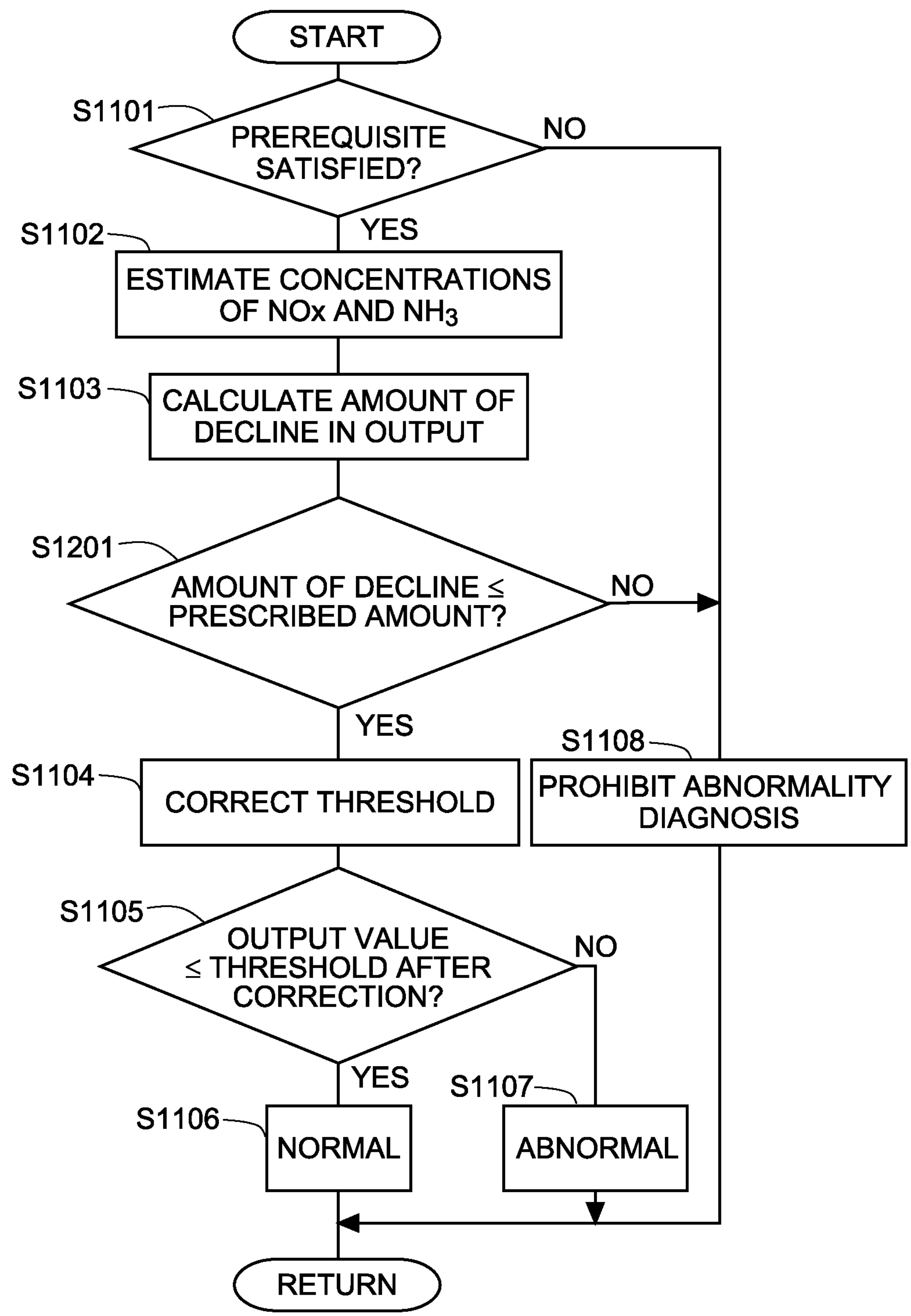
FIG. 21 is a flowchart indicating another flow of a diagnosis of an injection valve according to the fifth embodiment.

Moreover, in the present embodiment, step S1104 of the flow described earlier may be concurrently performed. FIG. 21 is a flow chart indicating another flow of a diagnosis of the injection valve 4 according to the present embodiment. The present flow is executed every prescribed time by the ECU 10. Moreover, steps in which same processes as those in the flows already described are performed will be denoted by same reference characters and a description thereof will be omitted. In the present flow, steps S1104 and S1201 in the flows already described are performed. Subsequently, when a positive determination is made in step S1201, the present flow advances to step S1104, and when a negative determination is made, the present flow advances to step S1108. In this case, the ECU 10 that processes steps S1201, S1108, and S1104 corresponds to the diagnosis control unit according to the present invention, and the ECU 10 that processes steps S1105, S1106, and S1107 corresponds to the diagnosing unit according to the present invention.

As described above, according to the present embodiment, by performing a diagnosis of the injection valve 4 only when the amount of decline in output of the NOx purification rate due to a reaction between NOx and ammonia at the downstream side NOx sensor 8 is small, a diagnosis is not performed when there is a risk of an incorrect diagnosis being made. Accordingly, since an incorrect diagnosis is prevented, diagnostic accuracy can be increased.

Sixth Embodiment

In the fourth and fifth embodiments described above, a diagnosis of the injection valve 4 is performed when the injection valve 4 is being controlled so that the output value of the downstream side NOx sensor 8 declines due to a decline in the NOx concentration in exhaust gas that flows out from the NOx catalyst 3. In other words, the injection valve 4 is diagnosed as being in an abnormal state when the output value of the downstream side NOx sensor 8 is larger than a threshold for diagnosis. In contrast, in the sixth embodiment described below, a diagnosis of the injection valve 4 is performed when the injection valve 4 is being controlled so that the output value of the downstream side NOx sensor 8 rises due to a rise in the ammonia concentration in exhaust gas that flows out from the NOx catalyst 3. For example, a case where urea water is being temporarily supplied to the NOx catalyst 3 in an amount exceeding an ammonia adsorption capability of the NOx catalyst 3 corresponds to this case. In this case, the injection valve 4 is diagnosed as being in a normal state when the output value of the downstream side NOx sensor 8 is larger than the threshold for diagnosis.

Next, a diagnosis of the injection valve 4 according to the present embodiment will be described with reference to the drawings. Moreover, while configurations of the internal combustion engine 1 and an exhaust system thereof according to the present embodiment may be similar to the configurations according to the first embodiment shown in FIG. 1, a configuration which further includes a second NOx catalyst on a downstream side of the downstream side NOx sensor 8 in the exhaust passage 2 is favorable.

Figure 22:
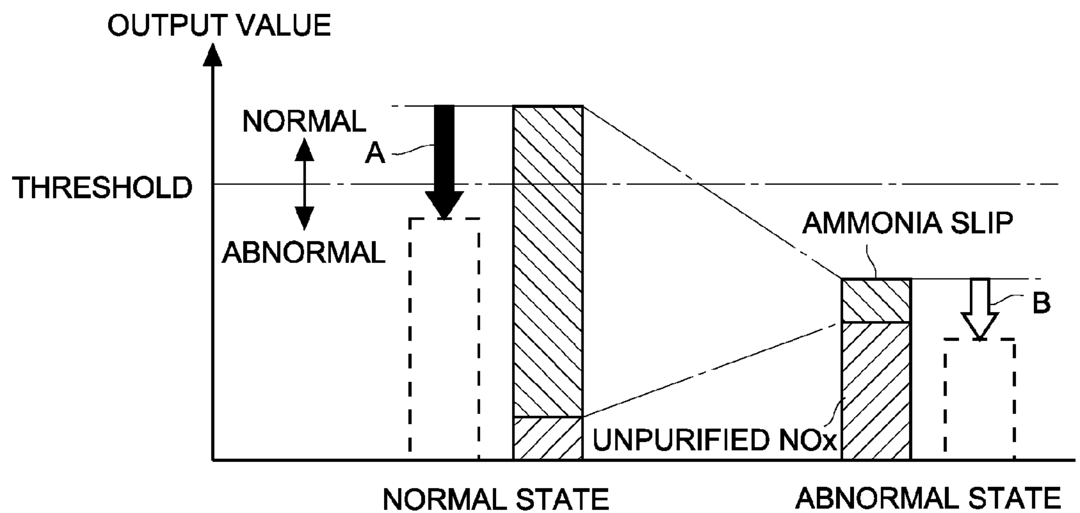
FIG. 22 is a diagram indicating an actual concentration in exhaust gas and an output value of a downstream side NOx sensor in a case where an injection valve is controlled so that the output value of the downstream side NOx sensor rises due to a rise in the ammonia concentration in exhaust gas.

FIG. 22 is a diagram schematically showing an actual concentration in exhaust gas that flows out from the NOx catalyst 3 and an output value of the downstream side NOx sensor 8 in a case where the injection valve 4 is controlled so that the output value of the downstream side NOx sensor 8 rises due to a rise in the ammonia concentration in exhaust gas that flows out from the NOx catalyst 3. A value when the injection valve 4 is in a normal state and a value when the injection valve 4 is in an abnormal state are shown. Moreover, items shown in FIG. 22 are similar to those shown in FIG. 17. In FIG. 22, the injection valve 4 is diagnosed as being in a normal state when the actual output value is larger than a threshold. Moreover, the threshold shown in FIG. 17 is a threshold before correction. The threshold is a lower limit value of an actual concentration when urea water is being supplied in the control amount from the injection valve 4 and can be obtained by an experiment, a simulation, or the like in advance.

As described above, the ECU 10 determines that urea water is being injected in the control amount and diagnoses that the injection valve 4 is in a normal state when the output value of the downstream side NOx sensor 8 is larger than the threshold. However, when the injection valve 4 is actually in a normal state, due to a relative increase in the actual concentration, the amount of decline in output A of the downstream side NOx sensor 8 also relatively increases. Therefore, as shown in FIG. 22, due to the amount of decline in output A, the actual output value of the downstream side NOx sensor 8 may become equal to or smaller than the threshold. In this case, there is a risk that the injection valve 4 may be incorrectly diagnosed to be in an abnormal state despite being in a normal state. In consideration thereof, in the present embodiment, the threshold is corrected in accordance with the amount of decline in output of the downstream side NOx sensor 8.

In addition, the ECU 10 diagnoses that the injection valve 4 is in an abnormal state when the output value of the downstream side NOx sensor 8 is equal to or smaller than the threshold. When the injection valve 4 is actually in an abnormal state, since the actual concentration relatively decreases, an incorrect diagnosis is not made even if the output of the downstream side NOx sensor 8 declines by the amount of decline in output B if the actual concentration is equal to or lower than the threshold. Moreover, in this case, since a sufficient amount of urea water is not supplied, a proportion of unpurified NOx increases. In addition, even if the injection valve 4 is actually in an abnormal state, since it is expected that a certain amount of urea water is to be supplied and ammonia adsorbed by the NOx catalyst 3 is to flow out, a certain amount of decline in output B is created due to a reaction between NOx and ammonia at the downstream side NOx sensor 8.

Figure 23:
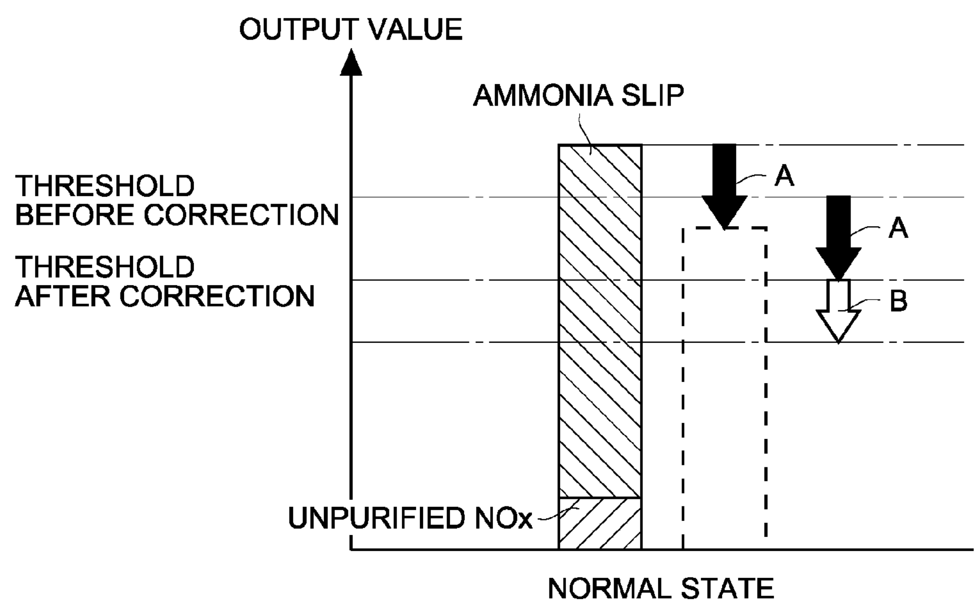
FIG. 23 is a diagram indicating a relationship between a threshold before correction and a threshold after correction in the case shown in FIG. 22.

FIG. 23 is a diagram indicating a relationship between a threshold before correction and a threshold after correction. The threshold after correction is corrected based on the amount of decline in output A of the downstream side NOx sensor 8 so as to assume a smaller value than the threshold before correction. Moreover, the amount of decline in output A is calculated by the ECU 10 as an amount of decline in output when the injection valve 4 is assumed to be in a normal state in a similar manner to the fourth embodiment described above. In addition, the ECU 10 corrects the threshold by subtracting the calculated amount of decline in output A from the threshold before correction. By reflecting an influence of a decline in the output of the downstream side NOx sensor 8 onto a threshold for diagnosis in this manner, a magnitude relationship between the actual output value and the threshold after correction can be set to be the same as a magnitude relationship between the actual concentration and the threshold before correction. As a result, an incorrect diagnosis that the injection valve 4 is in an abnormal state despite being in a normal state can be prevented.

In addition, a sum value of the amount of decline in output A and the amount of decline in output B may be adopted as the threshold correction amount in a similar manner to the fourth embodiment described above. Moreover, the ECU 10 calculates the amount of decline in output B with a similar method to the method used to calculate the amount of decline in output A. In addition, the threshold correction amount may be set to a value which is equal to or larger than "the amount of decline in output A" and, at the same time, which is equal to or smaller than "the sum value (A+B)".

Figure 24:
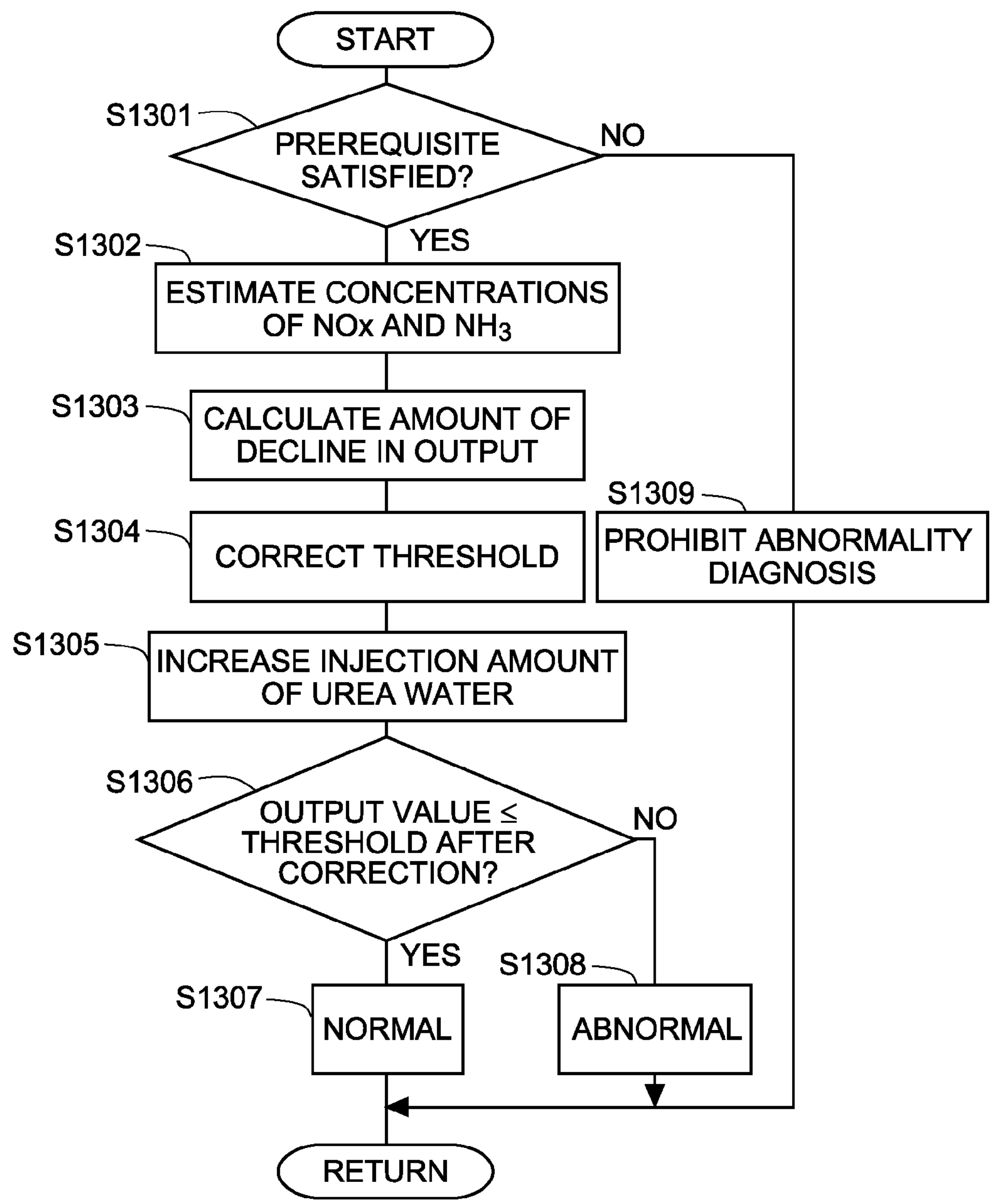
FIG. 24 is a flow chart indicating a flow of a diagnosis of an injection valve according to a sixth embodiment.

Next, a flow of a diagnosis of the injection valve 4 according to the present embodiment will be described with reference to the drawings. FIG. 24 is a flow chart indicating the flow. The present flow is executed every prescribed time by the ECU 10.

In step S1301, it is determined whether or not a prerequisite for performing a diagnosis of the injection valve 4 is satisfied. In the present step, it is determined whether or not a state exists where a diagnosis of a normal state of the injection valve 4 can be accurately made. In other words, it is determined whether or not the injection valve 4 can be controlled so that the output value of the downstream side NOx sensor 8 rises due to a rise in the ammonia concentration in exhaust gas that flows out from the NOx catalyst 3. For example, it is determined whether or not urea water can be temporarily supplied in an amount exceeding an ammonia adsorption capability of the NOx catalyst 3. Specifically, activity of the NOx catalyst 3, activity of the downstream side NOx sensor 8, completion of warming up of the internal combustion engine 1, and the like are checked. When a positive determination is made in step S1301, the present flow advances to step S1302, and when a negative determination is made, the present flow advances to step S1309.

In step S1302, an actual NOx concentration and an actual ammonia concentration in exhaust gas that flows out from the NOx catalyst 3 are estimated. The NOx concentration and the ammonia concentration are values obtained based on an operating state of the internal combustion engine 1 or the like and are values which assume that the injection valve 4 is in a normal state. Furthermore, values which assume that the injection valve 4 is in an abnormal state may be estimated. Moreover, in the present embodiment, the ECU 10 that processes step S1302 corresponds to the NOx concentration estimating unit and the ammonia concentration estimating unit according to the present invention.

In step S1303, the amount of decline in output A of the downstream side NOx sensor 8 when assuming that the injection valve 4 is in a normal state is calculated. The amount of decline in output is calculated according to Equation 4 provided earlier based on estimated values of the NOx concentration and the ammonia concentration in exhaust gas that flows out from the NOx catalyst 3 which are estimated in step S1302. Moreover, in the present step, the amount of decline in output B of the downstream side NOx sensor 8 when assuming that the injection valve 4 is in an abnormal state may be further calculated. Moreover, in the present embodiment, the ECU 10 that processes step S1303 corresponds to the calculating unit according to the present invention.

In step S1304, the threshold used when performing a diagnosis of the injection valve 4 is corrected based on the amount of decline in output of the downstream side NOx sensor 8 calculated in step S1303. The threshold before correction is to be obtained by an experiment, a simulation, or the like in advance. In addition, the threshold after correction can be calculated by subtracting, from the threshold before correction, the amount of decline in output A of the downstream side NOx sensor 8 which is calculated by assuming that the injection valve 4 is in a normal state. Moreover, the threshold after correction may be set to a value obtained by subtracting, from "the threshold before correction", "a value which is equal to or larger than the amount of decline in output A and, at the same time, which is equal to or smaller than a sum value of the amount of decline in output A and the amount of decline in output B".

In step S1305, the ECU 10 increases an injection amount from the injection valve 4 so that urea water is temporarily supplied in an amount exceeding the ammonia adsorption capability of the NOx catalyst 3. The increased amount may be appropriately set in consideration of the ammonia adsorption capability of the NOx catalyst 3 and the like.

In step S1306, it is determined whether or not the output value of the downstream side NOx sensor 8 is equal to or smaller than the threshold after correction. In other words, a diagnosis of the injection valve 4 is performed. When a positive determination is made in step S1306, the present flow proceeds to step S1307 and the injection valve 4 is diagnosed as being in an abnormal state. On the other hand, when a negative determination is made in step S1306, the present flow proceeds to step S1308 and the injection valve 4 is diagnosed as being in a normal state. Moreover, in the present embodiment, the ECU 10 that processes step S1304 corresponds to the diagnosis control unit according to the present invention, and the ECU 10 that processes steps S1306, S1307, and S1308 corresponds to the diagnosing unit according to the present invention.

On the other hand, in step S1309, since a state appropriate for a diagnosis of the injection valve 4 does not exist, a diagnosis of the injection valve 4 is prohibited in a similar manner to step S1108 in the embodiment described earlier. In other words, a diagnosis of the injection valve 4 is not performed.

Moreover, in the present embodiment, while the threshold of the output value of the downstream side NOx sensor 8 is corrected based on an amount of decline in output of the downstream side NOx sensor 8, alternatively, the output value of the downstream side NOx sensor 8 may be corrected based on the amount of decline in output of the downstream side NOx sensor 8. In other words, instead of correcting the threshold by subtracting the amount of decline in output A of the downstream side NOx sensor 8 which is calculated by assuming that the injection valve 4 is in a normal state from the threshold, the output value of the downstream side NOx sensor 8 may be corrected by adding the amount of decline in output A to the output value of the downstream side NOx sensor 8. In addition, the output value of the downstream side NOx sensor 8 after correction may be set to a value obtained by adding, to "the output value before correction", "a value which is equal to or larger than the amount of decline in output A and, at the same time, which is equal to or smaller than a sum value of the amount of decline in output A and the amount of decline in output B". In this case, the output value of the downstream side NOx sensor 8 is corrected instead of correcting the threshold in step S1304 described above, and it is determined whether or not the output value of the downstream side NOx sensor 8 after correction is equal to or smaller than the threshold instead of determining whether or not the output value of the downstream side NOx sensor 8 is equal to or smaller than the threshold after correction in step S1306 described above. Furthermore, in the present embodiment, while correction is performed by subtracting the amount of decline in output of the downstream side NOx sensor 8 from the threshold of the output value of the downstream side NOx sensor 8, alternatively, correction may be performed by multiplying the threshold of the output value of the downstream side NOx sensor 8 by a correction coefficient based on the amount of decline in output of the downstream side NOx sensor 8. In addition, correction may also be performed by multiplying the correction coefficient when correcting the output value of the downstream side NOx sensor 8.

As described above, even in the present embodiment, a decline in the output of the downstream side NOx sensor 8 is taken into consideration. Therefore, since the injection valve 4 in a normal state is prevented from being incorrectly diagnosed to be in an abnormal state, diagnostic accuracy can be increased.

First Modification of Sixth Embodiment

As a modification of the sixth embodiment, it may be determined whether or not a diagnosis of the injection valve 4 is to be performed based on the amount of decline in output of the downstream side NOx sensor 8 in a similar manner to the fifth embodiment described earlier. In other words, by performing a diagnosis of the injection valve 4 only when the amount of decline in output of the downstream side NOx sensor 8 is equal to or smaller than a prescribed amount, a decline in accuracy of the diagnosis can be prevented. The prescribed amount is an upper limit value of the amount of decline in output of the downstream side NOx sensor 8 when a diagnostic accuracy of the injection valve 4 is within an allowable range in a similar manner to the fifth embodiment.

In a flow of a diagnosis of the injection valve 4 according to the present modification, step S1201 is performed in place of step S1304 in the flow shown in FIG. 24 in a similar manner to step S1201 being performed in the flow shown in FIG. 20 according to the fifth embodiment described earlier in place of step S1104 in the flow shown in FIG. 19. In other words, in step S1201, it is determined whether or not the amount of decline in output of the downstream side NOx sensor 8 calculated in step S1303 is equal to or smaller than the prescribed amount described above. Subsequently, when a positive determination is made in step S1201, the present flow advances to step S1305, and when a negative determination is made, the present flow advances to step S1309. Furthermore, in step S1306, it is determined whether or not the output value of the downstream side NOx sensor 8 is equal to or smaller than the threshold that has not been corrected. In addition, in the present modification, steps S1304 and S1201 may be concurrently performed in the flow shown in FIG. 24 in a similar manner to steps S1104 and S1201 being concurrently performed in the flow shown in FIG. 21 described above. In other words, when a positive determination is made in step S1201, step S1305 may be performed after step S1304 is performed. Since all of these flows are similar to the respective flows according to the fifth embodiment, a description thereof will be omitted. Even in the present modification, a diagnosis is no longer performed when there is a risk of an incorrect diagnosis being made. As a result, since an incorrect diagnosis is prevented, diagnostic accuracy can be increased.

Second Modification of Sixth Embodiment

In the sixth embodiment, the injection valve 4 is diagnosed to be in a normal state when the output value of the downstream side NOx sensor 8 is larger than the threshold for diagnosis. However, even when the output value of the downstream side NOx sensor 8 is rising due to a rise in the ammonia concentration in exhaust gas that flows out from the NOx catalyst 3 which is attributable to a temperature rise of the NOx catalyst 3, the injection valve 4 can be diagnosed to be in a normal state when the output value is larger than the threshold.

An amount of ammonia adsorbable by the NOx catalyst 3 has an upper limit amount referred to as a saturated adsorption amount. The saturated adsorption amount characteristically declines as the temperature of the NOx catalyst 3 rises. Therefore, when the saturated adsorption amount declines due to a temperature rise of the NOx catalyst 3, ammonia in an amount exceeding the declined saturated adsorption amount may flow out from the NOx catalyst 3. When the injection valve 4 has been operating in a normal state prior to the temperature rise, it can be assumed that an amount of ammonia more or less equal to the saturated adsorption amount had been adsorbed by the NOx catalyst 3 at that point. Therefore, the injection valve 4 can be diagnosed to be in a normal state when a value larger than the threshold is output from the downstream side NOx sensor 8 after the temperature rise. Moreover, the lower limit value can be set based on the saturated adsorption amount of the NOx catalyst or the like.

Moreover, a relationship between the actual concentration in exhaust gas that flows out from the NOx catalyst 3 or the output value of the downstream side NOx sensor 8 and the threshold is similar to the relationship schematically shown in FIG. 22 described above. Therefore, by subtracting the amount of decline in output A of the downstream side NOx sensor 8 after a temperature rise of the NOx catalyst 3 in a case where it is assumed that the injection valve 4 has been in a normal state prior to the temperature rise of the NOx catalyst 3 from the threshold before correction so that the threshold after correction becomes a smaller value than the threshold before correction, an influence of a decline in the output of the downstream side NOx sensor 8 can be reflected onto the threshold for diagnosis. As a result, an incorrect diagnosis that the injection valve 4 is in an abnormal state despite being in a normal state can be prevented. In addition, a sum value of the amount of decline in output A and the amount of decline in output B may be adopted as the threshold correction amount or the threshold correction amount may be set to a value which is equal to or larger than the amount of decline in output A and, at the same time, which is equal to or smaller than the sum value in a similar manner to the embodiments described above.

Moreover, the flow of a diagnosis of the injection valve 4 according to the present embodiment is similar to the flow shown in FIG. 24. However, step S1305 is not executed. In this case, in step S1301, it is concurrently determined whether or not the temperature of the NOx catalyst 3 has risen to or above a prescribed temperature when determining whether or not a prerequisite for performing a diagnosis of the injection valve 4 is satisfied. The prescribed temperature may be set to, for example, a temperature at which the saturated adsorption amount of ammonia of the NOx catalyst 3 sufficiently declines. Accordingly, when a positive determination is made in step S1301, it can be determined that a state exists where a normal state or an abnormal state of the injection valve 4 can be accurately diagnosed. In addition, since the threshold is corrected when processes of steps S1302 to S1304 are executed, an incorrect diagnosis that the injection valve 4 is in an abnormal state despite being in a normal state can be prevented. Moreover, even in the present modification, step S1201 may be performed in place of step S1304 and steps S1304 and S1201 may be concurrently performed in a similar manner to the first modification described above. Even with the second modification, diagnostic accuracy of the injection valve 4 can be increased in a similar manner to the first modification.

REFERENCE SIGNS LIST

1 Internal combustion engine
2 Exhaust passage
3 Selective catalytic reduction NOx catalyst (NOx catalyst)
4 Injection valve
5 Intake passage
6 Throttle
7 Upstream side NOx sensor
8 Downstream side NOx sensor
9 Temperature sensor
10 ECU
11 Crank position sensor
12 Accelerator depression amount sensor
15 Air flow meter
40 Tank

The invention claimed is:

1. A diagnostic apparatus for an exhaust gas purification apparatus of an internal combustion engine, the exhaust gas purification apparatus including:

a selective catalytic reduction NOx catalyst which is provided in an exhaust passage of the internal combustion engine and which uses ammonia to reduce NOx in exhaust gas;

a supplying unit which is provided on an upstream side of the selective catalytic reduction NOx catalyst and which supplies ammonia or an ammonia precursor into exhaust gas that flows into the selective catalytic reduction NOx catalyst;

a control unit configured to control a supply amount of the ammonia or ammonia precursor that is supplied from the supplying unit; and a sensor which is provided on a downstream side of the selective catalytic reduction NOx catalyst, which detects NOx and ammonia in exhaust gas that flows out from the selective catalytic reduction NOx catalyst, and at which NOx and ammonia react with each other, the diagnostic apparatus for the exhaust gas purification apparatus comprising:

a NOx concentration estimating unit configured to estimate a NOx concentration in the exhaust gas that flows out from the selective catalytic reduction NOx catalyst;

an ammonia concentration estimating unit configured to estimate an ammonia concentration in the exhaust gas that flows out from the selective catalytic reduction NOx catalyst;

a calculating unit configured to calculate an amount of decline in output of the sensor caused by a reaction between NOx and ammonia at the sensor, based on the NOx concentration estimated by the NOx concentration estimating unit and the ammonia concentration estimated by the ammonia concentration estimating unit;

a diagnosing unit configured to perform a diagnosis of the supplying unit based on an output value of the sensor; and a diagnosis control unit configured to control a diagnosis by the diagnosing unit based on the amount of decline in output of the sensor as calculated by the calculating unit.

2. The diagnostic apparatus for the exhaust gas purification apparatus according to claim 1, wherein the diagnosis control unit: is configured to:

make the diagnosing unit perform a diagnosis of the supplying unit when an amount of rise of a NOx purification rate which is calculated based on the amount of decline in output of the sensor as calculated by the calculating unit is equal to or smaller than a prescribed amount; and make the diagnosing unit not perform a diagnosis of the supplying unit when the amount of rise of a NOx purification rate which is calculated based on the amount of decline in output of the sensor as calculated by the calculating unit is larger than the prescribed amount.

3. The diagnostic apparatus for the exhaust gas purification apparatus according to claim 1, wherein the diagnosing unit is configured to diagnose the supplying unit by comparing a NOx purification rate that is calculated based on the output value of the sensor with a threshold, and the diagnosis control unit is configured to correct the NOx purification rate based on the amount of decline in output of the sensor or correct the threshold based on the amount of decline in output of the sensor.

4. The diagnostic apparatus for the exhaust gas purification apparatus according to claim 3, wherein the diagnosing unit is configured, when the control unit is controlling the supplying unit so that the output value of the sensor declines due to a decline in a NOx concentration in exhaust gas that flows out from the selective catalytic reduction NOx catalyst, to:

diagnose that the supplying unit is in an abnormal state when a NOx purification rate that is calculated based on the output value of the sensor is lower than the threshold; and diagnose that the supplying unit is in a normal state when the NOx purification rate that is calculated based on the output value of the sensor is equal to or higher than the threshold.

5. The diagnostic apparatus for the exhaust gas purification apparatus according to claim 4, wherein the NOx concentration estimating unit is configured to estimate a NOx concentration in exhaust gas that flows out from the selective catalytic reduction NOx catalyst when assuming that the supplying unit is in an abnormal state, the ammonia concentration estimating unit is configured to estimate an ammonia concentration in the exhaust gas that flows out from the selective catalytic reduction NOx catalyst when assuming that the supplying unit is in an abnormal state, the calculating unit is configured to calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit is configured to correct the threshold by adding, to the threshold, an amount of rise of a NOx purification rate which is calculated based on the amount of decline in output when assuming that the supplying unit is in an abnormal state.

6. The diagnostic apparatus for the exhaust gas purification apparatus according to claim 5, wherein the NOx concentration estimating unit is configured to estimate a NOx concentration in exhaust gas that flows out from the selective catalytic reduction NOx catalyst when assuming that the supplying unit is in a normal state, the ammonia concentration estimating unit is configured to estimate an ammonia concentration in the exhaust gas that flows out from the selective catalytic reduction NOx catalyst when assuming that the supplying unit is in a normal state, the calculating unit is configured to calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit is configured to correct the threshold by adding, to the threshold, a value which is equal to or larger than an amount of rise of a NOx purification rate calculated based on the amount of decline in output when assuming that the supplying unit is in an abnormal state and, at the same time, which is equal to or smaller than a sum value of the amount of rise of a NOx purification rate calculated based on the amount of decline in output when assuming that the supplying unit is in an abnormal state and the amount of rise of a NOx purification rate calculated based on the amount of decline in output when assuming that the supplying unit is in a normal state.

7. The diagnostic apparatus for the exhaust gas purification apparatus according to claim 3, wherein the diagnosing unit is configured, when the control unit is controlling the supplying unit so that the output value of the sensor rises due to a rise in an ammonia concentration in exhaust gas that flows out from the selective catalytic reduction NOx catalyst, to:

diagnose that the supplying unit is in a normal state when a NOx purification rate that is calculated based on the output value of the sensor is equal to or lower than the threshold; and diagnose that the supplying unit is in an abnormal state when the NOx purification rate that is calculated based on the output value of the sensor is higher than the threshold.

8. The diagnostic apparatus for the exhaust gas purification apparatus according to claim 3, wherein the diagnosing unit is configured, when the output value of the sensor is rising due to a rise in an ammonia concentration in exhaust gas that flows out from the selective catalytic reduction NOx catalyst which is attributable to a temperature rise of the selective catalytic reduction NOx catalyst, to:

diagnose that the supplying unit is in a normal state when a NOx purification rate that is calculated based on the output value of the sensor is equal to or lower than the threshold; and diagnose that the supplying unit is in an abnormal state when the NOx purification rate that is calculated based on the output value of the sensor is higher than the threshold.

9. The diagnostic apparatus for the exhaust gas purification apparatus according to claim 7, wherein NOx concentration estimating unit is configured to estimate a NOx concentration in exhaust gas that flows out from the selective catalytic reduction NOx catalyst when assuming that the supplying unit is in a normal state, the ammonia concentration estimating unit is configured to estimate an ammonia concentration in the exhaust gas that flows out from the selective catalytic reduction NOx catalyst when assuming that the supplying unit is in a normal state, the calculating unit is configured to calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit is configured to correct the threshold by adding, from the threshold, an amount of rise of a NOx purification rate which is calculated based on the amount of decline in output when assuming that the supplying unit is in a normal state.

10. The diagnostic apparatus for the exhaust gas purification apparatus according to claim 9, wherein the NOx concentration estimating unit is configured to estimate a NOx concentration in exhaust gas that flows out from the selective catalytic reduction NOx catalyst when assuming that the supplying unit is in an abnormal state, the ammonia concentration estimating unit is configured to estimate an ammonia concentration in the exhaust gas that flows out from the selective catalytic reduction NOx catalyst when assuming that the supplying unit is in an abnormal state, the calculating unit is configured to calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit is configured to correct the threshold by adding, to the threshold, a value which is equal to or larger than an amount of rise of a NOx purification rate calculated based on the amount of decline in output when assuming that the supplying unit is in a normal state and, at the same time, which is equal to or smaller than a sum value of the amount of rise of a NOx purification rate calculated based on the amount of decline in output when assuming that the supplying unit is in a normal state and the amount of rise of a NOx purification rate calculated based on the amount of decline in output when assuming that the supplying unit is in an abnormal state.

11. The diagnostic apparatus for the exhaust gas purification apparatus according to claim 1, wherein the diagnosis control unit is configured to:

make the diagnosing unit perform a diagnosis of the supplying unit when the amount of decline in output of the sensor as calculated by the calculating unit is equal to or smaller than a prescribed amount; and make the diagnosing unit not perform a diagnosis of the supplying unit when the amount of decline in output of the sensor as calculated by the calculating unit is larger than the prescribed amount.

12. The diagnostic apparatus for the exhaust gas purification apparatus according to claim 1, wherein the diagnosing unit is configured to diagnose the supplying unit by comparing the output value of the sensor with a threshold, and the diagnosis control unit is configured to correct the output value of the sensor based on the amount of decline in output or correct the threshold based on the amount of decline in output.

13. The diagnostic apparatus for the exhaust gas purification apparatus according to claim 12, wherein the diagnosing unit is configured, when the control unit is controlling the supplying unit so that the output value of the sensor declines due to a decline in a NOx concentration in exhaust gas that flows out from the selective catalytic reduction NOx catalyst, to:

diagnose that the supplying unit is in an abnormal state when the output value of the sensor is larger than the threshold; and diagnose that the supplying unit is in a normal state when the output value of the sensor is equal to or smaller than the threshold.

14. The diagnostic apparatus for the exhaust gas purification apparatus according to claim 13, wherein the NOx concentration estimating unit is configured to estimate a NOx concentration in exhaust gas that flows out from the selective catalytic reduction NOx catalyst when assuming that the supplying unit is in an abnormal state, the ammonia concentration estimating unit is configured to estimate an ammonia concentration in the exhaust gas that flows out from the selective catalytic reduction NOx catalyst when assuming that the supplying unit is in an abnormal state, the calculating unit is configured to calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit is configured to correct the threshold by subtracting, from the threshold, the amount of decline in output when assuming that the supplying unit is in an abnormal state.

15. The diagnostic apparatus for the exhaust gas purification apparatus according to claim 14, wherein the NOx concentration estimating unit is configured to estimate a NOx concentration in exhaust gas that flows out from the selective catalytic reduction NOx catalyst when assuming that the supplying unit is in a normal state, the ammonia concentration estimating unit is configured to estimate an ammonia concentration in the exhaust gas that flows out from the selective catalytic reduction NOx catalyst when assuming that the supplying unit is in a normal state, the calculating unit is configured to calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit is configured to correct the threshold by subtracting, from the threshold, a value which is equal to or larger than the amount of decline in output when assuming that the supplying unit is in an abnormal state and, at the same time, which is equal to or smaller than a sum value of the amount of decline in output when assuming that the supplying unit is in an abnormal state and the amount of decline in output when assuming that the supplying unit is in a normal state.

16. The diagnostic apparatus for the exhaust gas purification apparatus according to claim 12, wherein the diagnosing unit is configured, when the control unit is controlling the supplying unit so that the output value of the sensor rises due to a rise in an ammonia concentration in exhaust gas that flows out from the selective catalytic reduction NOx catalyst, to:

diagnose that the supplying unit is in a normal state when the output value of the sensor is larger than the threshold; and diagnose that the supplying unit is in an abnormal state when the output value of the sensor is equal to or smaller than the threshold.

17. The diagnostic apparatus for the exhaust gas purification apparatus according to claim 12, wherein the diagnosing unit is configured, when the output value of the sensor is rising due to a rise in an ammonia concentration in exhaust gas that flows out from the selective catalytic reduction NOx catalyst which is attributable to a temperature rise of the selective catalytic reduction NOx catalyst, to:

diagnose that the supplying unit is in a normal state when the output value of the sensor is larger than the threshold; and diagnose that the supplying unit is in an abnormal state when the output value of the sensor is equal to or smaller than the threshold.

18. The diagnostic apparatus for the exhaust gas purification apparatus according to claim 16, wherein the NOx concentration estimating unit is configured to estimate a NOx concentration in exhaust gas that flows out from the selective catalytic reduction NOx catalyst when assuming that the supplying unit is in a normal state, the ammonia concentration estimating unit is configured to estimate an ammonia concentration in the exhaust gas that flows out from the selective catalytic reduction NOx catalyst when assuming that the supplying unit is in a normal state, the calculating unit is configured to calculate the amount of decline in output when assuming that the supplying unit is in a normal state based on the NOx concentration and the ammonia concentration in the exhaust gas that flows out from the selective catalytic reduction NOx catalyst when assuming that the supplying unit is in a normal state, and the diagnosis control unit is configured to correct the threshold by subtracting, from the threshold, the amount of decline in output when assuming that the supplying unit is in a normal state.

19. The diagnostic apparatus for the exhaust gas purification apparatus according to claim 18, wherein the NOx concentration estimating unit is configured to estimate a NOx concentration in exhaust gas that flows out from the selective catalytic reduction NOx catalyst when assuming that the supplying unit is in an abnormal state, the ammonia concentration estimating unit is configured to estimate an ammonia concentration in the exhaust gas that flows out from the selective catalytic reduction NOx catalyst when assuming that the supplying unit is in an abnormal state, the calculating unit is configured to calculate the amount of decline in output when assuming that the supplying unit is in an abnormal state based on the NOx concentration and the ammonia concentration in the exhaust gas that flows out from the selective catalytic reduction NOx catalyst when assuming that the supplying unit is in an abnormal state, and the diagnosis control unit is configured to correct the threshold by subtracting, from the threshold, a value which is equal to or larger than the amount of decline in output when assuming that the supplying unit is in a normal state and, at the same time, which is equal to or smaller than a sum value of the amount of decline in output when assuming that the supplying unit is in a normal state and the amount of decline in output when assuming that the supplying unit is in an abnormal state.

* * * * *